(12) United States Patent
White et al.

(10) Patent No.: US 10,908,031 B1
(45) Date of Patent: Feb. 2, 2021

(54) STIMULUS INDICATING DEVICE EMPLOYING THE SWELLING ACTION OF POLYMER GELS

(71) Applicant: Prasidiux, LLC, Arlington, VA (US)

(72) Inventors: Joseph C. White, College Park, MD (US); Kevin Diehn, Towson, MD (US); Bani H. Cipriano, Silver Spring, MD (US); Rel S. Ambrozy, Arlington, VA (US)

( * ) Notice: Subject to any disclaimer, the term of this patent is extended or adjusted under 35 U.S.C. 154(b) by 738 days.

(21) Appl. No.: 15/353,897

(22) Filed: Nov. 17, 2016

Related U.S. Application Data

(63) Continuation of application No. 15/293,658, filed on Oct. 14, 2016, now abandoned.

(60) Provisional application No. 62/242,903, filed on Oct. 16, 2015, provisional application No. 62/291,349, filed on Feb. 4, 2016, provisional application No. 62/291,657, filed on Feb. 5, 2016.

(51) Int. Cl.
*G01K 11/00* (2006.01)

(52) U.S. Cl.
CPC ..................... *G01K 11/00* (2013.01)

(58) Field of Classification Search
CPC ....................................................... G01K 11/00
See application file for complete search history.

(56) References Cited

U.S. PATENT DOCUMENTS

| | | | | |
|---|---|---|---|---|
| RE25,499 E * | 12/1963 | Fenity et al. | ........... | G01W 1/00 116/201 |
| 4,439,346 A * | 3/1984 | Patel | ...................... | G01K 11/16 116/202 |
| 4,732,930 A * | 3/1988 | Tanaka | ...................... | C08F 8/00 524/555 |
| 5,336,057 A * | 8/1994 | Fukuda | ................. | F04B 43/043 222/386.5 |
| 5,667,303 A * | 9/1997 | Arens | ...................... | G01K 3/04 116/219 |
| 6,694,913 B2 * | 2/2004 | Cooperman | ............. | G01K 3/04 116/206 |
| 6,741,523 B1 * | 5/2004 | Bommarito | .............. | G01K 3/04 116/220 |
| 6,916,116 B2 * | 7/2005 | Diekmann | ............... | G01K 3/04 116/216 |
| 7,080,939 B1 * | 7/2006 | Fair | ........................ | G01K 3/04 116/216 |
| 7,940,605 B2 * | 5/2011 | Ambrozy | ................. | G01K 3/04 116/200 |
| 8,077,554 B2 * | 12/2011 | Ambrozy | ................. | G01K 3/04 116/200 |
| 8,166,906 B2 * | 5/2012 | Ambrozy | ................. | G01K 3/04 116/206 |
| 8,619,507 B2 * | 12/2013 | Ambrozy | ................. | G01K 3/04 116/200 |
| 9,063,015 B2 * | 6/2015 | Ambrozy | ................. | G01K 3/04 |
| 9,182,292 B2 * | 11/2015 | Ambrozy | ................. | G01K 3/04 |
| 10,031,086 B2 * | 7/2018 | Prusik | ..................... | G01K 11/12 |
| 10,323,989 B2 * | 6/2019 | Ribi | ...................... | A47G 19/00 |
| 10,378,970 B2 * | 8/2019 | Diehn | ..................... | G01K 1/08 |

(Continued)

*Primary Examiner* — Nimeshkumar D Patel
*Assistant Examiner* — Tania Courson
(74) *Attorney, Agent, or Firm* — Fox Rothschild LLP

(57) ABSTRACT

The present invention relates to a device for evidencing when a stimulus sensitive product has been exposed to a predetermined stimulus, and the invention further may include a method for manufacturing aspects of that device.

30 Claims, 14 Drawing Sheets

(56) References Cited

U.S. PATENT DOCUMENTS

| | | | | |
|---|---|---|---|---|
| 2006/0262828 | A1* | 11/2006 | Ambrozy | G01K 3/04 374/17 |
| 2009/0010803 | A1* | 1/2009 | Ambrozy | G01K 3/04 422/400 |
| 2013/0291785 | A1* | 11/2013 | Ambrozy | G01K 3/04 116/200 |
| 2015/0247760 | A1* | 9/2015 | Ambrozy | G01K 3/04 116/200 |
| 2015/0293027 | A1* | 10/2015 | Cipriano | G01N 21/78 422/402 |
| 2016/0245707 | A1* | 8/2016 | Cipriano | G01K 11/165 |
| 2019/0346316 | A1* | 11/2019 | Diehn | G01K 1/08 |
| 2019/0360874 | A1* | 11/2019 | Diehn | G01K 1/08 |

* cited by examiner

US 10,908,031 B1

STIMULUS INDICATING DEVICE EMPLOYING THE SWELLING ACTION OF POLYMER GELS

RELATED APPLICATIONS

This application claims the benefit of U.S. patent application Ser. No. 15/293,658 filed Oct. 14, 2016, and the benefit of U.S. provisional patent application Ser. No. 62/242,903 filed Oct. 16, 2015, U.S. provisional patent application Ser. No. 62/291,349 filed Feb. 4, 2016, and U.S. provisional patent application Ser. No. 62/291,657 filed Feb. 5, 2016. The disclosure of these applications are hereby incorporated by reference in their entirety.

U.S. patent application Ser. No. 14/801,637 filed Jan. 15, 2015 entitled "Stimulus Indicating Device Employing Polymer Gels" and both U.S. provisional patent application Ser. No. 61/964,792 filed Jan. 15, 2014 entitled "Stimulus Indicating Device Employing Polymer Gels" and U.S. provisional patent application Ser. No. 61/934,448 filed Jan. 31, 2014 entitled "Stimulus Indicating Device Employing Polymer Gels" and are hereby incorporated by reference in their entirety.

U.S. patent application Ser. No. 12/801,637 filed Jun. 17, 2010, entitled "Stimulus Indicating Device Employing Polymer Gels" and its U.S. provisional patent application Ser. No. 61/213,547 filed Jun. 18, 2009, are both hereby incorporated by reference in their entirety.

U.S. patent application Ser. No. 12/042,528 filed Mar. 5, 2008, entitled "Stimulus Indicating Device Employing Polymer Gels" and its U.S. provisional patent application Ser. No. 60/904,881 filed Mar. 5, 2007, are both hereby incorporated by reference in their entirety.

U.S. patent application Ser. No. 11/954,520 filed Dec. 12, 2007, entitled "Stimulus Indicating Device Employing Polymer Gels," now U.S. Pat. No. 8,166,906 issued May 1, 2012, and its U.S. provisional patent application Ser. No. 60/874,248 filed Dec. 12, 2006, are both hereby incorporated by reference in their entirety.

U.S. patent application Ser. No. 11/580,241 filed Oct. 13, 2006, entitled "Stimulus Indicating Device Employing Polymer Gels," now U.S. Pat. No. 8,077,554 issued Dec. 13, 2011, and both its U.S. provisional patent application Ser. No. 60/725,648, and U.S. provisional patent application Ser. No. 60/725,649, both filed Oct. 13, 2005, are all hereby incorporated by reference in their entirety.

U.S. patent application Ser. No. 11/486,969, filed Jul. 14, 2006, entitled "Stimulus Indicating Device Employing Polymer Gels," now U.S. Pat. No. 7,940,605 issued May 10, 2011, and its U.S. provisional patent application Ser. No. 60/698,984, filed Jul. 14, 2005, are both hereby incorporated by reference in their entirety.

U.S. patent application Ser. No. 11/414,254, filed May 1, 2006, entitled "Stimulus Indicating Device Employing Polymer Gels" and its U.S. provisional patent application No. 60/675,882, filed Apr. 29, 2005, are both hereby incorporated by reference in their entirety.

GOVERNMENT RIGHTS

Certain aspects or embodiments of the disclosed invention (but not the above-incorporated references) may have been made with Government support under SBIR grant Award No. IIP-1431014 awarded by the National Science Foundation. The Government has certain rights in those aspects or embodiments of the disclosed invention.

FIELD OF THE INVENTION

The present invention relates, for example to a stimulus-indicating device. More particularly, the present invention may include an apparatus for evidencing when a stimulus sensitive product has been exposed to a designated or predetermined stimulus for a certain period of time, and the invention may further includes a method for manufacturing aspects of that apparatus.

RELATED PRIOR ART

It is well known in the art that the useful life of a perishable product is a function of its cumulative exposure to a harmful stimulus over a period of time. The types of stimuli that advance the degradation of stimulus-sensitive products over time includes not only temperature, but also light, pH, humidity, electromagnetic radiation, visible light, radiation, solvent composition, ionic strength, etc.

The useful life of a temperature sensitive product is a function of its cumulative time-temperature exposure, which is the combination of the temperature to which a product is exposed combined with the duration of the exposure. For stimulus sensitive products, degradation generally occurs faster at a higher stimulus (i.e., temperature) than at a lower stimulus (i.e., temperature). For example, often a temperature-perishable product will typically have a longer useful life if it is exposed to lower temperatures than if it is exposed to higher temperatures. In particular, pre-packaged chicken will spoil if it is exposed to a temperature of 40° F.-41° F. or above for an extended period of time. However, exposure to high temperatures is not always the cause of the problem because certain stimulus sensitive products will degrade sooner at a lower stimulus (especially freezing temperatures) than at a higher stimulus. For example, a malaria vaccine will degrade faster below 2° C. than if stored in the range of 2° C. to 8° C. Thus, the rate of degradation is often stimulus and product specific.

Stimulus perishable products susceptible to degradation due to cumulative time-stimulus exposure include, but are not limited to, food, food additives, chemicals, biological materials, drugs, cosmetics, photographic supplies and vaccines. Many manufacturers mark their products with printed expiration dates in an attempt to provide an indication of when the useful life of a perishable product lapses. These dates, however, are only estimates and may be unreliable because they are based on assumptions about the stimulus history of the product that may not be true with respect to the particular unit or product in the package on which the expiration date appears. Specifically, manufacturers compute expiration dates by assuming that the product will be kept within a specified stimulus range during the product's useful life. The manufacturer cannot always predict or control, however, the stimulus exposure of a product through each step of the supply chain that delivers the product to the consumer. If the product is actually exposed to a stimulus higher than those on which the expiration date is based, the perishable product may degrade or spoil before the printed expiration date. When this happens, the expiration date may mislead the consumer into believing that the perishable product is still usable when, in fact, its useful life has lapsed.

Marking a stimulus sensitive product with an expiration date is useful nonetheless, because often a visual inspection of the perishable product does not warn a potential user that the exposure of the product to a harmful stimulus has caused it to degrade or spoil. Although there are certain time-stimulus indicators currently available, most are focused on temperature, and not on the other types of stimuli. Additionally, many of these time-temperature indicators require the active agents to be kept separate from one another until the indicator is attached to the product it is monitoring. If the active ingredients are not kept separate they will begin to interact prematurely, thereby giving a premature indication of spoilage. As a result, these types of indicators may include manual activation, however, this is not typical with a product that is mass-produced in high-volume.

It is also well known that certain polymer gels exhibit reversible phase transition in that they reversibly swell and collapse (i.e., expand and shrink) upon exposure to and removal of predetermined stimuli. By way of example only, a swollen stimulus sensitive gel can be made to undergo its phase transition and shrink upon increasing its temperature above its predetermined temperature (i.e., its predetermined stimulus or its trigger stimulus). Typically, once the gel has undergone its phase transition and collapsed or shrunk in volume, that shrunken stimulus sensitive gel can be made to re-expand or re-swell again by removing the predetermined stimulus (i.e., decreasing the temperature of the shrunken stimulus sensitive gel to or below the temperature that caused it to collapse or shrink). Accordingly, it is necessary to develop indicating devices with irreversibility built into the stimulus sensitive or stimulus indicating or stimulus reactive operation of the indicator. Such irreversibility would provide a permanent indication of exposure to a predetermined stimulus, regardless of whether the predetermined stimulus is later removed.

Thus, there is a need for an indicator that indicates when a stimulus sensitive product has been exposed to a deleterious stimulus extreme, which is also referred to herein as a predetermined stimulus. There is also a need for an indicator that indicates when a stimulus sensitive product has been exposed to the deleterious stimulus extreme (i.e., a predetermined stimulus), for a predetermined amount of time.

It is also well known that swollen stimulus sensitive gels that can be engineered to undergo their phase transitions and shrink upon being exposed to its corresponding predetermined stimulus, such as an increasing temperature (also referred to herein as its trigger stimulus) are said to exhibit Lower Critical Solution Temperature behavior (abbreviated LCST). Examples of these LCST gels are described in Tanaka, "Critical Kinetics of Volume Phase Transition of Gels," Physical Review Letters 55 (1985) at 2455. As described in these references, these gels are made from crosslinked Poly(n-isopropylacrylamide) (abbreviated PNIPAAm).

It is well known that PNIPAAm gels swollen with water exist in a swollen state when held at a temperature below their transition temperature but collapse to a shrunken volume when exposed to a temperature above their transition temperature. When exposed to temperatures lower than the transition temperature, PNIPAAm molecules swell in order to maximize contact with the water molecules. However, when exposed to temperatures above the transition temperature, the PNIPAAm molecules contract in order to minimize their contact with the water molecules.

Alternatively, it is well known that the addition of monovalent salts such as Sodium Chloride to PNIPAAm hydrogels affects their transition temperatures as described in Tae Gwan Park et al "Sodium Chloride-induced phase transition in nonionic Poly(n-isopropylacrylamide) gels," Macromolecules 1993 or Yanhie Zhang et al "Specific Ion Effects on the Water Solubility of Macromolecules: PNIPAAm and the Hofemeister Series" Journal of the American Chemical Society 2005. For PNIPAAm gels held at a constant temperature, the compatibility with mixtures of Sodium Chloride and water worsens as the concentration of Sodium is increased. Specifically, as more Sodium Chloride is added into the solution, the transition temperature of the PNIPAAm hydrogel is lowered. The compatibility of PNIPAAm gels with a solution of fixed Sodium Chloride concentration in water is worsened as the temperature is increased. This relationship between Sodium Chloride concentration and temperature can be used to tune the predetermined stimulus or the trigger stimulus for a given LCST stimulus sensitive gel.

As described above, there is a need for an indicator that indicates when a stimulus sensitive product has been exposed to a deleterious stimulus extreme or predetermined stimulus. In the case of temperature, the deleterious stimulus extreme may be both a too high or too low of a temperature. For instance, it is well known that foods and pharmaceutical products will degrade at higher temperatures and require refrigeration for preservation. However, it is less intuitive that exposure to low temperatures may also be very harmful to pharmaceutical products such as vaccines. Vaccines contain colloidal Alumina particles, which promote a response of the patient to the vaccine antigen, thus improving the efficacy of the vaccine. When exposed to freezing temperatures (0° C. or lower), the colloidal Alumina particles are destabilized. As a result the desired patient response is not achieved when the vaccine is administered to the patient.

The transition of an LCST stimulus sensitive gel between a swollen volume state at low temperature and shrunken volume state at high temperature is reversible. This means that if a LCST stimulus sensitive gel is initially held at low temperature but thereafter heated above the trigger temperature, the gel will shrink but if thereafter the temperature is lowered below the transition, the gel will swell again. What cannot be changed, however, is the directionality of the change: LCST stimulus sensitive gels will always shrink when exposed to temperatures above their trigger temperature.

In the past, we have demonstrated indicators that use LCST stimulus sensitive gels. These indicators, however, harness the shrinking of polymer gels to perform the desired indication. These indicators are ascending indicators in that they indicate exposure to temperatures higher than a prescribed transition point. The indication can be performed by a plurality of mechanisms. For example, the LCST gel may be doped with an indicating species (such as a Calcium salt) and placed in an indicator containing an indicator paper that reacts in the presence of the doping species (for instance by changing color). Initially, when the temperature is below the trigger temperature, the doping species is trapped inside the gel and remains separate from the indicator paper. However, as the LCST stimulus sensitive gel is exposed to a temperature above its transition temperature, the doping species is expelled in the ensuing swollen to collapsed transition. Once the doping species is expelled, then it is free to react with the indicator paper and cause a permanent color change. While the volume transition between a swollen and a collapsed state is reversible and the gel may re-swell once the harmful stimulus is removed, the reaction of the doping species with the indicator paper is irreversible and the change in color is permanent resulting in a permanent indication. One aspect of the mechanism behind the ascending indicator described above is that the indication is possible because of the shrinking of the stimulus sensitive LCST gel and the concomitant release of the solution imbibing the stimulus sensitive gel.

In another example of an ascending indicator containing an LCST stimulus sensitive gel, the gel in its swollen state is placed inside a specially designed housing containing two chambers which are separated by a constricting portion. The gel is anchored in one end of one of the chambers and on the opposite end in the second chamber, it is unanchored. Furthermore, there is an indication spot in this second chamber which is covered by the gel initially when the gel is found in its swollen state at temperatures below its transition temperature. However, as the gel is exposed to temperatures above its trigger temperature, the gel undergoes a swollen to shrunken transition. As it collapses, the gel is pulled past the constricting portion towards the anchored end. As a result of the shrinking, the gel uncovers the indication spot. While the volume transition between a swollen and a collapsed state is reversible and the gel may re-swell once the harmful stimulus is removed, the constricting portion is designed in such a way that it prevents the gel from re-expanding past the constricting portion and therefore from covering the indication spot once again. Therefore the indication is permanent. Another aspect of the mechanism behind the ascending indicator described above is that the indication is possible because of the shrinking of the stimulus sensitive LCST gel past the constriction portion.

The indicators described above containing LCST stimulus sensitive gels are of the ascending type, in that LCST stimulus sensitive gels provide a permanent indication in response to exposure to a temperature that is warmer than the LCST stimulus sensitive gels' transition temperature or trigger temperature. This is due to the directionality of the LCST stimulus sensitive gels volume transition: that is, the gels are swollen at low temperature but collapsed at high temperatures. However, as described above, there is a need for indicators that indicates when a stimulus sensitive product has been exposed to both a too high or too low deleterious stimulus extreme or predetermined stimulus. In the case of a LCST stimulus sensitive gel, a descending type indicator, or one that indicates exposure to too low temperatures, is possible if the mechanism of action employs the swelling aspect of a LCST stimulus sensitive gel. This means that the indicator can, for example, be able to harness the swelling aspect of a stimulus sensitive LCST gel as a result of exposure to temperatures below its trigger temperature or transition temperature.

It is also well known that swollen stimulus sensitive gels that can be engineered to undergo their phase transitions and shrink upon being exposed to its corresponding predetermined stimulus, such as a decreasing temperature (also referred to herein as its trigger stimulus) are said to exhibit Upper Critical Solution Temperature behavior (abbreviated UCST). One of ordinary skill in the art will recognize that the discussion above in which an indication device harnesses the swelling of polymer gels to provide indication of exposure to a predetermined stimulus also applies to UCST stimulus sensitive gels. However, in the case of devices employing the UCST stimulus sensitive gels, the reverse of the LCST stimulus sensitive gels holds true: descending indicators are possible that harness the shrinking aspect of UCST stimulus sensitive gels, while ascending indicators are possible that harness the swelling aspect of UCST stimulus sensitive gels.

Therefore there is not only a need for indicator designs that can harness the shrinking aspect of a stimulus sensitive gel to perform indication of exposure to harmful stimulus (i.e., an "indication of exposure"), but there is also a need for indication devices that harness the swelling aspect of a stimulus sensitive gel so as to provide the indication of exposure. Specifically, there is not only a need for indicator designs that employ LCST stimulus sensitive gels to provide an indication of exposure to temperatures above a predetermined temperature, but there is also a need for indicator designs that employ LCST stimulus sensitive gels that can provide indication of exposure to temperatures below a predetermined temperature.

SUMMARY OF THE INVENTION

The present invention includes, for example, a stimulus indicator device containing a stimulus sensitive gel, which substantially overcomes one or more of the above-mentioned problems arising from limitations and disadvantages of the related art to provide a permanent indication of exposure.

1. Embodiments with an Adhering or Latching Mechanism

To achieve these and other advantages and in accordance with the purpose of certain embodiments of the invention, as embodied and broadly described and as shown in FIG. 1A, FIG. 1B, FIG. 1C, FIG. 1D, FIG. 1E and FIG. 1F, one exemplary embodiment of the invention may include a single compartment device. Prior to exposure to a predetermined stimulus, and by way of example only as shown in this embodiment, a rectangular-shaped stimulus sensitive gel is placed in the single compartment device, and is, in some embodiments, anchored to the device. For example, the stimulus sensitive gel is anchored to the device by attaching at least a first end of the stimulus sensitive gel to at least one anchoring post, which is can be located in a first side of the compartment.

At the second or other end of the stimulus sensitive gel, the stimulus sensitive gel may be attached to it, by way of example only to a first adhering component such as a latch, or a type of latch, or a first part of a two-part or multi-part engaging mechanism or a first part of a two-part or multi-part latching mechanism (collectively referred to herein for convenience as a latch or the first adhering component or a first part of a latching mechanism). This may, for example, take the form of Velcro glued to the gel and/or for example, include the gel polymerized around the Velcro. Positioned at the other or second side of the compartment is a second adhering component, such as a catch, or a type of catch, or a second part of a two-part or multi-part engaging mechanism or a second part of a two-part or multi-part latching mechanism (collectively referred to herein for convenience as a catch or a second adhering component or a second part of a latching mechanism), all of which are collectively referred to herein as a latching mechanism. The latch attached to the second end of the stimulus sensitive gel adheres to, engages, interlocks with, or otherwise catches onto the catch. The type of the stimulus sensitive gel, as well as the type of latch attached to the stimulus sensitive gel, and/or the type of catch contained in the compartment may, for example, be dependent on the situation in which the stimulus indication device is being employed.

As one of ordinary skill in the art will appreciate, a UCST type stimulus sensitive gel may be used to provide the indication of exposure by employing an initially shrunken stimulus sensitive gel expand or swell when it is heated beyond a predetermined or trigger temperature, and thereby cover and/or obscure at least a portion of the backing layer, or cover and/or obscure at least a portion of an indicator spot located on the backing layer. Preferably, in some embodiments, the portion of the backing layer and/or the indicator spot that is at least partially, or that is, fully, covered or obscured by the expanded UCST type stimulus sensitive gel is positioned in the second side of the compartment, and is visible through the viewing window located in the top layer of the stimulus indicating device. Alternatively, an LCST type stimulus sensitive gel may be used when one wishes to have an initially shrunken stimulus sensitive gel expand or swell when it is cooled below a predetermined or trigger temperature, and thereby cover and/or obscure at least a portion of the backing layer, or cover and/or obscure at least a portion of an indicator spot located on the backing layer. Preferably, in some embodiments, the portion of the backing layer and/or the indicator spot that is at least partially, or that is fully, covered or obscured by the expanded LCST type stimulus sensitive gel is positioned in the second side of the compartment, and is visible through the viewing window located in the top layer of the stimulus indicating device.

For purposes of disclosing these exemplary embodiments and by way of example only, the gel may be initially collapsed or shrunken, and then the stimulus sensitive gel expands or swells upon exposure to its predetermined stimulus. A viewing window may be provided through which the indication of exposure can be seen in the form of a change in the status of the stimulus sensitive gel. By way of example only, the indication of exposure can be achieved by changing the volume of the stimulus sensitive gel, and can take the form of: i) the gel not being visible in the viewing window prior to exposure to a predetermined stimulus; and ii) the gel being visible in the viewing window after exposure to a predetermined stimulus. More specifically, and by way of example only, prior to the exposure to the predetermined stimulus the user could view the backing layer, and could either note the color of the backing layer; or the user could note the glyph, symbol, alphanumeric characters, or other types of indicator spots positioned on the backing layer and positioned below the viewing window. Then as the indicator device containing the stimulus sensitive gel was exposed to the predetermined stimulus, and more particularly as the stimulus sensitive gel changed volume in response to that predetermined stimulus, the initially collapsed or shrunken stimulus sensitive gel would undergo its phase transition in reaction to the predetermined stimulus. That phase change would result in the volume of the stimulus sensitive gel changing from collapsed or shrunken to expanded or swollen in reaction to the predetermined stimulus. As the stimulus sensitive gel expanded and/or swelled, it would expand from the first side of the compartment to the second side of the compartment, thereby partially covering and/or obscuring, if not fully covering and/or obscuring the backing layer or indicator spot visible through the viewing window. More specifically, as the collapsed or shrunken stimulus sensitive gel expands or swells in response to the predetermined stimulus, the shrunken stimulus sensitive gel swells in all directions but most noticeably swells in a direction towards the second side of the compartment (i.e., the shrunken stimulus sensitive gel swells in a direction opposite or away from the anchoring location at which the stimulus sensitive gel is anchored to the compartment); and this expansion or swelling results in at least a portion (and preferably, in some embodiments, the entirety) of either the backing layer or the indicator spot (depending on which is used) located in the second side of the single compartment being at least partially if not fully covered and/or obscured from the view of the user of the stimulus indicating device by that now expanded or swollen stimulus sensitive gel.

This indication of exposure in the form of a partial or preferably, in some embodiments, a full covering or obscuring of the backing layer or indicator spot by the swollen or expanded stimulus sensitive gel would be visible to the user as either a change in color, or a change in indication visible through the viewing window. Taking each separately, the indication of exposure occurring via a change in color could occur by way of example only, if the backing layer were colored a first color, and the stimulus sensitive gel were colored a second color, and when the stimulus sensitive gel at least partially and preferably, in some embodiments, fully covered the backing layer and/or indicator spot, the user views a change from a first color to a second color. Similarly, the indication of exposure taking the form of a change in indication visible through the viewing window could occur by way of example only, if the indicator spot was comprised of or contained a glyph of some sort, and the stimulus sensitive gel was opaque enough to at least partially and preferably fully cover the glyph or indicator spot, so that the user no longer can view at least a portion if not the entire indicator spot through the viewing window.

As described above, at the second end of the stimulus sensitive gel is attached the first part of an adhering component, or latch. As described herein, the complementary part of that latching mechanism or adhering mechanism, is the catch, which can be positioned at the second side of the single compartment. As the stimulus sensitive gel swells from the first side of the compartment towards the second side of the compartment, and at least partially if not fully covers the indicator spot or the backing layer, the second end of the gel onto which the latch is attached or fitted, can reach and then engage with, or hook onto, or hook into, or attach onto, or latch onto the catch or the second adhering component or second part of a latching mechanism. Once the latch located at the second end of the stimulus sensitive gel and the catch located at the second side of the compartment are engaged or attached to each other due to the swelling of the stimulus sensitive gel expanding (which results from the exposure to the predetermined stimulus), at least a portion of the stimulus sensitive gel is permanently kept in place over at least a portion of the backing layer or indicator spot visible through the viewing window, even when the predetermined stimulus is removed and the stimulus sensitive gel collapses or shrinks to its previous size, due to the first adhering component or latch permanently being adhered to, or engaged with, or latched to the second adhering component or catch. This permanent adhering of the first adhering component or latch to the second adhering component or catch ensures that the indication of exposure is permanently displayed to the user in the form of the stimulus sensitive gel permanently covering at least a portion and preferably, in some embodiments, the entire indicator spot or the portion of the backing layer visible through the viewing window.

By way of example only, a viewing window or display portion or display window may be positioned in the top layer of the device, through which an indication of exposure (by way of example only, the color change possibly arising from the covering of the backing layer or covering of the indicator spot described herein) can be seen when the stimulus sensitive gel is exposed to a predetermined stimulus, which in turn causes the stimulus sensitive gel to undergo its phase transition. As a result of the stimulus sensitive gel undergoing its phase transition in response to the predetermined stimulus, the volume of the stimulus sensitive gel may change and cover the backing layer or indicator spot positioned in the second side of the single compartment. Although either the covering of at least a portion and preferably, in some embodiments, the entirety of the backing layer or the indicator spot visible through the viewing window could provide the indication to the user that the stimulus sensitive object attached to the stimulus sensitive indicator had been exposed to the predetermined stimulus, both options will be understood to be applicable even if just the indicator spot is referred to in a description herein. Moreover, the interchangeability of the indicator spot and a portion of the backing layer can be applicable to all embodiments discussed herein that employ an indicator spot for providing the indication of exposure to the predetermined stimulus.

By way of example only, although the descriptions herein of these exemplary embodiments employ a first adhering component or latch that engages with a second adhering component or catch when the stimulus sensitive gel swells in response to a predetermined stimulus so as to permanently cover or obscure at least a portion and preferably, in some embodiments, the entire indicator spot, it is for explanatory purposes only and is not intended in anyway to be limiting. Additional liquid is available in the single compartment so as to aid the swelling of the initially shrunken stimulus sensitive gel. This liquid can be the same as the liquid inside of the stimulus sensitive gel so long as the additional liquid does not impact the operation of the stimulus sensitive gel. As the stimulus sensitive gel expands or swells, it may swell over and cover the indicator spot, which may be located below the viewing window. As the stimulus sensitive gel swells past the indicator spot, it latches onto the latching fixture on the housing to provide the permanent indication of exposure to a predetermined stimulus.

Because of the latching mechanism, once the stimulus sensitive gel has swollen to such an extent that it at least partially and preferably, in some embodiments, fully covers or obscures the portion of the backing layer visible through the viewing window, or alternatively at least partially and preferably, in some embodiments, fully covers or obscures the indicator spot visible through the viewing window, while also allowing the first adhering component of the latching mechanism to adhere to or engage with the second adhering component of the latching mechanism, the latching mechanism permanently causes the stimulus sensitive gel to cover or obscure that backing layer or indicator spot because it prevents the stimulus sensitive gel from retreating from and re-revealing or uncovering the previously covered or obscured backing layer or indicator spot when the predetermined stimulus is removed. In this way the stimulus indicating device permanently evidences that it, and the stimulus sensitive product attached to it, had been exposed to a predetermined stimulus.

The single compartment of this exemplary embodiment may, for example, be formed by the backing layer on the bottom of the device joined to an upper layer on the top of the stimulus indicating device. The upper layer of the stimulus indicating device may be formed by at least the viewing window or indicator window positioned in the top portion of the upper layer. Both the backing layer and the upper layer may, for example, be constructed of a strong, resilient leak-proof material, such as plastic or other polymer material, so as to provide for the twisting or bending that might occur during transportation of or application to the stimulus sensitive product without tearing, breaking or leaking. The upper layer and the backing layer can be comprised of any of a number of materials that have a high vapor retention including polyolefins, such as polyethylene and polypropylene or cyclic olefin copolymers (COCs), for example, those included in the TOPAS® COC family of resins manufactured by TOPAS Inc. The backing layer and the upper layer may also be made of a material that allows them to be joined and sealed together, such as by heat stamping, sonic welding, or other suitable means. The backing layer and the upper layer may both approximate the length and width of the compartment, although variations in these dimensions are within the scope of certain embodiments of the present inventions. The upper layer may be made of a clear material, such as plastic, so that the user of the stimulus indicating device can view at least some portion of the backing layer and/or the indicator spot if employed (preferably in the second side of the compartment). The upper layer may also be able to accept paint or ink so as to allow for coloring or concealing at least some portion of the compartment (preferably concealing the first side of the compartment). Alternately, while the upper and backing layer may be made of a plastic material and assembled together to form the compartment, the plastic layers need not be welded or permanently bonded to form the compartment, and in this case the compartment is placed inside a sealed pouch made from a high moisture barrier material.

Although at least some portion of the upper layer may also accept paint or ink for coloring, the viewing window or indicator window portion of the upper layer should remain free from ink or coloring so that the user of the stimulus indicating device may observe or view the second side of the compartment through the viewing window or indicator window, as explained herein. The backing layer may, for example, also be able to accept paste, glue or other suitable adhesive on its bottom side (i.e., the surface not facing the compartment), so as to allow it to be attached to a stimulus sensitive product. Moreover, as described herein, a portion of the backing layer (located on the side of the backing layer facing the upper layer) can be used in place of the indicator spot to provide the indication of exposure (i.e., indicate to the user of the stimulus sensitive device, that the stimulus sensitive object had been exposed to the predetermined stimulus).

The stimulus sensitive gel can be attached in at least one, and more than one attachment point or anchoring location, and this attachment point(s) or anchoring location(s) may be located in the first side of the compartment (i.e., opposite the location of the indicator window). This way, the stimulus sensitive gel may be secured to one location within the compartment and cannot float or move within the compartment and unintentionally cover up the indicator spot or backing layer.

2. Embodiments with Hooks and Holes: Anchored Gel

To achieve these and other advantages and in accordance with the purpose of certain embodiments of the invention, as embodied and broadly described and as shown in FIG. 2A, FIG. 2B, FIG. 2C, FIG. 2D, FIG. 2E, and FIG. 2F, another embodiment of the invention may accomplished as set forth herein.

This second embodiment of the stimulus indicating device that provides the indication of exposure to a predetermined stimulus can also be accomplished with a stimulus sensitive gel that can be rectangular in shape. In manufacturing or assembling this second embodiment of the stimulus indicating device, the stimulus sensitive gel can be placed in the single compartment housing, with a first end of the stimulus sensitive gel being anchored in place at a first side of the compartment. A hole can be punched into the second end of the stimulus sensitive gel (i.e., the end opposite to the end of the stimulus sensitive gel being anchored to the first side of the compartment). The hole can have any number of shapes, including a rectangular shape. By way of example only, if a rectangular shaped hole is selected, its long axis may be either parallel or perpendicular to the long axis of the stimulus sensitive gel. Alternatively, the hole in the stimulus sensitive gel may be circular. One aspect of the hole in the stimulus sensitive gel to be appreciated is that it should, for some embodiments, be able to catch onto a hook that is formed into the second side of the compartment.

As one of ordinary skill in the art will appreciate, a UCST type stimulus sensitive gel may be used to provide the indication of exposure by employing an initially shrunken stimulus sensitive gel expand or swell when it is heated beyond a predetermined or trigger temperature, and thereby cover and/or obscure at least a portion of the backing layer, or cover and/or obscure at least a portion of an indicator spot located on the backing layer. The portion of the backing layer and/or the indicator spot that is at least partially, or fully, covered or obscured by the expanded UCST type stimulus sensitive gel can be positioned in the second side of the compartment, and can be visible through the viewing window located in the top layer of the stimulus indicating device. Alternatively, an LCST type stimulus sensitive gel may be used when one wishes to have an initially shrunken stimulus sensitive gel expand or swell when it is cooled below a predetermined or trigger temperature, and thereby cover and/or obscure at least a portion of the backing layer, or cover and/or obscure at least a portion of an indicator spot located on the backing layer. The portion of the backing layer and/or the indicator spot that can be at least partially, or fully, covered or obscured by the expanded LCST type stimulus sensitive gel is positioned in the second side of the compartment, and is visible through the viewing window located in the top layer of the stimulus indicating device.

For purposes of disclosing this embodiment and by way of example only, in this embodiment the gel may be initially collapsed or shrunken, and then the stimulus sensitive gel expands or swells upon exposure to its predetermined stimulus. A viewing window may be provided through which the indication of exposure can be seen in the form of a change in the status of the stimulus sensitive gel. By way of example only, the indication of exposure can be achieved by changing the volume of the stimulus sensitive gel, and can take the form of: i) the gel not being visible in the viewing window prior to exposure to a predetermined stimulus; and ii) the gel being visible in the viewing window after exposure to a predetermined stimulus. More specifically, and by way of example only, prior to the exposure to the predetermined stimulus the user could view the backing layer, and could either note the color of the backing layer; or the user could note the glyph, symbol, alphanumeric characters, or other types of indicator spots positioned on the backing layer and positioned below the viewing window. Then as the indicator device containing the stimulus sensitive gel was exposed to the predetermined stimulus, and more particularly as the stimulus sensitive gel changed volume in response to that predetermined stimulus, the initially collapsed or shrunken stimulus sensitive gel would undergo its phase transition in reaction to the predetermined stimulus. That phase change would result in the volume of the stimulus sensitive gel changing from collapsed or shrunken to expanded or swollen in reaction to the predetermined stimulus. As the stimulus sensitive gel expanded and/or swelled, it would expand from the first side of the compartment to the second side of the compartment, thereby partially covering and/or obscuring, if not fully covering and/or obscuring the backing layer or indicator spot visible through the viewing window. More specifically, as the collapsed or shrunken stimulus sensitive gel expands or swells in response to the predetermined stimulus, the shrunken stimulus sensitive gel swells in all directions but most noticeably swells in a direction towards the second side of the compartment (i.e., the shrunken stimulus sensitive gel swells in a direction opposite or away from the anchoring location at which the stimulus sensitive gel is anchored to the compartment); and this expansion or swelling results in at least a portion (and preferably, in some embodiments, the entirety) of either the backing layer or the indicator spot (depending on which is used) located in the second side of the single compartment being at least partially if not fully covered and/or obscured from the view of the user of the stimulus indicating device by that now expanded or swollen stimulus sensitive gel.

This indication of exposure in the form of a partial or a full covering or obscuring of the backing layer or indicator spot by the swollen or expanded stimulus sensitive gel would be visible to the user as either a change in color, or a change in indication visible through the viewing window. Taking each separately, the indication of exposure occurring via a change in color could occur by way of example only, if the backing layer were colored a first color, and the stimulus sensitive gel were colored a second color, and when the stimulus sensitive gel at least partially and may be fully covered the backing layer and/or indicator spot, the user views a change from a first color to a second color. Similarly, the indication of exposure taking the form of a change in indication visible through the viewing window could occur by way of example only, if the indicator spot was comprised of or contained a glyph of some sort, and the stimulus sensitive gel was opaque enough to at least partially and may be fully cover the glyph or indicator spot, so that the user no longer can view at least a portion if not the entire indicator spot through the viewing window.

As the stimulus sensitive gel expands or swells in response to the predetermined stimulus away from the anchoring location of the rectangular-shaped gel, the gel swells over the indicator spot or over the upper layer of the backing. As described above, a female portion, or receiving portion or hole portion (for ease of reference only, a "hole") can be established in the stimulus sensitive gel wherein that hole can be positioned near the second end of the stimulus sensitive gel. A corresponding male portion, or protrusion portion, or hook portion that is curved or ramped so as to catch, pull, hold, suspend, snare or trap the stimulus sensitive gel and does so at the hole portion of the stimulus sensitive gel, can be positioned at the second side of the compartment (i.e., the side of the compartment that is opposite to the side where the gel is anchored). The hook can have an angled portion or an inclined portion on its side facing away from the first side of the compartment, that serves to better ensure or prevent the stimulus sensitive gel from disengaging from the hook portion When the stimulus sensitive gel is at least partially expanded, the hole portion positioned at the second end of the stimulus sensitive gel will reach the hook portion; and the hole portion can be large enough for the hook portion to pass at least partially through the hole portion and may be large enough for the entirety of the hook portion to pass completely through the hole portion, so that the stimulus sensitive gel can form a collar around the hook portion, thereby surrounding the hook portion.

The stimulus sensitive gel should have been designed so that when it swells and expands far enough so as to surround the hook portion via the hole portion, the stimulus sensitive gel also expands far enough so as to at least partially and may fully cover and obscure at least a portion of the backing layer visible to the user through the viewing window, or at least partially and may fully cover and obscure the indicator spot visible to the user through the viewing window.

A point to be appreciated about the interaction between the hole portion and the hook portion is that once the stimulus sensitive gel is positioned around or surrounds the hook portion, or if even just a portion of the stimulus sensitive gel is below the angle or inclined portion of the hook portion, because the hook portion has at least partially and may fully protruded through the hole portion, the stimulus sensitive gel is prevented by the hook portion from retreating to the first side of the compartment. Instead, in the event that the predetermined stimulus is removed and the stimulus sensitive gel begins to shrink or collapse, the hook portion can, in some embodiments, ensure that the stimulus sensitive gel is caught or pulled or held or trapped near the second side of the compartment, and as such the stimulus sensitive gel is prevented from substantially retreating towards the first side of the compartment.

The portion of the backing layer visible to the user or the indicator spot visible to the user through the viewing window is positioned between the hook portion and the end of the second side of the compartment. Alternatively, the portion of the backing layer visible to the user or the indicator spot visible to the user through the viewing window is positioned between the end of the first side of the compartment and the hook portion. Regardless of its position, what should be appreciated is that once the portion of the backing layer visible to the user or the indicator spot is at least partially or may fully covered or obscured by the expanded stimulus sensitive gel, when the predetermined stimulus is removed and the stimulus sensitive gel shrinks or collapses (even to its original fully shrunken or collapsed state), the hook portion ensures that at least a part of that stimulus sensitive gel remains near or in the second side of the compartment so as to ensure that at least a part of that stimulus sensitive gel continues to cover or obscure at least some part of the portion of the backing layer visible to the user, or continues to cover at least some part the indicator spot, so as to ensure that the indication of exposure displayed by the indicator device is permanent. Even if the entirety of the hook portion is not surrounded by the stimulus sensitive gel, the purpose of this embodiment of the present invention as described herein may, for example, have been achieved if only a portion of the stimulus sensitive gel contacting the hook portion and that is partially if not fully covering or obscuring the portion of the backing layer visible to the user or the indicator spot, and that portion of the stimulus indicating gel is prevented from retreating to the first side of the compartment, and thereby uncovering or unobscuring that portion of the backing layer or indicator spot, when the predetermined stimulus is removed. In this way the stimulus indicating device permanently shows that it, and the stimulus sensitive product likely attached to it, had been exposed to a predetermined stimulus.

Furthermore, guiding pins or rails may be built or formed in the compartment to guide the swelling of the stimulus sensitive gel such that as the stimulus sensitive gel swells, it does so in an orientation that aids or guides the hole portion to the hook portion, and so that the outer boundary of the hook portion is surrounded by the stimulus sensitive gel, but wherein at least the hole portion can hook or seat onto the hook portion in the compartment.

By way of example only, a viewing window or display portion or display window may be positioned in the top layer of the device, through which an indication of exposure (by way of example only, the color change possibly arising from the covering of the backing layer or covering of the indicator spot described herein) can be seen when the stimulus sensitive gel is exposed to a predetermined stimulus, which in turn causes the stimulus sensitive gel to undergo its phase transition. As a result of the stimulus sensitive gel undergoing its phase transition in response to the predetermined stimulus, the volume of the stimulus sensitive gel may change and cover the backing layer or indicator spot that may be positioned in the second side of the single compartment. Although either the covering of at least a portion and preferably, in some embodiments, the entirety of the backing layer or the indicator spot visible through the viewing window could provide the indication to the user that the stimulus sensitive object attached to the stimulus sensitive indicator had been exposed to the predetermined stimulus, both options will be understood to be applicable even if just the indicator spot is referred to in a description herein. Moreover, the interchangeability of the indicator spot and a portion of the backing layer can be applicable to all embodiments discussed herein that employ an indicator spot for providing the indication of exposure to the predetermined stimulus.

Liquid is added into the single compartment so as to aid the swelling of the initially shrunken stimulus sensitive gel. The liquid that is added is the same as and may be added in addition to the liquid inside of the stimulus sensitive gel so long as the additional liquid does not impact the operation of the stimulus sensitive gel.

The single compartment of an exemplary embodiment may, for example, be formed by the backing layer on the bottom of the device joined to an upper layer on the top of the stimulus indicating device. The upper layer of the stimulus indicating device may be formed by at least the viewing window or indicator window positioned in the top portion of the upper layer. Both the backing layer and the upper layer may, for example, be constructed of a strong, resilient leak-proof material, such as plastic or other polymer material, so as to provide for the twisting or bending that might occur during transportation of or application to the stimulus sensitive product without tearing, breaking or leaking. The upper layer and the backing layer are comprised of any of a number of materials that have a high vapor retention including polyolefins such as polyethylene and polypropylene or cyclic olefin copolymers (COCs), for example, those included in the TOPAS® COC family of resins manufactured by TOPAS Inc. The backing layer and the upper layer may also be made of a material that allows them to be joined and sealed together, such as by heat stamping, sonic welding, or other suitable means. The backing layer and the upper layer may both approximate the length and width of the compartment, although variations in these dimensions are within the scope of certain embodiments of the present inventions. The upper layer may be made of a clear material, such as plastic, so that the user of the stimulus indicating device can view at least some portion of the backing layer and/or the indicator spot if employed (preferably in the second side of the compartment). The upper layer may also be able to accept paint or ink so as to allow for coloring or concealing at least some portion of the compartment (preferably concealing the first side of the compartment). Alternately, while the upper and backing layer may be made of a plastic material and assembled together to form the compartment, the plastic layers need not be welded or permanently bonded to form the compartment and in this case the compartment is placed inside a sealed pouch made from a high moisture barrier material.

Although at least some portion of the upper layer may also accept paint or ink for coloring, the viewing window or indicator window portion of the upper layer should remain free from ink or coloring so that the user of the stimulus indicating device may observe or view the second side of the compartment through the viewing window as explained herein. The backing layer may, for example, also be able to accept paste, glue or other suitable adhesive on its bottom side (i.e., the surface not facing the compartment), so as to allow it to be attached to a stimulus sensitive product. Moreover, as described herein, a portion of the backing layer (located on the side of the backing layer facing the upper layer) can be used in place of the indicator spot to provide the indication of exposure (i.e., indicate to the user of the stimulus sensitive device, that the stimulus sensitive object had been exposed to the predetermined stimulus).

The stimulus sensitive gel can be attached in at least one, and more than one attachment point or anchoring location, and this attachment point(s) or anchoring location(s) may be located in the first side of the compartment (i.e., opposite the location of the indicator window). This way, the stimulus sensitive gel may be secured to one location within the compartment and cannot float or move within the compartment and unintentionally cover up the indicator spot or backing layer.

3. Embodiments with Gels that Move Through an Opening

To achieve these and other advantages and in accordance with the purpose of certain embodiments of the invention, as embodied and broadly described and as shown in FIG. 3A, FIG. 3B, FIG. 3C, FIG. 3D, FIG. 3E, and FIG. 3F, another embodiment of the invention may be comprised of (among other things) a single compartment device that contains the stimulus sensitive gel that is shaped so as to contain a base section, a mid section and top section. The base section of the stimulus sensitive gel is larger than the top section. The mid section of the stimulus sensitive gel has at least one or more lateral extensions or wings or similar features that protrude from at least one side of the stimulus sensitive gel at its mid section. Further, there can be a hole portion positioned in the mid section of the stimulus sensitive gel. The hole portion can be shaped like a rectangle, and the long axis of the hole portion can be parallel to the long axis of the stimulus sensitive gel.

The single compartment can contain pins, and the pins are spaced apart enough so as to create an opening between the pins; wherein the pins are employed to guide the movement of the stimulus sensitive gel through or within the compartment. The pins can have a circular cross-section. Specifically, the tips of the wing or wings can be located in the mid section of the gel touch at least the outer edge of the pins. The dimension between one wing tip and the later wall of the mid section, or the dimension between the at least two wing tips, is sized to at least match or be larger than the opening between the pins; wherein the intent that this dimension of the mid section of the stimulus sensitive gel cause friction between the pins and the that mid section of the stimulus sensitive gel.

Prior to exposure to a predetermined stimulus, the stimulus sensitive gel is placed in the compartment so as to be in actual contact with the guiding pins. The stimulus sensitive gel is placed such that its base section is placed at the first side of the compartment (i.e., the side of the compartment that is opposite the side of the compartment having both the indicator spot and viewing window). A hook portion is also formed in the compartment and is positioned near or in the second side of the compartment, which is near the indicator spot or near the viewing window.

As one of ordinary skill in the art will appreciate, a UCST type stimulus sensitive gel may be used to provide the indication of exposure by employing an initially shrunken stimulus sensitive gel expand or swell when it is heated beyond a predetermined or trigger temperature, and thereby cover and/or obscure at least a portion of the backing layer, or cover and/or obscure at least a portion of an indicator spot located on the backing layer. The portion of the backing layer and/or the indicator spot that is at least partially, or that is more fully, covered or obscured by the expanded UCST type stimulus sensitive gel can be positioned in the second side of the compartment, and is visible through the viewing window located in the top layer of the stimulus indicating device. Alternatively, an LCST type stimulus sensitive gel may be used when one wishes to have an initially shrunken stimulus sensitive gel expand or swell when it is cooled below a predetermined or trigger temperature, and thereby cover and/or obscure at least a portion of the backing layer, or cover and/or obscure at least a portion of an indicator spot located on the backing layer. The portion of the backing layer and/or the indicator spot that is at least partially, or that is fully, covered or obscured by the expanded LCST type stimulus sensitive gel can be positioned in the second side of the compartment, and is visible through the viewing window located in the top layer of the stimulus indicating device.

For purposes of disclosing this embodiment and by way of example only, in this embodiment the gel may be initially collapsed or shrunken, and then the stimulus sensitive gel expands or swells upon exposure to its predetermined stimulus. A viewing window may be provided through which the indication of exposure can be seen in the form of a change in the status of the stimulus sensitive gel. By way of example only, the indication of exposure can be achieved by changing the volume of the stimulus sensitive gel, and can take the form of: i) the gel not being visible in the viewing window prior to exposure to a predetermined stimulus; and ii) the gel being visible in the viewing window after exposure to a predetermined stimulus. More specifically, and by way of example only, prior to the exposure to the predetermined stimulus the user could view the backing layer, and could either note the color of the backing layer; or the user could note the glyph, symbol, alphanumeric characters, or other types of indicator spots positioned on the backing layer and positioned below the viewing window. Then as the indicator device containing the stimulus sensitive gel was exposed to the predetermined stimulus, and more particularly as the stimulus sensitive gel changed volume in response to that predetermined stimulus, the initially collapsed or shrunken stimulus sensitive gel would undergo its phase transition in reaction to the predetermined stimulus. That phase change would result in the volume of the stimulus sensitive gel changing from collapsed or shrunken to expanded or swollen in reaction to the predetermined stimulus. As the stimulus sensitive gel expanded and/or swelled, it would expand from the first side of the compartment to the second side of the compartment, thereby partially covering and/or obscuring, if not fully covering and/or obscuring the backing layer or indicator spot visible through the viewing window. More specifically, as the collapsed or shrunken stimulus sensitive gel expands or swells in response to the predetermined stimulus, the shrunken stimulus sensitive gel swells in all directions but most noticeably swells in a direction towards the second side of the compartment (i.e., the shrunken stimulus sensitive gel swells in a direction opposite or away from the anchoring location at which the stimulus sensitive gel is anchored to the compartment); and this expansion or swelling results in at least a portion (and the entirety) of either the backing layer or the indicator spot (depending on which is used) located in the second side of the single compartment being at least partially if not fully covered and/or obscured from the view of the user of the stimulus indicating device by that now expanded or swollen stimulus sensitive gel.

This indication of exposure in the form of a partial or a full covering or obscuring of the backing layer or indicator spot by the swollen or expanded stimulus sensitive gel would be visible to the user as either a change in color, or a change in indication visible through the viewing window. Taking each separately, the indication of exposure occurring via a change in color could occur by way of example only, if the backing layer were colored a first color, and the stimulus sensitive gel were colored a second color, and when the stimulus sensitive gel at least partially or fully covered the backing layer and/or indicator spot, the user views a change from a first color to a second color. Similarly, the indication of exposure taking the form of a change in indication visible through the viewing window could occur by way of example only, if the indicator spot was comprised of or contained a glyph of some sort, and the stimulus sensitive gel was opaque enough to at least partially or fully cover the glyph or indicator spot, so that the user no longer can view at least a portion if not the entire indicator spot through the viewing window.

As the stimulus sensitive gel expands or swells in response to the predetermined stimulus, the entirety of the stimulus sensitive gel, but more noticeably the mid section and top section of the stimulus sensitive gel, can, for example, move away from first side of the compartment and can, for example, expand towards the second side of the compartment. The base of the stimulus sensitive gel is positioned in the compartment so that it is in contact with the wall of the first side of the compartment, so as to aid in the expansion of the stimulus sensitive gel toward the second side of the compartment. As the stimulus sensitive gel expands or swells towards the second side of the compartment, it covers or obscures at least a portion or the entirety of the indicator spot or the portion of the backing layer visible to the user through the viewing window. As described herein, the compartment contains guide pins that guide direction of the expansion of the stimulus sensitive gel as it swells. And as the stimulus sensitive gel swells, it is pushed in between the guide pins due in part because the base of the stimulus sensitive gel can be abutting the wall of the first side compartment, and thus pushes against that wall of the first side of the compartment. The stimulus sensitive gel can, in some embodiments, be formed so that as one or more wings passes through the guide pins, the stimulus sensitive gel will also cover the indication spot or the portion of the backing layer visible to user through the viewing window, so as to provide the indication of exposure.

As the stimulus sensitive gel expands or swells (in response to the predetermined stimulus) away from the first side of the compartment, the gel swells over the indicator spot or over the upper layer of the backing. As described above, a female portion, or receiving portion or hole portion (for ease of reference only, a "hole") can be established in the stimulus sensitive gel wherein that hole can be positioned near the second end of the stimulus sensitive gel. A corresponding male portion, or protrusion portion, or hook portion that is curved or ramped so as to catch, pull, hold, suspend, snare or trap the stimulus sensitive gel and does so at the hole portion of the stimulus sensitive gel, can be positioned at the second side of the compartment (i.e., the side of the compartment that is opposite to the side where the gel is anchored). The hook can have an angled portion or an inclined portion on its side facing away from the first side of the compartment, that serves to better ensure or prevent the stimulus sensitive gel from disengaging from the hook portion Preferably, in some embodiments, when the stimulus sensitive gel is at least partially expanded, the hole portion positioned at the second end of the stimulus sensitive gel will reach the hook portion; and the hole portion can be large enough for the hook portion to pass at least partially through the hole portion and may be large enough for the entirety of the hook portion to pass completely through the hole portion, so that the stimulus sensitive gel can form a collar around the hook portion, thereby surrounding the hook portion.

Preferably, in some embodiments, the stimulus sensitive gel will have been designed so that when it swells and expands far enough so as to surround the hook portion via the hole portion, the stimulus sensitive gel also expands far enough so as to at least partially or fully cover and obscure at least a portion of the backing layer visible to the user through the viewing window, or at least partially or fully cover and obscure the indicator spot visible to the user through the viewing window.

A point to be appreciated about the interaction between the hole portion and the hook portion is that once the stimulus sensitive gel is positioned around or surrounds the hook portion, or if even just a portion of the stimulus sensitive gel is below the angle or inclined portion of the hook portion, because the hook portion has at least partially or fully protruded through the hole portion, the stimulus sensitive gel is prevented by the hook portion from retreating to the first side of the compartment. Instead, in the event that the predetermined stimulus is removed and the stimulus sensitive gel begins to shrink or collapse, the hook portion may ensure that the stimulus sensitive gel is caught or pulled or held or trapped near the second side of the compartment, and as such the stimulus sensitive gel is prevented from substantially retreating towards the first side of the compartment.

The portion of the backing layer visible to the user or the indicator spot visible to the user through the viewing window can be positioned between the hook portion and the end of the second side of the compartment. Alternatively, the portion of the backing layer visible to the user or the indicator spot visible to the user through the viewing window is positioned between the end of the first side of the compartment and the hook portion. Regardless of its position, what should be appreciated is that once the portion of the backing layer visible to the user or the indicator spot is at least partially or fully covered or obscured by the expanded stimulus sensitive gel, when the predetermined stimulus is removed and the stimulus sensitive gel shrinks or collapses (even to its original fully shrunken or collapsed state), the hook portion ensures that at least a part of that stimulus sensitive gel remains near or in the second side of the compartment so as to ensure that at least a part of that stimulus sensitive gel continues to cover or obscure at least some part of the portion of the backing layer visible to the user, or continues to cover at least some part the indicator spot, so as to ensure that the indication of exposure displayed by the indicator device is permanent. Even if the entirety of the hook portion is not surrounded by the stimulus sensitive gel, one purpose of this embodiment of the present invention as described herein can be achieved if only a portion of the stimulus sensitive gel contacting the hook portion and that is partially if not fully covering or obscuring the portion of the backing layer visible to the user or the indicator spot, and that portion of the stimulus indicating gel is prevented from retreating to the first side of the compartment, and thereby uncovering or unobscuring that portion of the backing layer or indicator spot, when the predetermined stimulus is removed. In this way the stimulus indicating device permanently shows that it, and the stimulus sensitive product likely attached to it, had been exposed to a predetermined stimulus.

By way of example only, a viewing window or display portion or display window may be positioned in the top layer of the device, through which an indication of exposure (by way of example only, the color change possibly arising from the covering of the backing layer or covering of the indicator spot described herein) can be seen when the stimulus sensitive gel is exposed to a predetermined stimulus, which in turn causes the stimulus sensitive gel to undergo its phase transition. As a result of the stimulus sensitive gel undergoing its phase transition in response to the predetermined stimulus, the volume of the stimulus sensitive gel may change and cover the backing layer or indicator spot positioned in the second side of the single compartment. Although either the covering of at least a portion or the entirety of the backing layer or the indicator spot visible through the viewing window could provide the indication to the user that the stimulus sensitive object attached to the stimulus sensitive indicator had been exposed to the predetermined stimulus, both options will be understood to be applicable even if, in some embodiments, just the indicator spot is referred to in a description herein. Moreover, the interchangeability of the indicator spot and a portion of the backing layer can be applicable to all embodiments discussed herein that employ an indicator spot for providing the indication of exposure to the predetermined stimulus.

Liquid is added into the single compartment so as to aid the swelling of the initially shrunken stimulus sensitive gel. The liquid that is added is the same as and may be added in addition to the liquid inside of the stimulus sensitive gel so long as the additional liquid does not impact the operation of the stimulus sensitive gel.

The single compartment of an exemplary embodiment may, for example, be formed by the backing layer on the bottom of the device joined to an upper layer on the top of the stimulus indicating device. The upper layer of the stimulus indicating device may be formed by at least the viewing window or indicator window positioned in the top portion of the upper layer. Both the backing layer and the upper layer may, for example, be constructed of a strong, resilient leak-proof material, such as plastic or other polymer material, so as to provide for the twisting or bending that might occur during transportation of or application to the stimulus sensitive product without tearing, breaking or leaking. The upper layer and the backing layer are comprised of any of a number of materials that have a high vapor retention including polyolefins, such as polyethylene and polypropylene or cyclic olefin copolymers (COCs), for example, those included in the TOPAS® COC family of resins manufactured by TOPAS Inc. The backing layer and the upper layer may also be made of a material that allows them to be joined and sealed together, such as by heat stamping, sonic welding, or other suitable means. The backing layer and the upper layer may both approximate the length and width of the compartment, although variations in these dimensions are within the scope of certain embodiments of the present inventions. The upper layer may be made of a clear material, such as plastic, so that the user of the stimulus indicating device can view at least some portion of the backing layer and/or the indicator spot if employed (preferably, in some embodiments, in the second side of the compartment). The upper layer may also be able to accept paint or ink so as to allow for coloring or concealing at least some portion of the compartment (preferably, in some embodiments, concealing the first side of the compartment). Alternately, while the upper and backing layer may be made of a plastic material and assembled together to form the compartment, the plastic layers need not be welded or permanently bonded to form the compartment and in this case the compartment is placed inside a sealed pouch made from a high moisture barrier material.

Although at least some portion of the upper layer may also accept paint or ink for coloring, the viewing window or indicator window portion of the upper layer should remain free from ink or coloring so that the user of the stimulus indicating device may observe or view the second side of the compartment through the viewing window as explained herein. The backing layer may, for example, also be able to accept paste, glue or other suitable adhesive on its bottom side (i.e., the surface not facing the compartment), so as to allow it to be attached to a stimulus sensitive product. Moreover, as described herein, a portion of the backing layer (located on the side of the backing layer facing the upper layer) can be used in place of the indicator spot to provide the indication of exposure (i.e., indicate to the user of the stimulus sensitive device, that the stimulus sensitive object had been exposed to the predetermined stimulus).

In this alternative embodiment of the invention, the stimulus sensitive gel is not attached at an attachment point. Prior to exposure to the predetermined stimulus, the base of the shrunken stimulus sensitive gel sits against the first side of the housing while the "wings" in the mid-section fit tightly between the guiding posts. The shrunken stimulus sensitive gel is maintained by a friction fit to the one or more guide pins in the compartment and therefore is prevented from floating or moving within the compartment and unintentionally covering up or obscuring the indicator spot or the portion of the backing layer visible through the viewing window.

4. Embodiments with a Magnetic Adhering Mechanism

To achieve these and other advantages and in accordance with the purpose of certain embodiments of the invention, as embodied and broadly described and as shown in FIG. 4A, FIG. 4B, FIG. 4C, FIG. 4D, FIG. 4E, FIG. 4F, FIG. 4G, and FIG. 4H an exemplary embodiment of the invention may be a single compartment device. Prior to exposure to a predetermined stimulus, and by way of example only as shown in FIG. 4A, FIG. 4B, FIG. 4C, FIG. 4D, FIG. 4E, and FIG. 4F, a rectangular-shaped stimulus sensitive gel may be placed in the single compartment device, and is, in some embodiments, anchored to the device. For example, the stimulus sensitive gel may be anchored to the device by attaching at least a first end of the stimulus sensitive gel to at least one anchoring post, which can be located in a first side of the compartment. In some embodiments, the anchoring of the stimulus sensitive gel to the anchoring post can be permanent or temporary as explained herein. As shown in FIG. 4G, and FIG. 4H, in an alternate embodiment the gel is anchored to the device by building an anchoring feature into the first end of the gel and then inserting said feature into a matching receiving portion in the device.

At the second or other end of the stimulus sensitive gel, the stimulus sensitive gel may have attached to it, by way of example only, a first adhering component such as a metal clip that possesses magnetic properties, or a type of metal clip such as metal tab that possesses magnetic properties, or a first part of a two-part or multi-part magnetic adhering mechanism (collectively referred to herein for convenience as a metal clip or the first adhering component or a first part of a magnetic adhering mechanism). This may, for example, take the form of the metal clip being glued to the stimulus sensitive gel or crimping the metal clip to the stimulus sensitive gel and/or for example, includes the stimulus sensitive gel being polymerized around the metal clip. Positioned at the other or second side of the compartment may be a second adhering component, such as a magnet, or a type of magnet, or a second part of a two-part or multi-part magnetic adhering mechanism (collectively referred to herein for convenience as a magnet or a second adhering component or a second part of a magnetic adhering mechanism), all of which are collectively referred to herein as a magnetic adhering mechanism. The magnet attached to the second end of the stimulus sensitive gel can adhere to, engage with, or otherwise attach to the metal clip. The type of the stimulus sensitive gel, as well as the type of metal clip attached to the stimulus sensitive gel, and/or the type of magnet contained in the compartment, may, for example, be dependent on the situation in which the stimulus indication device may be employed.

A UCST type stimulus sensitive gel may be used to provide the indication of exposure by employing an initially shrunken stimulus sensitive gel expand or swell when it is heated beyond a predetermined or trigger temperature, and thereby cover and/or obscure at least a portion of the backing layer, or cover and/or obscure at least a portion of an indicator spot located on the backing layer. In some embodiments, the portion of the backing layer and/or the indicator spot that is at least partially, or that is, fully, covered or obscured by the expanded UCST type stimulus sensitive gel may be positioned in the second side of the compartment, and can be visible through the viewing window located in the top layer of the stimulus indicating device. Alternatively, an LCST type stimulus sensitive gel may be used when one wishes to have an initially shrunken stimulus sensitive gel expand or swell when it is cooled below a predetermined or trigger temperature, and thereby cover and/or obscure at least a portion of the backing layer, or cover and/or obscure at least a portion of an indicator spot located on the backing layer. In some embodiments, the portion of the backing layer and/or the indicator spot that is at least partially, or that is fully, covered or obscured by the expanded LCST type stimulus sensitive gel may be positioned in the second side of the compartment, and may be visible through the viewing window located in the top layer of the stimulus indicating device.

For purposes of disclosing these exemplary embodiments and by way of example only, the gel may be initially collapsed or shrunken, and then the stimulus sensitive gel expands or swells upon exposure to its predetermined stimulus. A viewing window may be provided through which the indication of exposure can be seen in the form of a change in the status of the stimulus sensitive gel. By way of example only, the indication of exposure can be achieved by changing the volume of the stimulus sensitive gel, and can take the form of: i) the gel not being visible in the viewing window prior to exposure to a predetermined stimulus; and ii) the gel being visible in the viewing window after exposure to a predetermined stimulus. In certain embodiments, prior to the exposure to the predetermined stimulus the user can view the backing layer, and can either note the color of the backing layer; or the user can note the glyph, symbol, alphanumeric characters, or other types of indicator spots positioned on the backing layer and positioned below the viewing window. Then as the indicator device containing the stimulus sensitive gel is exposed to the predetermined stimulus, and more particularly as the stimulus sensitive gel changed volume in response to that predetermined stimulus, the initially collapsed or shrunken stimulus sensitive gel may undergo its phase transition in reaction to the predetermined stimulus. That phase change can result in the volume of the stimulus sensitive gel changing from collapsed or shrunken to expanded or swollen in reaction to the predetermined stimulus. As the stimulus sensitive gel expanded and/or swelled, it can expand from the first side of the compartment to the second side of the compartment, thereby partially covering and/or obscuring, if not fully covering and/or obscuring the backing layer or indicator spot visible through the viewing window. In certain embodiments, as the collapsed or shrunken stimulus sensitive gel expands or swells in response to the predetermined stimulus, the shrunken stimulus sensitive gel may swell in all directions but most noticeably may swell in a direction towards the second side of the compartment (i.e., the shrunken stimulus sensitive gel may swell in a direction opposite or away from the anchoring location at which the stimulus sensitive gel is anchored to the compartment); and this expansion or swelling may result in at least a portion (and in some embodiments, the entirety) of either the backing layer or the indicator spot (depending on which is used) located in the second side of the single compartment being at least partially if not fully covered and/or obscured from the view of the user of the stimulus indicating device by that now expanded or swollen stimulus sensitive gel.

In certain embodiments, this indication of exposure in the form of a partial or full covering or obscuring of the backing layer or indicator spot by the swollen or expanded stimulus sensitive gel may be visible to the user as either a change in color, or a change in indication visible through the viewing window. Taking each separately, the indication of exposure occurring via a change in color can occur if the backing layer is colored a first color, and the stimulus sensitive gel is colored a second color, and when the stimulus sensitive gel at least partially and, in some embodiments, fully covered the backing layer and/or indicator spot, the user can view a change from a first color to a second color. Similarly, the indication of exposure taking the form of a change in indication visible through the viewing window can occur, in certain embodiments, if the indicator spot is comprised of or contains a glyph of some sort, and the stimulus sensitive gel is opaque enough to at least partially or, in some embodiments, fully cover the glyph or indicator spot, so that the user no longer can view at least a portion if not the entire indicator spot through the viewing window.

In certain embodiments, the second end of the stimulus sensitive gel can be attached to the first part of an adhering component, or metal clip. In certain embodiments, the complementary part of that magnetic adhering mechanism can be the magnet, which can be positioned at the second side of the single compartment. As the stimulus sensitive gel swells from the first side of the compartment towards the second side of the compartment, and at least partially if not fully covers the indicator spot or the backing layer, the second end of the gel onto which the metal clip can be attached or fitted, can reach and then adhere to, engage with, or attach onto, or engage with the magnet or the second adhering component or the second part of a magnetic adhering mechanism due to common or advanced magnetic forces, including paramagnetism. Once the metal clip located at the second end of the stimulus sensitive gel and the magnet located at the second side of the compartment are engaged or adhere to each other due to the swelling of the stimulus sensitive gel expanding (which results from the exposure to the predetermined stimulus), at least a portion of the stimulus sensitive gel can be permanently kept in place over at least a portion of the backing layer or indicator spot visible through the viewing window, even when the predetermined stimulus is removed and the stimulus sensitive gel collapses or shrinks to its previous size, due to the first adhering component permanently being adhered to, or engaged with the second adhering component or magnet. This permanent adhering of the first adhering component or metal clip to the second adhering component or magnet may ensure that the indication of exposure is permanently displayed to the user in the form of the stimulus sensitive gel permanently covering at least a portion or, in some embodiments, the entire indicator spot or the portion of the backing layer visible through the viewing window.

In certain embodiments, a viewing window or display portion or display window may be positioned in the top layer of the device, through which an indication of exposure (by way of example only, the color change possibly arising from the covering of the backing layer or covering of the indicator spot described herein) can be seen when the stimulus sensitive gel is exposed to a predetermined stimulus, which in turn may cause the stimulus sensitive gel to undergo its phase transition. As a result of the stimulus sensitive gel undergoing its phase transition in response to the predetermined stimulus, the volume of the stimulus sensitive gel may change and cover the backing layer or indicator spot positioned in the second side of the single compartment. Although either the covering of at least a portion or, in some embodiments, the entirety of the backing layer or the indicator spot visible through the viewing window can provide the indication to the user that the stimulus sensitive object attached to the stimulus sensitive indicator has been exposed to the predetermined stimulus, both options may be understood to be applicable even if just the indicator spot is referred to in a description herein. Moreover, the interchangeability of the indicator spot and a portion of the backing layer can be applicable to most embodiments discussed herein that employ an indicator spot for providing the indication of exposure to the predetermined stimulus.

By way of example only, although the descriptions herein of these exemplary embodiments employ a first adhering component or metal clip that may engage with a second adhering component or magnet when the stimulus sensitive gel swells in response to a predetermined stimulus so as to permanently cover or obscure at least a portion or, in some embodiments, the entire indicator spot, it is for explanatory purposes only and is not intended in anyway to be limiting. Additional liquid may be available in the single compartment so as to aid the swelling of the initially shrunken stimulus sensitive gel. This liquid can be the same as the liquid inside of the stimulus sensitive gel so long as the additional liquid does not impact the operation of the stimulus sensitive gel. As the stimulus sensitive gel expands or swells, it may swell over and cover the indicator spot, which may be located below the viewing window. As the stimulus sensitive gel swells past the indicator spot, it may attach to or adhere to the magnetic fixture on the housing to provide the permanent indication of exposure to a predetermined stimulus.

In certain embodiments, because of the magnetic adhering mechanism, once the stimulus sensitive gel has swollen to such an extent that it at least partially or, in some embodiments, fully covers or obscures the portion of the backing layer visible through the viewing window, or alternatively at least partially or, in some embodiments, fully covers or obscures the indicator spot visible through the viewing window, while also allowing the first adhering component of the magnetic adhering mechanism to adhere to or engage with the second adhering component of the magnetic adhering mechanism, the magnetic adhering mechanism may permanently cause the stimulus sensitive gel to cover or obscure that backing layer or indicator spot because it prevents the stimulus sensitive gel from retreating from and re-revealing or uncovering the previously covered or obscured backing layer or indicator spot when the predetermined stimulus is removed. In this way the stimulus indicating device may permanently evidence that it, and the stimulus sensitive product attached to it, has been exposed to a predetermined stimulus.

The single compartment of this exemplary embodiment may, for example, be formed by the backing layer on the bottom of the device joined to an upper layer on the top of the stimulus indicating device. The upper layer of the stimulus indicating device may be formed by at least the viewing window or indicator window positioned in the top portion of the upper layer. Both the backing layer and the upper layer may, for example, be constructed of a strong, resilient leak-proof material, such as plastic or other polymer material, so as to provide for the twisting or bending that might occur during transportation of or application to the stimulus sensitive product without tearing, breaking or leaking. The upper layer and the backing layer can be comprised of any of a number of materials that have a high vapor retention including polyolefins, such as polyethylene and polypropylene or cyclic olefin copolymers (COCs), for example, those included in the TOPAS® COC family of resins manufactured by TOPAS Inc. The backing layer and the upper layer may also be made of a material that allows them to be joined and sealed together, such as by heat stamping, sonic welding, or other suitable means. The backing layer and the upper layer may both approximate the length and width of the compartment, although variations in these dimensions are within the scope of certain embodiments of the present inventions. The upper layer may be made of a clear material, such as plastic, so that the user of the stimulus indicating device can view at least some portion of the backing layer and/or the indicator spot if employed (possibly in the second side of the compartment). The upper layer may also be able to accept paint or ink so as to allow for coloring or concealing at least some portion of the compartment (possibly concealing the first side of the compartment). Alternately, while the upper and backing layer may be made of a plastic material and assembled together to form the compartment, the plastic layers need not be welded or permanently bonded to form the compartment and in this case the compartment is placed inside a sealed pouch made from a high moisture vapor retention material.

In certain embodiments, although at least some portion of the upper layer may also accept paint or ink for coloring, the viewing window or indicator window portion of the upper layer may remain free from ink or coloring so that the user of the stimulus indicating device may observe or view the second side of the compartment through the viewing window or indicator window, as explained herein. The backing layer may, for example, also be able to accept paste, glue or other suitable adhesive on its bottom side (i.e., the surface not facing the compartment), so as to allow the backing layer to be attached to a stimulus sensitive product. Moreover, as described herein, a portion of the backing layer (located on the side of the backing layer facing the upper layer) can be used in place of the indicator spot to provide the indication of exposure (i.e., indicate to the user of the stimulus sensitive device, that the stimulus sensitive object has been exposed to the predetermined stimulus).

In certain embodiments, the stimulus sensitive gel can be attached in at least one, and more than one attachment point or anchoring location, and this attachment point(s) or anchoring location(s) may be located in the first side of the compartment (i.e., opposite the location of the indicator window). This way, the stimulus sensitive gel may be secured to one location within the compartment and cannot float or move within the compartment and unintentionally cover up the indicator spot or backing layer.

In certain embodiments, the end of the stimulus sensitive gel that is attached to one or more attachment points or anchoring locations may have an opening that allows the stimulus sensitive gel to disengage or release from the attachment points or anchoring locations when the previously swollen stimulus sensitive gel begins to shrink or collapse due to the removal of the predetermined stimulus. Due to the strength of the adherence between the first and second adhering components of the magnetic adhering mechanism, when the stimulus sensitive gel shrinks, the first and second adhering components may remain attached and the stimulus sensitive gel may pull out from the anchoring locations. Having the previously swollen but now collapsing stimulus sensitive gel disengage or release from the attachment points or anchoring locations may aid in preventing the collapsing stimulus sensitive gel from tearing as it collapses (which can lead to false negative or even false positive indications).

Time Lapse Function of the Stimulus Indicator and its Tuning.

An advantage of using any of the various embodiments of the stimulus indicating device of the invention is that the embodiments can allow for tuning of the stimulus indicating device such that a predetermined stimulus (by way of example only, a predetermined temperature) can occur for just less than a predetermined period of time, and no indication of exposure will occur in or on the stimulus indicating device. Only after the stimulus indicating device had remained at the predetermined stimulus for the entire required predetermined period of time, would the stimulus indicating device provide a permanent indication that exposure to that predetermined stimulus had occurred. The tuning for a time lapse function can be done by adjusting an attribute of the stimulus sensitive gel, or the length/distance for the stimulus sensitive gel to swell, or the tightness with which the anchoring feature on the gel fits into the receiving portion in the single compartment such that a permanent indication can occur. This time lapse function capability of the stimulus indicating device prior to showing a permanent indication of exposure to a predetermined stimulus reduces the possibility for false indications of exposure.

For example, a vaccine may spoil at 1° C. (the predetermined stimulus). However, the vaccine may not spoil immediately upon exposure at 1° C. but only if the exposure, by way of example only, lasts three or more hours. Thus, if a given predetermined stimulus stops or ceases prior to the three hour mark, there would not be a false positive or a false indication of exposure, because the vaccine had in fact not spoiled as a result of exposure to the temperature of 1° C. for less than three hours. Providing the stimulus indicating device with the time lapse function/capability can be useful in that the stimulus indicating device does not display to the user an indication of exposure to the predetermined stimulus unless the exposure to the predetermined stimulus occurred both at a predetermined temperature (by way of example only, 1° C.) for at least a predetermined time period (by way of example only, three hours). By way of example only, if the time lapse function capability of the stimulus indicating device is set to be 1° C. at least for three hours of exposure, the stimulus indicating device embodiments discussed herein will not provide a permanent indication of exposure if that predetermined stimulus of 1° C. only lasted ninety minutes. However, a predetermined stimulus greater than 1° C. for less than three hours can provide a permanent indication of exposure.

This time lapse function/capability is unlike currently available stimulus indicators that are only able to provide an indication immediately or nearly immediately upon exposure to the predetermined stimulus beyond a predetermine temperature. Exemplary embodiments of the invention do not provide an indication until after that predetermined stimulus lasted for a predetermined amount of time. For example, embodiments of the invention can be tuned to provide an indication of exposure to <1° C. for a period of time as small as 20 minutes, or as large as several hours. Thus, until the predetermined amount of time had been reached while at or above the pre-determined temperature, embodiments of invention would not provide an indication of exposure; and an indication of exposure would only occur after the full time at the predetermined temperature had been satisfied.

This "non-indication" by exemplary embodiments of the invention until the exposure to the predetermined temperature occurs for the predetermined amount of time, is an aspect not found in other prior art stimulus indicating devices. Currently available prior art stimulus indicating devices can be simply seen as "spike indicators", in that an indication of an exposure to a temperature excursion begins immediately upon being exposed to the predetermined temperature. Such an immediate indication upon exposure to the predetermined temperature, is what cause these spike indicators to provide a "false positive." Such false positives can indicate that temperature sensitive pharma has been rendered ineffective, when in fact the temperature sensitive pharma is still viable because the Time of temperature exposure had not lasted long enough to negatively impact the temperature sensitive pharma.

For example, as shown in FIG. 5A, the 3M FreezeWatch® indicator provides an indication immediately upon exposure to the predetermined temperature. There is no mechanism to engineer a "time element" into the device because once the liquid inside the indicator reaches 0° C., the chemical properties of the liquid cause it to freeze and break the glass tube (thereby providing the indication).

Similarly, the TempTime FREEZEmarker®, as shown in FIG. 5B, starts to provide the indication of exposure as soon as a temperature stimulus excursion begins below a predetermined temperature. The indication of exposure is caused by the chemical reaction of the liquid contained in the indicator. Specifically, as the chemical is chilled, the colloidal dispersion contained in that liquid begins to precipitate. As the precipitation continues, the precipitate blocks the view of the green circle containing the white check mark (shown on the left). This precipitation and blocking of the green circle begins immediately upon exposure to the pre-determined temperature, and hence there is no Time element to the indication. And due to the chemical operation of that colloidal suspension precipitating out immediately, it is impossible to prevent the precipitation from occurring for any amount of time.

The same is true of the TempTime HEATmarker® indicator, in that the chemical composition of that indicator starts darkening immediately upon exposure to the predetermined temperature. And because of its chemical composition, the HEATmarker® is unable to prevent the start of the indication of exposure to a temperature excursion for any amount of time once the HEATmarker® indicator is exposed to a stimulus temperature above its pre-determined temperature. The HEATmarker® indicator can start changing color before a stimulus temperature reaches the pre-determined "trigger" temperature.

In all the exemplary embodiments of the invention, it is possible to introduce a time lapse function. The time lapse function is a result of the time that the initially shrunken gel takes to swell over and cover an indication spot as a result of exposure to the predetermined stimulus. The time the gel takes to swell over the indication spot is dependent on both gel thickness and gel swelling percentage required. As described in Tanaka et al., "Critical Kinetics of Volume Phase Transition of Gels" Physical Review Letters volume 55 at 2455 to 2458, the rate at which a stimulus sensitive gel swells or de-swells is inversely proportional to the squared of the smallest dimension of the stimulus sensitive gel. In the case of a rectangular shaped gel, the smallest dimension would be the thickness of the gel. As an illustrative example, when two rectangular shaped stimulus sensitive gels are compared, both identical in their width and length but one being half as thick as the other, the thicker of the two gels may swell or shrink at a quarter of the rate of the thinner gel. Thus, by controlling the thickness of the gel one can control the rate of swelling of the gel and therefore the time lapse function of the stimulus indicating device.

In all these embodiments, the indication is carried out when the initially shrunken stimulus sensitive gel swells enough to cover an indicator spot or the upper portion of the backing layer of the stimulus indicating device. In order for the initially shrunken stimulus sensitive gel to cover the indication spot completely, it may, in some embodiments, attain a swelling degree or swelling percentage. This percentage can be manipulated by how far the indicator spot is positioned from the second end or free end of the stimulus sensitive gel. By way of example only, if the initially shrunken stimulus sensitive gel is 5 centimeter long and in order to cover the indicator spot completely, it may, in some embodiments become a swollen stimulus sensitive gel that is 7 centimeters long, it can swell along its length by 40% (7 centimeters/5 centimeters=1.4). As another example, if the initially shrunken stimulus sensitive gel is 5 centimeter long and in order to cover the indicator spot completely, it can become a swollen stimulus sensitive gel that is 6 centimeters long, it can swell along its length by 20% (6 centimeters/5 centimeters=1.2).

As discussed herein, by manipulating and/or varying the degree of swelling required for the initially shrunken stimulus sensitive gel to swell and become the swollen stimulus sensitive and fully cover the indicator spot, the "time lapse function" can be calculated. Such manipulation of the degree of swelling required can be done by changing the distance between the free end of the gel and the further end of the indicator spot or upper portion of the backing layer that the gel can completely cover by either: (1) fixing the gel size and position and moving the indicator spot either closer or farther away from the gel; and (2) keeping the position of the indicator spot fixed and changing size or position of the gel.

By way of example only, when an initially shrunken stimulus sensitive gel with a thickness of approximately 500 micrometers is used in a stimulus indicating device with a predetermined stimulus of 1° C., the times required for swelling along the length of 15, 20, 30 and 40% are approximately 3, 4, 6, and 10 hours when the stimulus indicating device is exposed to a predetermined stimulus of 1° C. Thus, as can be seen from the preceding data, the time lapse function of the stimulus indicating device can be varied over a wide range of times.

While changing the length that the gel must swell is the primary mode to change the time lapse functions, there are other modes that can be varied to achieve variations in the time mode. These modes are specific to each embodiment and will be discussed below in turn for each embodiment.

BRIEF DESCRIPTION OF THE DRAWINGS

The foregoing and other objects, aspects and advantages will be better understood from the following detailed description of exemplary embodiments of the invention with reference to the drawings.

DETAILED DESCRIPTION OF CERTAIN EMBODIMENTS OF THE INVENTION

Figure 1A:
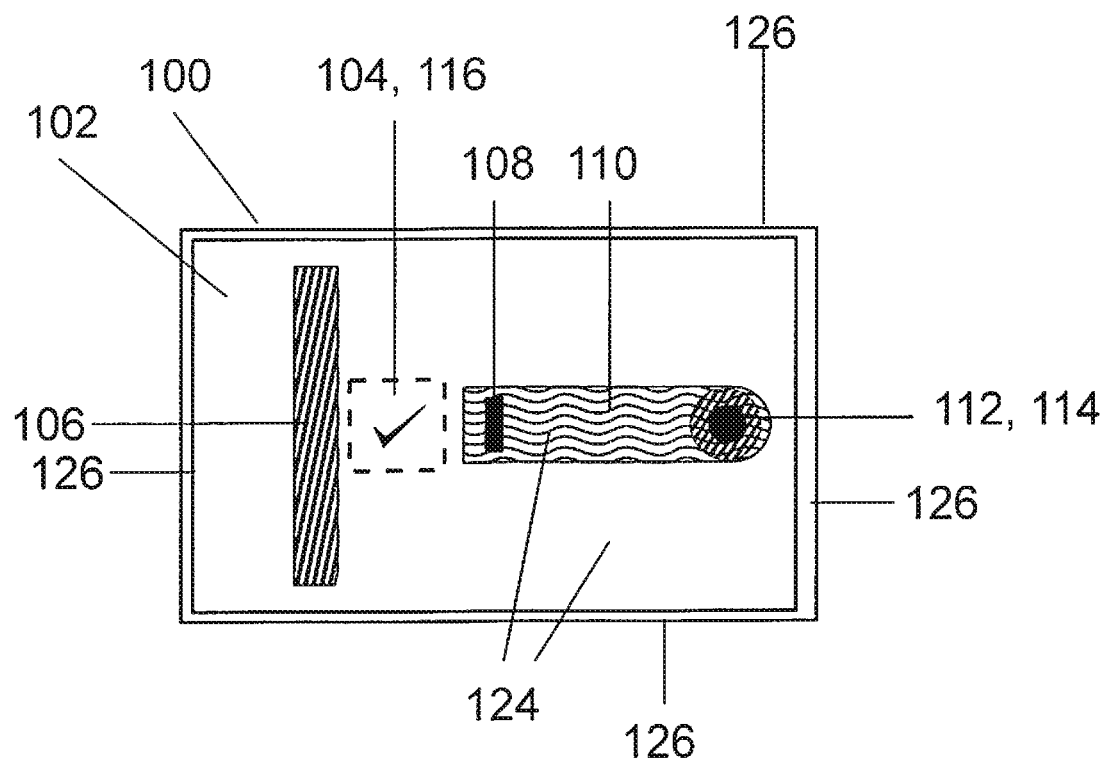
FIG. 1A is a top down view of an embodiment of the invention before exposure to a predetermined stimulus.

The expansion or swelling as well as the collapsing or shrinking of polymer gels is dictated by equilibrium thermodynamics. Therefore, a swollen stimulus sensitive gel that collapses or shrinks when undergoing its phase transition in reaction to a predetermined stimulus may expand or swell back to its original volume if that predetermined stimulus is removed. For example, when a given swollen stimulus sensitive gel is exposed to a predetermined stimulus, such as a temperature extreme, it undergoes its phase transition and collapses or shrinks in volume due to the expulsion or leaking of the fluid contained in the gel. When the predetermined stimulus is removed, the stimulus sensitive gel can undergo the reverse phase transition and collect the previously expelled liquid, thereby re-expanding or re-swelling in volume. The reverse is also true in that a shrunken stimulus sensitive gel that expands or swells when undergoing its phase transition in reaction to a predetermined trigger stimulus can collapse or shrink back to its original volume if that predetermined trigger stimulus is removed. For example, when a certain type of shrunken stimulus sensitive gel is exposed to a predetermined trigger stimulus, such as a temperature extreme, it undergoes its phase transition and expands or swells in volume due to the collection or absorption of the fluid surrounding the shrunken stimulus sensitive gel. When the predetermined stimulus is removed, the now expanded or swollen stimulus sensitive gel can undergo the reverse phase transition and expel the previously collected liquid, thereby collapsing or shrinking in volume.

Thus, the problem with the known stimulus sensitive gels is that they are reversible. Accordingly, the development of stimulus indicating devices that are irreversible is desirable. Disclosed herein are embodiments that may provide irreversible, reliable visual indication of a stimulus sensitive gel that undergoes a phase transition in response to a predetermined stimulus, and either permanently remain in that transitioned state, or permanently indicate that exposure to a predetermined stimulus occurred. The predetermined stimulus could be exposure of the stimulus sensitive gel to a certain temperature, or it could be exposure of the stimulus sensitive gel to other stimuli such as light, pH, humidity, radiation, electromagnetic radiation, visible light, radiation, solvent composition, ionic strength, etc. For sake of clarity this application will focus certain portions of its disclosure on exposure of the stimulus sensitive gel to a predetermined temperature stimulus.

Also, while indicator devices employing stimulus sensitive gels have previously been disclosed that harness the shrinking capability of stimulus sensitive gels so as to provide a permanent indication of exposure, it is desirable to prepare indicator devices that harness the swelling capability of stimulus sensitive gels in response to a predetermined temperature so as to provide the desired permanent indication of exposure. For sake of clarity this application will focus certain portions of its disclosure on indicator devices that harness the swelling capability of stimulus sensitive gels that occurs in response to the exposure of the stimulus sensitive gel to a predetermined temperature stimulus.

Furthermore, it is to be understood that both the general descriptions above and the following detailed descriptions below are exemplary only, and as such are intended to provide further explanation of certain embodiments of the inventions as claimed. As such it is understood that any and/or all of the aspects or portions of the various and alternative embodiments described herein are able to be combined, mixed and matched, etc., so that although a certain embodiment is not described herein, it is understood to be included in this disclosure.

In accordance with the purpose of certain embodiments of the invention, as embodied and broadly described herein, there are multiple categories of embodiments of the stimulus indicating device that provides an irreversible and permanent indication of exposure to a predetermined stimulus and that harness the swelling of a stimulus sensitive gel to provide that indication.

One such category of an embodiment of the present invention pertains to a stimulus indicating device that, as embodied and broadly described herein and in conjunction with at least a exemplary embodiment as disclosed in conjunction with FIG. 1A, FIG. 1B, FIG. 1C, FIG. 1D, FIG. 1E, and FIG. 1F, may employ a stimulus sensitive gel in a single compartment device, a latch or the first adhering component or a first part of a latching mechanism being attached at a second end of the stimulus sensitive gel, and when the stimulus sensitive gel swells in response to a predetermined stimulus, the latch can adhere or engage or with a corresponding catch or second adhering component or a second part of a latching mechanism in the compartment to ensure that the stimulus sensitive gel remains in its post-phase transition state so as to ensure that the indicator spot or the portion of the backing layer visible to the user through the viewing window is permanently covered or obscured and thereby permanently indicating to a user that the product likely attached to the stimulus indicating device had been exposed to a predetermined stimulus.

As embodied and broadly described herein and in conjunction with at least FIG. 2A, FIG. 2B, FIG. 2C, FIG. 2D, FIG. 2E, and FIG. 2F, another category of an embodiment of the present invention pertains to a stimulus indicating device which may employ a stimulus sensitive gel in a single compartment device, wherein the stimulus sensitive gel contains a female portion, or a receiving portion or a hole portion, and when the stimulus sensitive gel swells and at least partially or completely covers or obscures the indicator spot or the portion of the backing layer visible to the user through the viewing window, the hole portion at least partially or entirely surrounds corresponding male portion, or protrusion portion, or a hook or pin portion also in the compartment, so as to prevent the indicator spot or portion of the backing layer previously visible to the use remains permanently covered or obscured by at least a portion of the stimulus sensitive gel, thereby permanently indicating to a user that the product likely attached to the stimulus indicating device had been exposed to a predetermined stimulus.

As embodied and broadly described herein and in conjunction with at least FIG. 3A, FIG. 3B, FIG. 3C, FIG. 3D, FIG. 3E, and FIG. 3F, another category pertains to a stimulus indicating device which may employ a stimulus sensitive gel in a single compartment device, said gel consisting of a base section, a mid-section and a top-section and said gel being winged or having protrusions extending from the outer walls of the mid-section, and said gel being constrained by friction between the wing tips and guiding pins, wherein the stimulus sensitive gel contains a female portion, or a receiving portion or a hole portion in the mid-section of the gel, and when the stimulus sensitive gel swells and at least partially or completely covers or obscures the indicator spot or the portion of the backing layer visible to the user through the viewing window, the hole portion at least partially or entirely surrounds corresponding male portion, or protrusion portion, or a hook or pin portion also in the compartment, so as to prevent the indicator spot or portion of the backing layer previously visible to the use remains permanently covered or obscured by at least a portion of the stimulus sensitive gel, thereby permanently indicating to a user that the product likely attached to the stimulus indicating device had been exposed to a predetermined stimulus.

As embodied and broadly described herein and in conjunction with certain exemplary embodiments as disclosed in at least FIG. 4A, FIG. 4B, FIG. 4C, FIG. 4D, FIG. 4E, FIG. 4F, FIG. 4G, and FIG. 4H, another category pertains to a stimulus indicating device which may employ a stimulus sensitive gel in a single compartment device, a metal clip or the first adhering component or a first part of a magnetic adhering mechanism being attached at a second end of the stimulus sensitive gel, and when the stimulus sensitive gel swells in response to a predetermined stimulus, the metal clip can adhere or engage with a corresponding magnet or second adhering component or a second part of a magnetic adhering mechanism in the compartment to ensure that the stimulus sensitive gel remains in its post-phase transition state so as to ensure that the indicator spot or the portion of the backing layer visible to the user through the viewing window may be permanently covered or obscured and thereby permanently indicating to a user that the product likely attached to the stimulus indicating device has been exposed to a predetermined stimulus.

It will be understood by one of ordinary skill in the art that, for example, the differing embodiments described herein can be combined with one another to arrive at another embodiment of a stimulus indicating device that, via the use of a stimulus sensitive gel, indicates to a user that the stimulus indicating device had been exposed to a predetermined stimulus. It can also be understood that the type of stimulus sensitive gel employed in the stimulus indicating device can be either of the UCST type stimulus sensitive gel, or of the LCST type stimulus sensitive gel. For sake of convenience and by way of explanation only, the embodiments discussed herein are discussed in terms of the LCST type stimulus sensitive gels. And as is well known, when a LCST type stimulus sensitive gel is put in contact with a favorable solvent or is exposed to decreasing temperature, the polymer chains of the LCST type stimulus sensitive gel extend to maximize contact with the solvent molecules. As a result of the extension of the polymer chains, the LCST type stimulus sensitive gel made from such polymer chains swell because they absorb the solvent molecules. Conversely, when a LCST type stimulus sensitive gel is put in contact with a poor solvent or is exposed to increasing temperature, the polymer chains of that LCST type stimulus sensitive gel can, for example, shrink in order to minimize contact with the solvent molecules. The exemplary embodiments discussed herein takes advantage of these operating principles, although one of ordinary skill in the art will understand that other types of stimulus sensitive gels, such as UCST type stimulus sensitive gels can be substituted for the LCST type stimulus sensitive gels.

The LCST type stimulus sensitive gels employed in the embodiments discussed herein are alkylacrylamide type gels. These gels are composed of acrylamide polymers made from monomers bearing an alkyl group. Examples of monomers containing alkyl groups are N-isopropyl acrylamide, propyl acrylamide, and butyl acrylamide. The LCST gels se gels are preferably, in some embodiments, composed of N-isopropylacrylamide.

The N-isopropylacrylamide stimulus sensitive LCST gels are swollen in salt solutions in order to tune the temperature at which the stimulus sensitive gel may undergo its phase transition, which is referred to herein as the trigger temperature, or as the predetermined stimulus. There is an inverse relationship between aqueous salt concentration and trigger temperature meaning that as the salt concentration is raised, the stimulus sensitive gel trigger temperature is lowered. For instance, at 0 weight % salt, the stimulus sensitive gel trigger temperature is about 33° C. By comparison, at 3.6 weight % salt, the trigger temperature is 25° C. Also by comparison and by way of example only, at 14.25 weight % the trigger temperature is 2° C. Thus, the salt concentrations required for the temperature ranges that are of interest to the examples set out herein (i.e., approximately 40° C. to approximately 0° C.), range between 0 and 20 weight %.

N-isopropylacrylamide type gels can swell and may, for some embodiments, absorb solvent when exposed to a temperature below a predetermined stimulus. In the case of these N-isopropylacrylamide type of stimulus sensitive gels, water and aqueous salt solutions are a good solvent for the gel at low temperatures, but by comparison water and aqueous salt solutions become poor solvents at high temperatures. Thus, as these swollen stimulus sensitive gels are exposed to low temperatures below a predetermined stimulus, these initially shrunken stimulus sensitive gels can absorb solvent and accordingly expand or swell in volume.

As a result of the expanding or swelling in volume of the stimulus sensitive gel due to the corresponding absorption of solution (such as salt and water), the indication of exposure to a predetermined stimulus occurs by at least the stimulus sensitive gel partially or fully covering an indicator spot (or the portion of the backing layer visible to the user through the viewing window) as described for the embodiments disclosed herein (by way of example only, the embodiments employing the two-part latching mechanism, or the embodiments employing the hook portion and the corresponding hole portion, or the embodiments wherein the stimulus sensitive gel pushes through an opening).

It will be appreciated that the embodiments discussed herein employing stimulus sensitive gels that contain salt and water mixtures (such as N-isopropylacrylamide type gels) are illustrative only, and those constituent parts could be replaced by any other fluids that work for the same purpose, such as mixtures of solvents and water, or other non-polar solvents, polar solvents, etc.

1. Embodiments with an Adhering or Latching Mechanism

In accordance with the purpose of certain embodiments of the invention, as embodied and broadly described herein and in conjunction with FIG. 1A, FIG. 1B, FIG. 1C, FIG. 1D, FIG. 1E and FIG. 1F, a exemplary embodiment of the inventive stimulus indicating devices described herein can be a single compartment 102. The stimulus sensitive gel 110, 120 and 130, which can be rectangularly shaped, is placed in the compartment 102, and can have one end of the stimulus sensitive gel 110, 120 and 130 anchored to the compartment 102 by a first anchor portion 112 affixed to the stimulus sensitive gel 110, 120 and 130, and a second anchor portion 114 formed in or affixed at a first side of the compartment 102. In this exemplary embodiment, as well as in the other exemplary embodiments disclosed herein, the stimulus sensitive gel 110, 120 and 130 is wholly contained in the compartment 102 and surrounded by liquid so that the stimulus sensitive gel 110, 120 and 130 may absorb that fluid and swell for its intended purpose. If a liquid is used to aid in the swelling of the stimulus sensitive gel 110, 120 and 130, this liquid should be the same as liquid 124 swelling the gel.

Figure 1B:
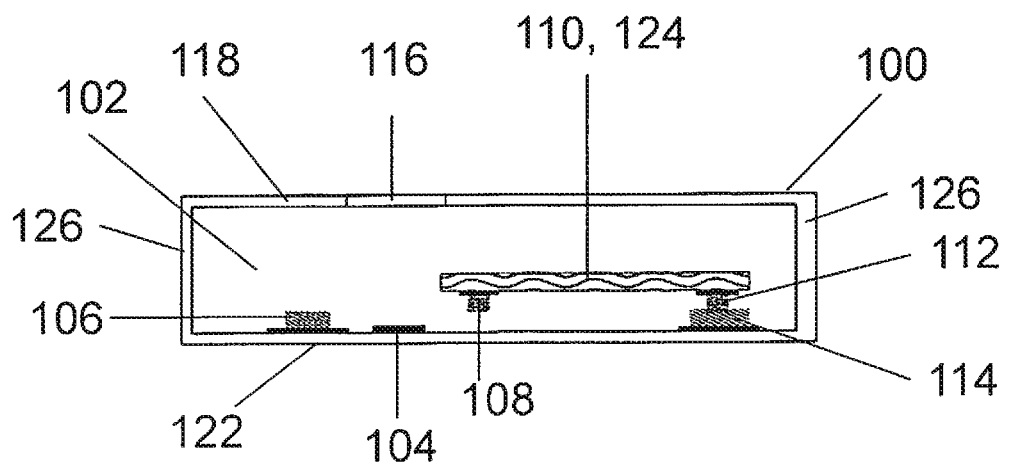
FIG. 1B is a side view of the embodiment in FIG. 1A.

An exemplary embodiment prior to exposure to the predetermined stimulus is illustrated by FIG. 1A and FIG. 1B. As shown in at least FIG. 1A and FIG. 1B, the rectangular-shaped, and shrunken, stimulus sensitive gel 110 is contained in the single compartment 102. The stimulus sensitive gel 110 can be anchored to the compartment 102 by the first anchor portion 112 and a second anchor portion 114. The first anchor portion 112 can be attached to the stimulus sensitive gel 110, which is the first end of the stimulus sensitive gel 110. The second anchor portion 114, which attaches to the first anchor portion 112, is formed into or affixed to the compartment 102, preferably, in some embodiments, at the first side of the compartment 102. As shown in FIG. 1A and FIG. 1B, the location of the first anchor portion 112 and the second anchor portion 114 can be at a first side of the compartment 102.

The compartment 102 can be formed in part by the backing layer 122 on the bottom of the stimulus indicating device 100, an upper layer 118 on the top of the stimulus indicating device 100, and a surrounding wall 126 between the backing layer 122 and the upper layer 118. The top layer 118 of the stimulus indicating device 100 may contain the indicator window 116. The indicator device 100 can contain an indicator spot 104 that can be viewed through the indicator window 116.

The first anchor portion 112 affixed to the first end of the stimulus sensitive gel 110, and the second anchor portion 114 positioned in the first side of the compartment 102, can both be formed to be any one of many different types of hook and loop fasteners. By way of example only, an example of such a fastener is the VELCRO® brand name type of fasteners. Another example of a first anchor portion 112 and a second anchor portion 114 includes a pair of oppositely polarized magnets. Other latching mechanisms are contemplated within the scope of the invention as would be understood by one of ordinary skill in the art, and could include simply gluing or bonding the first end of the stimulus sensitive gel 110 to the first side of the compartment 102 by using a water resistant or a solvent resistant adhesive. Further, the shrunken stimulus sensitive gel 110 can also be anchored to the compartment 102 using a clamp, or a hook, or by employing a hole in the stimulus sensitive gel 110 positioned over a post formed in the compartment 102 for anchoring or holding the stimulus sensitive gel 110 in place.

Although not required for the operation of the stimulus sensitive indicator 100, securing the stimulus sensitive gel 110, 120 and 130 by attaching the first anchoring position 112 on the gel to the second anchoring position 114 on the housing prevents the stimulus sensitive gel 110, 120 and 130 from floating or moving within the compartment and accidentally hiding the indicator spot 104 before the swollen stimulus sensitive gel 110 had undergone its phase transition, thereby preventing a false indication that the product attached to the stimulus indicator device 100 had been exposed to a predetermined stimulus.

Prior to being exposed to a predetermined trigger stimulus, the shrunken stimulus sensitive gel 110 has not yet undergone a phase transition to reach its swollen volume, and thus the entire indicator spot 104 can be uncovered. The indicator spot 104 is positioned below the indicator window 116, and can be visible through the indicator window 116 prior to the stimulus indicating device 100 being exposed to the predetermined stimulus, because the indicator spot 104 may be entirely uncovered or unobscured by the shrunken stimulus sensitive gel 110.

Figure 1C:
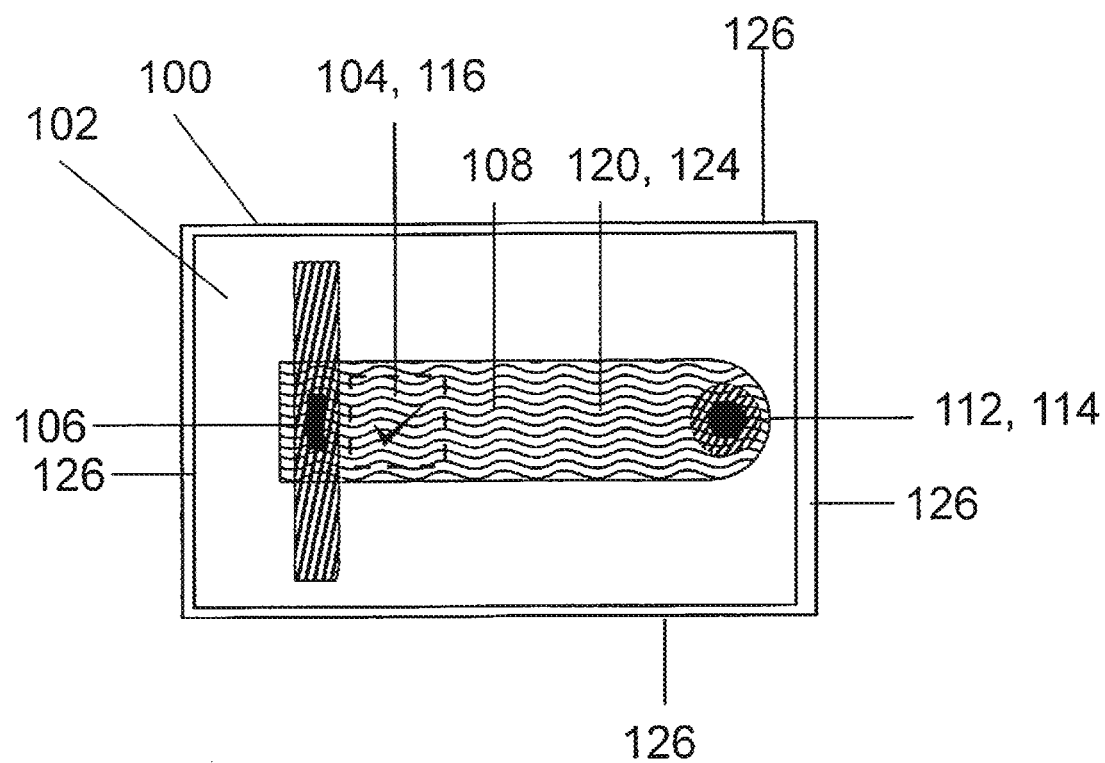
FIG. 1C is a top down view of the embodiment in FIG. 1A after exposure to a predetermined stimulus.
Figure 1D:
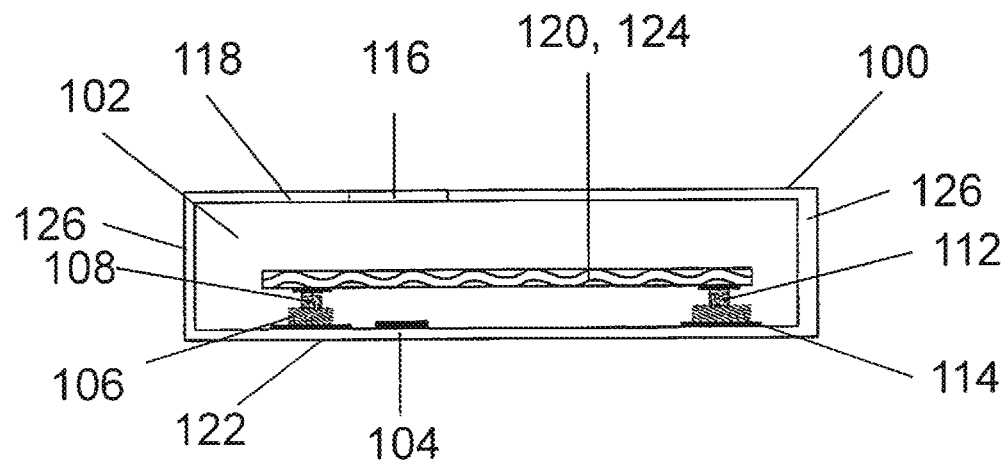
FIG. 1D is a side view of FIG. 1C.

As shown by FIG. 1A and FIG. 1B, the shrunken stimulus sensitive gel 110 contains fluid 124 and is surrounded by fluid 124 which can be absorbed by the stimulus sensitive gel 110, thereby allowing and aiding the shrunken stimulus sensitive gel 110 to swell after exposure to the predetermined stimulus. In a exemplary embodiment, as illustrated by FIG. 1C and FIG. 1D, after exposure to the predetermined stimulus, the shrunken stimulus sensitive gel 110 of FIG. 1A and FIG. 1B undergoes its phase transition and the fluid 124 surrounding the shrunken gel 110 is absorbed by the shrunken stimulus sensitive gel 110 and the shrunken stimulus sensitive gel 110 swells and expands in volume. The resulting swollen stimulus sensitive gel 120 is illustrated in FIG. 1C and FIG. 1D.

After exposure to the predetermined stimulus, which by way of example only could be the temperature of 2° C., as shown in FIG. 1C and FIG. 1D the initially shrunken stimulus sensitive gel 110 swells and expands primarily in a direction away from first side of the compartment 102 containing the first and second anchoring portions 112 and 114, and towards the indication spot 104. And as the shrunken stimulus sensitive gel 110 continues to swell and expand in response to the predetermined stimulus, the now swollen stimulus sensitive gel 120 reaches and at least partially covers, and fully covers the indication spot 104 located below the viewing window 116, so as to provide the indication of exposure to the predetermined stimulus.

More specifically, as illustrated in FIG. 1C and FIG. 1D, as the shrunken stimulus sensitive gel 110 expands or swells, it partially or wholly covers the indicator spot 104, so that the indicator spot is at least partially or is fully or completely blocked or obscured from being seen through the viewing window 116 by the user, because the remainder of the compartment 102 is covered completely by the upper layer portion 118 of the device 100, and as described herein, except for the viewing window 116 the upper portion can be covered in paint or ink.

As described herein, the initially shrunken gel 110 swells or expands upon exposure to the predetermined stimulus, and continues to swell and expand so long as the indicating device 100 remains at, or by way of example only, below its predetermined stimulus (by way of example only, if the predetermined stimulus was set to 2° C., so long as the stimulus sensitive gel remained at 2° C. or below, the stimulus sensitive gel would swell or expand to a predetermined size or volume that corresponded to its temperature). Notably, the shrunken stimulus sensitive gel 110 would continue to swell and absorb fluid 124 until the swollen stimulus sensitive gel 120 not only at least partially or fully covers or obscures the indicator spot 104, but continues swelling and expanding until the latch portion 108 on the second end of the swollen stimulus sensitive gel 120 engages or adheres or latches or catches onto the corresponding catch portion 106 of the two-part latching mechanism. The catch portion 106 can be located at the second side of the compartment 102, which is on the opposite to the side of the compartment 102 containing the second anchor portion 114. Once the latch portion 108 catches onto or engages with or latches into the latch portion 106, even if the predetermined stimulus were to be removed, a permanent indication that exposure to the predetermined stimulus occurred would be recorded because the latch portion 108 and the catch portion 106 would prevent the swollen stimulus sensitive gel 120 from retreating back to the first side of the compartment, even when the predetermined stimulus had been removed, and the swollen stimulus sensitive gel 120 reverted to be the shrunken stimulus sensitive gel 110.

As discussed herein, the stimulus indicating device 100 is able to indicate not only a predetermined stimulus but also that such stimulus occurred over at least a predetermined time period. This "time lapse function" can be varied by manipulating the percentage swelling that the initially shrunken stimulus sensitive gel 110 must achieve in order to cover the indicator spot 104 completely and for the latch portion 108 located on the second end of the initially shrunken stimulus gel 110 to catch onto the catch portion 106 located on the second end of the single compartment 102. By manipulating and/or varying the distance between latch portion 108 located on the second end of the initially shrunken stimulus sensitive gel 110, and the catch portion 106, the "time lapse function" can be calculated. More specifically, the time lapse function determines the amount of time required for the shrunken stimulus sensitive gel 110 to swell far enough so that it not only travels past and covers the indicator spot 104, but it also reaches and adheres to, engages with, latches together with the catch portion 106. And as discussed herein, an indicator device 100 can be manufactured so as to not provide an indication of exposure (i.e., not completely or even partially cover or obscure the indicator spot 104) until only after a predetermined amount of time had passed, wherein that predetermined amount of time equaled the amount of time required for the shrunken stimulus sensitive gel 110 to swell and expand to a large enough size that the latch portion 106 on the second end of the stimulus sensitive gel engages with, or adheres to, or latches with the catch portion 106. Such manipulation of the distance between the latch portion 106 and the catch portion 108 includes moving catch portion 108 farther away from or nearer to the latch portion 106, or keeping the catch portion 108 in the same location but lengthening or shortening the shrunken stimulus sensitive gel 110 so as to manipulate the position of the latch portion 106, allows for the control of the time required for the shrunken stimulus sensitive gel 110, and thus the latch portion 106 to reach the catch portion 108 (which thereby results in the permanent covering or obscuring of the indicator spot 104).

An advantage of using a stimulus indicating device 100 that provides for or allows for a time lapse function is that it eliminates the possibility for false indications of exposure. For example, a vaccine may spoil at 1° C. (the predetermined stimulus). But that vaccine may only spoil if the exposure lasts three or more hours. Thus, if an indication is presented by a given stimulus indicating device prior to that three hour mark, it is properly termed a false positive or a false indication of exposure, because the vaccine had in fact not spoiled as a result of the exposure to the temperature of 1° C. Thus, it is useful that the stimulus indicating device 100 not display to the user an indication of exposure to the predetermined stimulus unless both the exposure to the predetermined stimulus occurred (by way of example only, 1° C. or less), and that exposure occurred for the predetermined amount of time (by way of example only, three or more hours). By way of example only, if the time lapse function of the stimulus indicating device is set for three hours of exposure to 1° C. the stimulus indicating device embodiments discussed herein 100 and 200 and 300 may not provide a permanent indication of exposure if that predetermined stimulus of 1° C. only lasted ninety minutes. However, a predetermined stimulus greater than 1° C. for less than three hours can provide a permanent indication of exposure.

As discussed herein, a purpose behind this exemplary embodiment of the invention is to present the user with a permanent indication of exposure, and do so for a predetermined amount of time. Such a permanent indication of exposure could take the form of having the shrunken stimulus sensitive gel 110 expand or swell so as to become the swollen stimulus sensitive gel 120 (which is caused by the absorption of the liquid 124 when the shrunken stimulus sensitive gel 110 as it undergoes its phase transition only after exposure to the predetermined stimulus for the predetermined amount of time), thereby resulting in the swollen stimulus sensitive gel 120 covering the indicator spot 104 so that it is at least partially if not fully obscured from the view of the end user through the indicator window 116 (which by way of example only, could result in a color change from green to red, or a change from a "checkmark" or "\i" to an "X"), and have the indicator spot 104 remain permanently covered because of the interlocking achieved by the latch portion 106 and the catch portion 108, which remains interlocked even after the predetermined stimulus is removed, so as to indicate to the user of the stimulus sensitive product that that product had been exposed to a harmful stimulus, such as an extreme temperature.

The predetermined temperature discussed herein that causes the swollen stimulus sensitive gel 110 to undergo its phase transition is only one example of a predetermined stimulus or trigger stimulus that may cause the stimulus sensitive gel 110 and 120 to undergo its phase transition. For example, the shrunken or swollen stimulus sensitive gel 110 of this exemplary embodiment could trigger or undergo its phase transition upon exposure to a predetermined stimulus such as a predetermined pH level, or the shrunken or swollen stimulus sensitive gel 110 of this exemplary embodiment could trigger or undergo its phase transition upon exposure to a predetermined level of electromagnetic radiation.

Figure 1E:
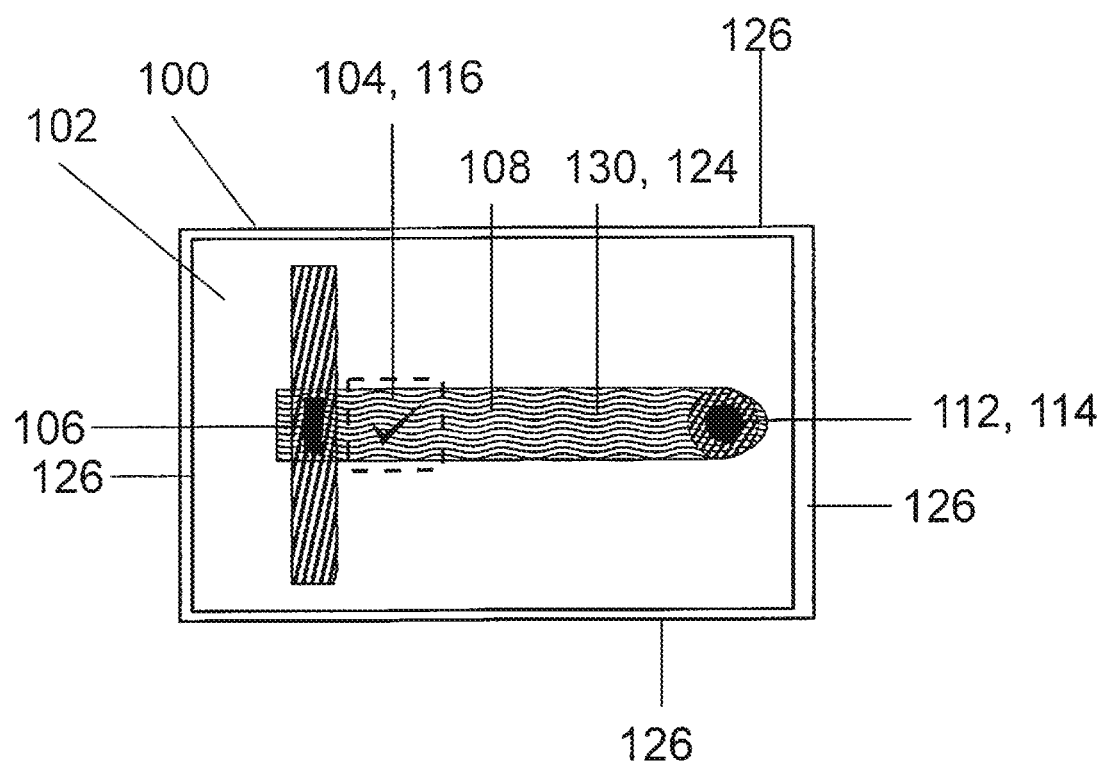
FIG. 1E is a top down view of the embodiment in FIG. 1A after exposure to a predetermined stimulus and after the predetermined stimulus has been removed.
Figure 1F:
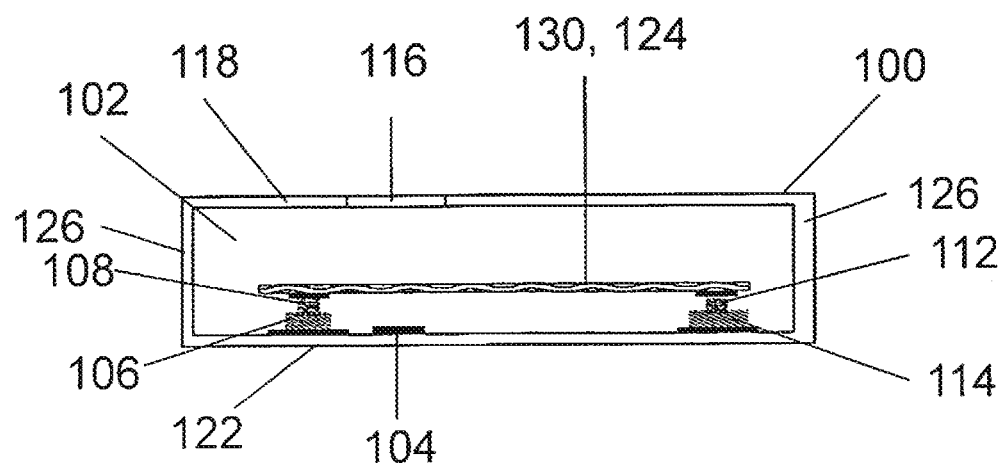
FIG. 1F is a side view of FIG. 1E.

Furthermore, as the initially shrunken stimulus sensitive gel 110 begins to resemble the swollen stimulus sensitive gel 120, after the predetermined amount of time at the predetermined stimulus, the latch portion 108 on the second end of the stimulus sensitive gel 110 and 120 can, for example, latch with, or engage with, or adhere to, or catch onto the catch portion 106 in the compartment 102. The catch portion 106 is a component of a latching mechanism 106/108 and the latch portion 108 is another component of the latching mechanism 106/108. Once the latch portion 108 catches onto the catch portion 106, if the predetermined stimulus is removed and the swollen stimulus sensitive gel 120 that has swollen as a result of the exposure to the predetermined stimulus for the predetermined amount of time, begins to de-swell or shrink, the latching mechanism 106/108 may, for example, hold the then shrinking or shrunken stimulus sensitive gel 110 in a stretched configuration over the indicator spot 104. The then shrunken stimulus sensitive gel 110 held in place by the latching mechanism 106/108 is illustrated by FIG. 1E and FIG. 1F. As shown by these Figures, even in the shrunken state, because the shrunken stimulus sensitive gel 130 is held in place by the latching mechanism 106/108, the indicator spot 104 continues to be hidden from the end user through the window 116 by the shrunken stimulus sensitive gel 130.

It should be appreciated, that the stimulus sensitive gel 110, 120 and 130 do not have to completely hide the indicator spot 104 from the user in order to perform the intent of the present inventions (i.e., provide the indication of exposure). Instead, if even a portion of the indicator spot 104 is hidden from the view of the user through the indicator window 116, it is enough to signal to the user that the product attached to the stimulus indicating device 100 had been exposed to a potentially harmful stimulus. More specifically, although the swelling in volume of the shrunken stimulus sensitive gel 110 in all of the embodiments of the stimulus indicating device 100 discussed herein can be by any amount so long as it is registerable, the increase in volume of the shrunken stimulus sensitive gel 110 would be between at least a 10 percent increase in original volume, and up to a 300 percent increase in original volume. In regard to certain embodiments of the stimulus indicating device 100 discussed herein as they pertain to the increase in the volume being "registerable" what is meant is that the shrunken stimulus sensitive gel 110 swells or increases its volume enough to cause the shrunken stimulus sensitive gel 110 to expand or swell enough so that it covers enough of the indicator spot, and the latch portion 108 reaches enough of the catch portion 106 to allow the latching mechanism 106/108 to engage, so that an indication of exposure, by way of example only in the form of a registerable change in color (e.g., a change in color from a first color to a second color) or indication (e.g., an indicator spot 104 that is the same color as the stimulus sensitive gel 120 but is a glyph, such as a "checkmark" disappears from view of the user of the indicator) occurs in the stimulus indicating device 100, and that indication of exposure is visible via the indicator window 116, and indicates to the user that the product had been exposed to a predetermined stimulus.

In regard to certain of embodiments of the stimulus indicating device 100 discussed herein being "irreversible" or "permanent" what is meant is that once the stimulus indicating device 100 provides an indication of exposure to an adverse stimulus extreme (which is also referred to herein as a predetermined stimulus), that indication of exposure does not change, even though the adverse stimulus extreme or predetermined stimulus might be removed in the future.

Both the backing layer 122 and the upper layer 118 and the walls 126 of the stimulus indicating device 100 can be constructed of a strong, resilient leak-proof material, such as plastic or other polymer material, so as to provide for the twisting or bending that might occur during transportation of or application to the stimulus sensitive product without tearing, breaking or leaking. Similarly, the backing layer 122 and the upper layer 118, and the walls 126 of the stimulus indicating device 100 can be constructed of any of a number of materials that have a high vapor retention including polyolefins such as polyethylene and polypropylene or cyclic olefin copolymers (COCs) such as those included in the TOPAS® COC family of resins manufactured by TOPAS Inc. The backing layer 122 and the upper layer 118 may also be made of a material that allows them to be joined and sealed together, such as by heat stamping, micro-welding or other suitable means, so as to either be joined directly to one another, or to result in the creation of the walls 126. The backing layer 122 and the upper layer 118 can both approximate the length and width of the first compartment 102, although variations in these dimensions are within the scope of the present invention. The upper layer 118 can be made of a clear material, such as plastic, so that the user of the stimulus indicating device 100 can view at least some portion of the backing layer facing into the compartment 102 or the indicator spot 104 through the indicator window 116. The upper layer 118 can also be able to accept paint or ink so as to allow for coloring or concealing at least some portion of the compartment 102.

Alternately, it is not necessary but rather is an optional embodiment, for both the backing layer 122 and the upper layer 118 and the walls 126 of the stimulus indicating device 100 to be constructed of a plastic material that has high moisture vapor retention. Furthermore, it is not necessary, but rather is an optional embodiment, for the backing layer 122 and the upper layer 118 and the walls 126 of the stimulus indicating device 100 to be joined or welded or otherwise bonded together permanently. In one embodiment, the device 100 may be formed when the backing layer 122 and the upper layer 118 and the walls 126 are merely assembled or snapped together and can be made from a plastic material that has a low moisture barrier. In this alternate embodiment, the device 100 is enclosed in a pouch made from a film material having high moisture vapor retention. The inventors have discovered that a material having sufficiently high moisture vapor retention will permit moisture loss of no more than 2 weight % over a period of one year and preferably said moisture loss would occur over a period of two years. Examples of films that have sufficiently high moisture vapor retention properties that can be used in this invention include laminates containing poly(chlorotrifluoroethylene) (PCTFE), sold under the trade name Aclar, or aluminum oxide polyester. Examples of laminates that may be used in this alternate embodiment of the invention include PTATP22002 from Tekniplex which is a laminate containing a 2 mil of an inch thick layer of Aclar® sandwiched between two layers of polyethylene or Oliver Tolas TPF-0599B which is a laminate containing two layers of aluminum oxide polyester and a layer of polyethylene. However, one of ordinary skill in the art would realize that other materials are possible and that the suitability of a particular material for use in this application would be determined by testing. In order to make pouches from these materials in certain of these alternative embodiments, the correct combination of sealing temperature and pressure must be used in order to ensure that the seal is sturdy enough to prevent leakage and ensure vapor retention. However, one skilled in the art will recognize that this description of the materials that can be used is not limiting and is intended to be descriptive and optional only.

Although some portion of the upper layer 118 can also accept paint or ink for coloring, it is preferable, in some embodiments, that the indicator window 116 portion of the upper layer 118 remain free from ink or coloring so that the user of the stimulus indicating device 100 can observe the first compartment 102 and specifically the indicator spot 104 through the indicator window 116, (or alternatively, the portion of the backing layer visible through the viewing window 116) as explained herein.

The stimulus sensitive gel 110, 120 and 130 employed by the variations of this exemplary embodiment, as shown in FIG. 1A, FIG. 1B FIG. 1C, FIG. 1D, FIG. 1E, and FIG. 1F, can be manufactured so as to contain a dye or colorant that is different from the color of the indicator spot 104 (or alternatively from the color of the portion of the backing layer visible through the viewing window 116). In this way the color of the stimulus sensitive gel 110, 120 and 130 in both its swollen and collapsed state, is different from the color of the indicator spot 104. Thus, when the shrunken stimulus sensitive gel 110 expands or swells in response to the predetermined stimulus, and only after a predetermined amount of time, by even a partial but required amount, the change or increase in volume may result in the stimulus indicating device 100 providing the indication of exposure by changing, even at least partially, from a first color to a second color, wherein the color change is permanently visible to the user of the stimulus indicating device 100 through the indicator window 116 because of the interaction of the latching mechanism.

All embodiments discussed herein of the stimulus indicating device 100 containing the shrunken stimulus sensitive gel 110 and the swollen stimulus sensitive gel 120 may be based on any type of stimulus sensitive gel that undergoes a phase transition upon exposure of the stimulus sensitive gel to a predetermined stimulus. Preferred types of stimulus sensitive gels can include acrylic type gels including poly n-isopropylacrylamide (PNIPAAm) gels, and/or their variations and poly(acrylamide-co-acrylic acid) (PAAm-co-PAAc), polyacrylic acid (PAAc) gels, and/or its derivatives. As is known in the art, such stimulus sensitive gels and/or other equivalent gels and/or their derivatives, undergo a significant change in volume in response to a range of stimuli, including temperature, solvent composition, pH, ionic strength, etc.

By way of example only, it is known in the art that when the predetermined stimulus is temperature, the direction of the volume change in the stimulus sensitive gel 110 and 120 used in all the embodiments of the stimulus indicating device 100 discussed herein can be selected so as to correlate to a specific situation. For example, one of ordinary skill will appreciate and understand that if the stimulus sensitive gel in this exemplary embodiment is shrunken at the beginning of its use, as it undergoes its phase transition it may, for example, expand or swell, thereby causing a change in color or indication in the stimulus indicator 100.

By way of example only and as disclosed herein, a stimulus sensitive gel 110, 120 and 130 can be of the LCST type or the UCST type gel. As one of ordinary skill in the art will appreciate, a LCST type stimulus sensitive gel, such poly(N-isopropylacrylamide) gels, and/or its variations could be used when one wishes to have an initially shrunken stimulus sensitive gel expand or swell when cooled below a predetermined or trigger temperature and thereby absorb liquid which consequently: i) hides an indicator spot; or ii) hides the upper portion of the backing layer both of which result in the stimulus indicating device exhibiting a change in color or indication.

Alternatively, a UCST type stimulus sensitive gel, such as poly(acrylamide-co-acrylic acid) (PAAm-co-PAAc), poly-acrylic acid (PAAc) gels, and/or its derivatives could be used when one wishes to have an initially shrunken stimulus sensitive gel expand or swell when heated above a predetermined or trigger temperature and thereby absorb liquid so as to: i) hide an indicator spot; or ii) hides the upper portion of the backing layer, both of which result in the stimulus indicating device exhibiting a change in color or indication.

One of ordinary skill in the art will understand that although the stimulus sensitive gel 110, 120 and 130 discussed herein in regard to certain of embodiments of the stimulus indicating device 100 may be of the LCST type of gel (i.e., the shrunken stimulus sensitive gel 110 will expand or swell upon exposure to its predetermined stimulus of a cooler temperature, and become the swollen stimulus sensitive gel 120; as well as collapse or shrink upon exposure to its predetermined stimulus of a warmer temperature, and become the shrunken stimulus sensitive gel 110), the range and scope of this invention includes and envisions the swollen stimulus sensitive gel 110 and the shrunken stimulus sensitive gel 120 also being of the UCST type of gel. Moreover, all the variations of the different embodiments discussed herein can be combined with the variations of other embodiments described herein and that are known in the art, as would be understood to one of ordinary skill in the art.

Polyacrylic gels can be both UCST gels and LCST gels depending on their chemical structure. Many examples of both kinds of polymers are known in the literature. For example, if the stimulus sensitive gel 110 and 120 employed in all the embodiments of the stimulus indicating device 100 discussed herein were made of LSCT type stimulus sensitive gels, it could be any number of such LCST gels, including PNIPAAm gels, and as described in U.S. Pat. No. 4,732,930 in regard to PNIPAAm, the predetermined stimulus, such as temperature at which a stimulus sensitive gel 110 and 120 undergoes its phase transition and changes volume, can be "tuned" to a particular value by adding salts, surfactants, or other substances to the gel matrix. Explanations of how the transition temperature of an LCST gel can be tuned can be found in the following references: Zhang et al., "Specific Ion Effects on the Water Solubility of Macromolecules: PNIPAM and the Hofmeister Series" Journal of the American Chemical Society volume 127 at 14505 to 14510 and Park et al., "Sodium Chloride-Induced Phase Transition in Non-ionic Poly(N-isopropylacrylamide) Gel" Macromolecules volume 26 at 5045 to 5048.

Alternatively, if the stimulus sensitive gel 110 and 120 employed in all the embodiments of the stimulus indicating device 100 discussed herein were made of polyacrylic UCST type stimulus sensitive gels, it could be any number of such polyacrylic UCST gels, including: i) copolymers of hydrogen bonding donor and acceptor monomers examples of which include poly(acrylamide-co-acrylic acid), and poly (acrylamide-co-vinylacetic acid) gels; or ii) homopolymers of a single monomer species that act as both hydrogen bond donor and acceptor when exposed to aqueous sodium chloride solutions of certain concentrations, examples of which include poly(acrylic acid) gels swollen in solutions of sodium chloride dissolved in water.

In regard to the type of polyacrylic UCST gels that contain copolymers of hydrogen bonding donor and acceptor monomers (examples of which include poly(acrylamide-co-acrylic acid) and poly(acrylamide-co-vinylacetic acid) gels), these gels have been described in Dai et al, Macromolecules 39 (2006) at 6584-6589 'A Temperature-Responsive Copolymer Hydrogel in Controlled Drug Delivery.' Dai describes that the predetermined "trigger" stimulus at which a UCST gel undergoes its phase transition, and thereby absorbs the liquid 114 and thus expands or swells in volume, can be "tuned" to a particular value by changing the ratio of the hydrogen bond donor to hydrogen bond acceptor in the polymer gel, by changing the crosslinking ratio, and by changing the initiator concentration at which the gel is polymerized. Dai, however, does not specifically teach that the tuning can be done by adding various levels of sodium chloride into the gel matrix. Such "tuning" in regard to UCST type gels is discussed herein.

Alternatively, polyacrylic UCST type gels made from homopolymers of a single monomer species that act as both hydrogen bond donor and acceptor when exposed to aqueous sodium chloride solutions of certain concentrations (examples of which include poly(acrylic acid) gels swollen in solutions of sodium chloride dissolved in water) have been suggested by Buscal, European Polymer Journal, year 1982, volume 18, pages 967-974. Although one of ordinary skill in the art understands, in light of the suggestions by Buscal that these poly(acrylic acid) gels swollen in solutions of sodium chloride dissolved in water operate at sodium chloride concentrations of 400 mM or greater, the inventors have learned that these types of UCST gels actually operate better for the uses described herein when the sodium chloride concentration is less than 400 mM, and operate even better when the sodium chloride concentrations are greater than 200 mM and less than 400 nM, and operate best in some embodiments at the sodium chloride concentration of 300 mM.

Regardless of whether LCST type stimulus sensitive gels or UCST type stimulus sensitive gels are used to indicate exposure to a predetermined stimulus, what should be noted that the change in volume of the stimulus sensitive gel be tailored to the application in which the stimulus sensitive indicator 100 is being used. For example, a change in volume of the stimulus sensitive gel 110 and 120, and thus the corresponding imbibing of liquid 124 can be insignificant or it can be dramatic. If the desired visual indication is the result of the swollen stimulus sensitive gel 110 moving to completely cover the indicator spot 104 and hiding it from the user through the indicator window 116, then a large change in volume can be desirable in some embodiments.

More particularly, in conjunction with FIG. 1A, FIG. 1B, FIG. 1C, FIG. 1D, FIG. 1E, and FIG. 1F, by coloring the stimulus sensitive gel 110, 120 and 130 a different color than the indicator spot 104 as well as by ensuring that the swollen stimulus gel 120 is opaque enough such that when the shrunken stimulus sensitive gel 110 is exposed to the predetermined stimulus and undergoes its phase transition and swells and becomes the swollen stimulus sensitive gel 120, which covers the indicator spot 104 and hides it from the view of the user through the indicator window 116. By way of example only, the swollen stimulus sensitive gel 110, 120 and 130 may contain a suitable dye or color additive such as red. When that red colored swollen stimulus sensitive gel 120 is viewed post-phase transition through the indicator window 116 and hides the indicator spot 104 from the view of the user, it informs the user (perhaps in conjunction with a legend or color key) that the product attached to the stimulus indicating device 100 has been exposed to a potentially harmful stimulus.

In an alternate embodiment, in conjunction with FIG. 1A, FIG. 1B, FIG. 1C, FIG. 1D, FIG. 1E, and FIG. 1F, the stimulus sensitive gel 110, 120 and 130 is dyed such that when the shrunken stimulus sensitive gel 110 is exposed to the predetermined stimulus and undergoes its phase transition and becomes the swollen stimulus sensitive gel 120 it is the same color as the indicator spot 104. In doing so the swollen stimulus sensitive gel 120 does not need to be significantly opaque. Instead the visual impression through the indicator window 116 of the swollen stimulus sensitive gel 120 post-exposure to the predetermined stimulus in combination with the indicator spot 104 simply needs to appear uniform in color so that the indicator spot 104 cannot be discerned through the swollen stimulus sensitive gel 120. Because in this alternate embodiment of a exemplary embodiment, the swollen stimulus sensitive gel 120 and the indicator spot 104 are the same color, the indicator spot 104 can be a design or glyph (by way of example only, a "check mark") that, once revealed due to the shrunken stimulus sensitive gel 120 moving into the indicator window 116 and covering some or all of the indicator spot 104, the stimulus indicating device 100 can, for example, warn the user that the product attached to it had been exposed to a potentially harmful stimulus. Thus, although an actual change in color does not occur, the stimulus indicating device 100 can still provide the user with an indication that the stimulus sensitive product had been exposed to a predetermined stimulus.

In an alternate embodiment, in conjunction with FIG. 1A, FIG. 1B, FIG. 1C, FIG. 1D, FIG. 1E, and FIG. 1F, the stimulus sensitive gel 110, 120 and 130 is prepared such that when the shrunken stimulus sensitive gel 110 is exposed to the predetermined stimulus and undergoes its phase transition and becomes the swollen stimulus sensitive gel 120 it is not opaque but is translucent enough so that the color of the swollen stimulus sensitive gel 120 in combination with the color of the indicator spot 104 could result in a third color. By way of example only, if the swollen stimulus sensitive gel 120 were colored blue, and the indicator spot 104 were colored yellow, and if the swollen stimulus sensitive gel 120 were thin enough, the combination of the two colors would result in the creation of a third color—green. Thus, even though the stimulus indicating device 100 could potentially show: i) yellow prior exposure to the predetermined stimulus; ii) only green after exposure to the predetermined stimulus; and/or iii) two colors simultaneously (i.e., the green resulting from the combination of the blue of the swollen stimulus sensitive gel 120 and the yellow of the indicator spot 104, and the yellow from the indicator spot 104), such potential colors are irrelevant because the stimulus indicating device 100 would definitively indicate that the stimulus sensitive product to which it is attached had been exposed to a predetermined stimulus.

Similarly, in conjunction with FIG. 1A, FIG. 1B, FIG. 1C, FIG. 1D, FIG. 1E, and FIG. 1F, by coloring the stimulus sensitive gel 110, 120 and 130 a different color than a portion of the backing layer 122 as well as by ensuring that the swollen stimulus gel 120 is opaque enough such that when the shrunken stimulus sensitive gel 110 is exposed to the predetermined stimulus and undergoes its phase transition and swells and becomes the swollen stimulus sensitive gel 120, it covers a portion of the backing layer 122 from the view of the user through the indicator window 116. By way of example only, the swollen stimulus sensitive gel 110, 120 and 130 may contain a suitable dye or color additive such as red. When that red colored swollen stimulus sensitive gel 120 is viewed post-phase transition through the indicator window 116 and hides the indicator spot 104 from the view of the user, it informs the user (perhaps in conjunction with a legend or color key) that the product attached to the stimulus indicating device 100 has been exposed to a potentially harmful stimulus. Because the colors of the swollen stimulus sensitive gel 120 and a portion of the backing layer 122 are different, once the shrunken stimulus sensitive gel 110 undergoes its phase transition and expands or swells even partially, a portion of the backing layer 122 is at least partially hidden. In this way the user is warned that the product attached to the stimulus indicating device 100 had been exposed to a potentially harmful stimulus.

In an alternate embodiment, in conjunction with FIG. 1A, FIG. 1B, FIG. 1C, FIG. 1D, FIG. 1E, and FIG. 1F, the stimulus sensitive gel 110, 120 and 130 is prepared such that when the shrunken stimulus sensitive gel 110 is exposed to the predetermined stimulus and undergoes its phase transition and becomes the swollen stimulus sensitive gel 120 it is not opaque but is translucent enough so that the color of the swollen stimulus sensitive gel 120 in combination with the color of a portion of the backing layer 122 could result in a third color. By way of example only, if the swollen stimulus sensitive gel 120 were colored blue, and a portion of the backing layer 122 were colored yellow, and if the swollen stimulus sensitive gel 120 were thin enough, the combination of the two colors would result in the creation of a third color—green. Thus, even though the stimulus indicating device 100 could potentially show: i) yellow prior exposure to the predetermined stimulus; ii) only green after exposure to the predetermined stimulus; and/or iii) two colors simultaneously (i.e., the green resulting from the combination of the blue of the swollen stimulus sensitive gel 120 and the yellow of a portion of the backing layer 122, and the yellow from a portion of the backing layer 122), such potential colors are irrelevant because the stimulus indicating device 100 would definitively indicate that the stimulus sensitive product to which it is attached had been exposed to a predetermined stimulus.

2. Embodiments with Hook and Hole

In accordance with the purpose of certain embodiments of the invention, as embodied and broadly described herein and in conjunction with FIG. 2A, FIG. 2B, FIG. 2C, FIG. 2D, FIG. 2E and FIG. 2F, another embodiment of the stimulus indicating devices described herein has a single compartment 202. The rectangular-shaped stimulus sensitive gel 210, 220, and 230 is placed in the single compartment 202 and can be anchored in some embodiments on its first end to the first end of the single compartment 202 by anchoring clamp 204. In this embodiment, as well as in the other embodiments disclosed herein, the stimulus sensitive gel 210, 220 and 230 is wholly contained in the compartment 202 and that it be surrounded by liquid so that the stimulus sensitive gel 210, 220 and 230 may absorb that fluid and swell for its intended purpose. If a liquid is used to aid in the swelling of the stimulus sensitive gel 110, 120 and 130, this liquid should preferably, in some embodiments, be the same as liquid 124 contained inside the gel.

Figure 2A:
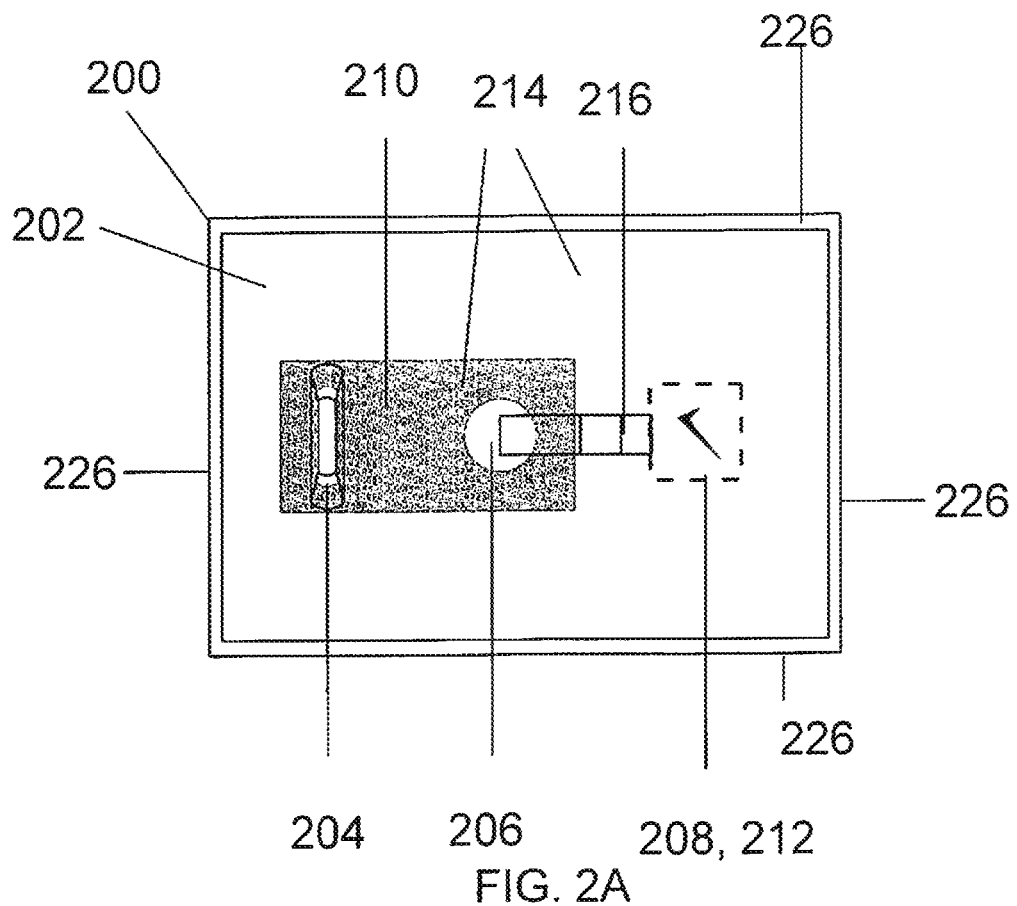
FIG. 2A is a top down view of an embodiment of the invention before exposure to a predetermined stimulus.
Figure 2B:
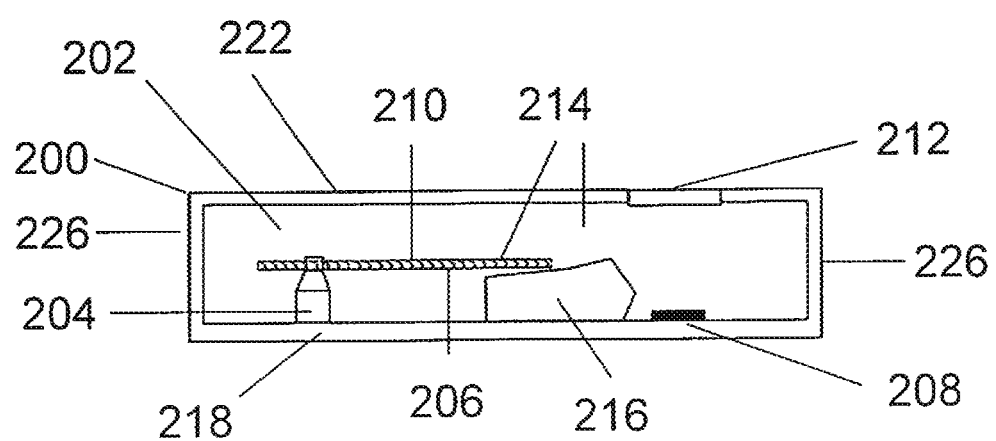
FIG. 2B is a side view of the embodiment in FIG. 2A.

This embodiment prior to exposure to the predetermined stimulus is illustrated by FIG. 2A and FIG. 2B. As shown in at least FIG. 2A and FIG. 2B, the rectangular-shaped, and shrunken, stimulus sensitive gel 210 is contained in the single compartment 202. The stimulus sensitive gel 210 is anchored to the compartment 202 by the clamp 204. The clamp 204 can clamp the gel at the first end of the stimulus sensitive gel 210. The clamp 204 is formed into or affixed to the compartment 202, at the first side of the compartment 202. As shown in FIG. 2A and FIG. 2B, the location of the clamp 204 is at a first side of the compartment 202.

The single compartment 202 is formed in part by the backing layer 218 on the bottom of the stimulus indicating device 200, an upper layer 222 on the top of the stimulus indicating device 200, and a surrounding wall 226 between the backing layer 218 and the upper layer 222. The top layer 222 of the stimulus indicating device 200 contains the indicator window 212. Preferably, for some embodiments, the indicator device 200 will contain an indicator spot 208 that can be viewed through an indicator window 212.

The shrunken stimulus sensitive gel 210 has a hole 206 in the end of the gel that is opposite to the anchored end of the gel. The hole may be rectangular and if rectangular, the long axis of the rectangular hole may be perpendicular or parallel to the long axis of the stimulus sensitive gel 210, 220 and 230. The hole may also be square or circular as shown in FIG. 2A, FIG. 2B, FIG. 2C, FIG. 2D, FIG. 2E and FIG. 2F.

The shrunken stimulus sensitive gel in FIG. 2A and FIG. 2B is shown to be anchored to the single compartment 202 at anchoring clamp 204. However, the shrunken stimulus sensitive gel 210 may be anchored to the single compartment by other methods. By way of example only, a first anchor portion can be affixed to the first end of the stimulus sensitive gel, and a second anchor portion can be positioned in the first side of the compartment 202, and the stimulus sensitive gel 210 is anchored by attaching the first and second anchoring portions together. The first and second anchoring portions can both be of any one of many different types of hook and loop fasteners. By way of example only, an example of such a fastener is the VELCRO® brand name type of fasteners. Another example of a first anchor portion and a second anchor portion includes a pair of oppositely polarized magnets. Other latching mechanisms are contemplated within the scope of the invention as would be understood by one of ordinary skill in the art, and could include simply gluing or bonding the first end of the stimulus sensitive gel 210 to the first side of the compartment 202 by using a water resistant or a solvent resistant adhesive. Further, the shrunken stimulus sensitive gel 210 can also be anchored to the compartment 202 using a hook, or by employing a hole in the stimulus sensitive gel 210 positioned over a post formed in the compartment 202 for anchoring or holding the stimulus sensitive gel 210 in place.

Prior to being exposed to a predetermined trigger stimulus, the shrunken stimulus sensitive gel 210 has not yet undergone a phase transition to reach its swollen volume, and thus the entire indicator spot 208 can be uncovered. The indicator spot 208 is positioned below the indicator window 212, and visible through the indicator window 212 prior to the stimulus indicating device 200 being exposed to the predetermined stimulus, because the indicator spot 208 is preferably entirely uncovered or unobscured by the shrunken stimulus sensitive gel 210.

Figure 2C:
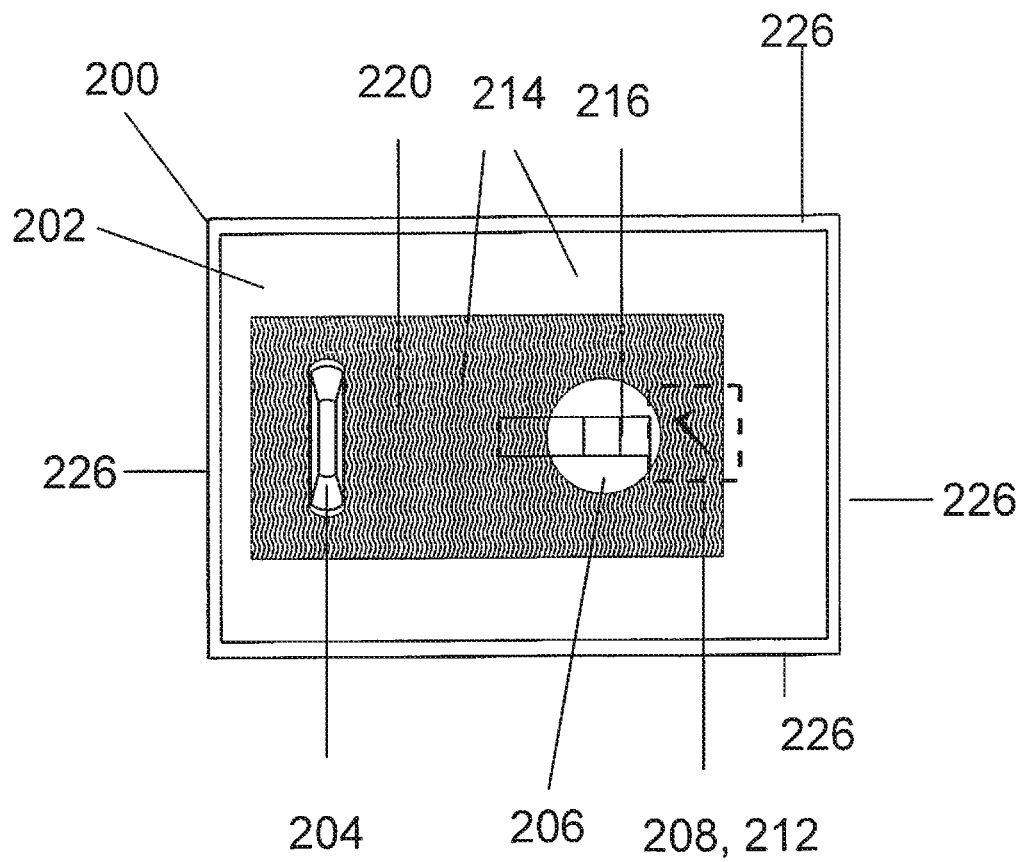
FIG. 2C is a top down view of the embodiment in FIG. 2A after exposure to a predetermined stimulus.
Figure 2D:
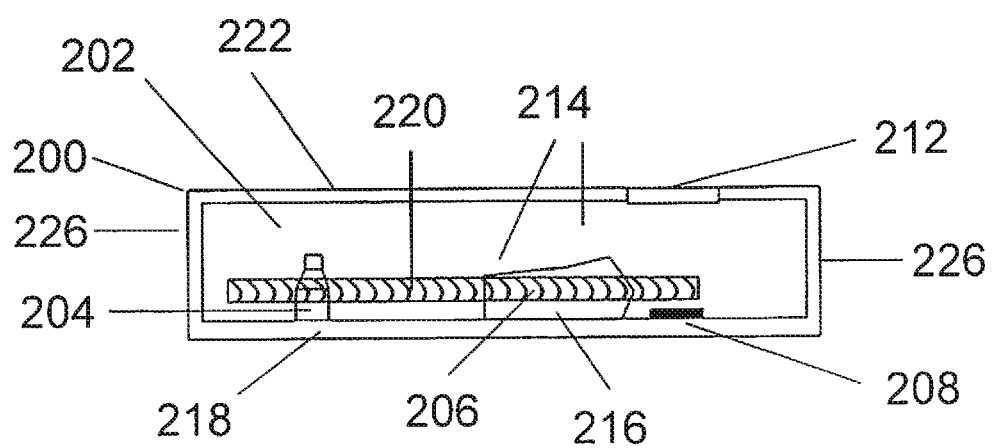
FIG. 2D is a side view of FIG. 2C.

As shown by FIG. 2A and FIG. 2B, the shrunken stimulus sensitive gel 210 contains fluid 214 and is surrounded by fluid 214 which can be absorbed by the stimulus sensitive gel 210, thereby allowing and aiding the shrunken stimulus sensitive gel 210 to swell after exposure to the predetermined stimulus. In an exemplary embodiment as illustrated by FIG. 2C and FIG. 2D, after exposure to the predetermined stimulus, the shrunken stimulus sensitive gel 210 of FIG. 2A and FIG. 2B undergoes its phase transition and the fluid 214 surrounding the shrunken gel 210 is absorbed by the shrunken stimulus sensitive gel 210 and the shrunken stimulus sensitive gel 210 swells and expands in volume. The resulting swollen stimulus sensitive gel 220 is illustrated in FIG. 2C and FIG. 2D.

After exposure to the predetermined stimulus, which by way of example only could be the temperature of 2° C., as shown in FIG. 2C and FIG. 2D the initially shrunken stimulus sensitive gel 210 swells and expands primarily in a direction away from first side of the compartment 202 containing the clamp 204, and towards the indication spot 208. And as the shrunken stimulus sensitive gel 210 continues to swell and expand in response to the predetermined stimulus, the now swollen stimulus sensitive gel 220 reaches and at least partially covers or fully cover the indication spot 208 located below the viewing window 212, so as to provide the indication of exposure to the predetermined stimulus.

More specifically, as illustrated in FIG. 2C and FIG. 2D, as the shrunken stimulus sensitive gel 210 expands or swells, it partially or wholly covers the indicator spot 208, so that the indicator spot is at least partially or is fully or completely blocked or obscured from being seen through the viewing window 212 by the user, because the remainder of the compartment 202 is covered completely by the upper layer portion 222 of the device 200, and as described herein, except for the viewing window 212 the upper portion can be covered in paint or ink.

As described herein, the initially shrunken gel 210 swells or expands upon exposure to the predetermined stimulus, and continues to swell and expand so long as the stimulus indicating device 200 remains at, or by way of example only, below its predetermined stimulus (by way of example only, if the predetermined stimulus was set to 2° C., so long as the stimulus sensitive gel remained at 2° C. or below, the stimulus sensitive gel would swell or expand to a predetermined size or volume that corresponded to its temperature). Notably, the shrunken stimulus sensitive gel 210 would continue to swell and absorb fluid 214 until the swollen stimulus sensitive gel 220 at least partially or fully covers or obscures the indicator spot 208 and in doing so, the hole 206 on the swollen stimulus sensitive gel 220 engages or adheres or latches or catches onto the corresponding hook 216. The hook 216 can be located at the second side of the compartment 202, which is on the opposite to the side of the compartment 202 containing the clamp 204. Once the hole 206 catches onto or engages with or hooks onto the hook 216, even if the predetermined stimulus were to be removed, a permanent indication that exposure to the predetermined stimulus occurred would be recorded because the hole 206 and the hook portion 216 would prevent the swollen stimulus sensitive gel 220 from retreating back to the first side of the compartment, even when the predetermined stimulus had been removed, and the swollen stimulus sensitive gel 220 reverted to be the shrunken stimulus sensitive gel 210.

As discussed herein, the stimulus indicating device 200 is able to indicate not only a predetermined stimulus but also a predetermined time. This "time lapse function" can be varied by manipulating the percentage swelling that the initially shrunken stimulus sensitive gel 210 can achieve in order to cover the indicator spot 208 completely and for the hole portion 206 to hook onto the hook portion 216 located on the second end of the single compartment 202. As discussed herein, by manipulating and/or varying the distance between the second end of the initially shrunken stimulus sensitive gel 210, and the indicator spot 208 located on the second end of the single compartment 202 the "time lapse function" can be calculated. More specifically, the time lapse function determines the amount of time required for the shrunken stimulus sensitive gel 210 to swell far enough so that it not only travels past and covers the indicator spot 208, but it also reaches and hooks onto the hook 216. And as discussed herein, an indicator device 200 can be manufactured so as to not provide an indication of exposure (i.e., not completely or even partially cover or obscure the indicator spot 208) until only after a predetermined amount of time had passed, wherein that predetermined amount of time equaled the amount of time required for the shrunken stimulus sensitive gel 210 to swell and expand to a large enough size that the hole portion 206 on the stimulus sensitive gel engages with, or hooks onto, the hook portion 216. Such manipulation of the distance between the second end of the stimulus sensitive gel 210 and the indicator spot 208 includes moving the indicator spot 208 farther away from or nearer to the second end of the gel, or keeping the indicator spot 208 in the same location but lengthening or shortening the shrunken stimulus sensitive gel 210 so as to manipulate the position of the second end of the gel, allows for the control of the time required for the shrunken stimulus sensitive gel 210 to cover or obscure the indicator spot 208 (which results in the hole portion 206 catching onto the hook portion 216 (and thereby results in the permanent covering or obscuring of the indicator spot 208).

An advantage of using a stimulus indicating device 200 that provides for or allows for a time lapse function is that it eliminates the possibility for false indications of exposure. For example, a vaccine may spoil at 1° C. (the predetermined stimulus). But that vaccine can only spoil if the exposure lasts three or more hours. Thus, if an indication is presented by a given stimulus indicating device prior to that three hour mark, it is properly termed a false positive or a false indication of exposure, because the vaccine had in fact not spoiled as a result of the exposure to the temperature of 1° C. Thus, it is useful that the stimulus indicating device 200 not display to the user an indication of exposure to the predetermined stimulus unless both the exposure to the predetermined stimulus occurred (by way of example only, 1° C. or less), and that exposure occurred for the predetermined amount of time (by way of example only, three or more hours). By way of example only, if the time lapse function of the stimulus indicating device is set for three hours of exposure to 1° C., the stimulus indicating device embodiments discussed herein 100 and 200 and 300 may not provide a permanent indication of exposure if that predetermined stimulus of 1° C. only lasted ninety minutes. However, a predetermined stimulus greater than 1° C. for less than three hours can provide a permanent indication of exposure.

As discussed herein, a purpose behind this embodiment of the invention is to present the user with a permanent indication of exposure, and do so after a predetermined amount of time. Such a permanent indication of exposure could take the form of having the shrunken stimulus sensitive gel 210 expand or swell so as to become the swollen stimulus sensitive gel 220 (which is caused by the absorption of the liquid 214 when the shrunken stimulus sensitive gel 210 as it undergoes its phase transition only after exposure to the predetermined stimulus for the predetermined amount of time), thereby resulting in the swollen stimulus sensitive gel 220 preferably covering the indicator spot 208 so that it is at least partially if not fully obscured from the view of the end user through the indicator window 212 (which by way of example only, could result in a color change from green to red, or a change from a "checkmark" or "✓" to an "X"), and have the indicator spot 208 remain permanently covered because of the hole 206 surrounding and catching onto the hook portion 216, which remains interlocked even after the predetermined stimulus is removed, so as to indicate to the user of the stimulus sensitive product that that product had been exposed to a harmful stimulus, such as an extreme temperature.

The predetermined temperature discussed herein that causes the swollen stimulus sensitive gel 210 to undergo its phase transition is only one example of a predetermined stimulus or trigger stimulus that can cause the stimulus sensitive gel 210 and 220 to undergo its phase transition. For example, the shrunken or swollen stimulus sensitive gel 210 of this exemplary embodiment could trigger or undergo its phase transition upon exposure to a predetermined stimulus such as a predetermined pH level, or the shrunken or swollen stimulus sensitive gel 210 of this embodiment could trigger or undergo its phase transition upon exposure to a predetermined level of electromagnetic radiation.

Figure 2E:
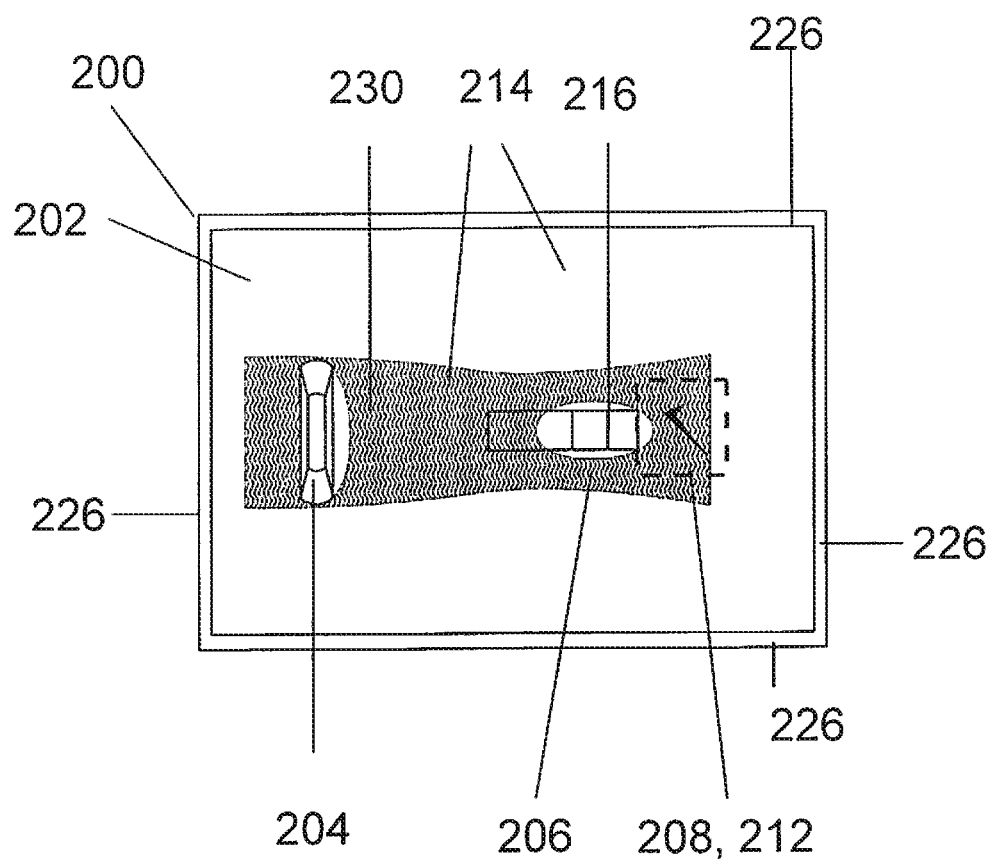
FIG. 2E is a top down view of the embodiment in FIG. 2A after exposure to a predetermined stimulus and after the predetermined stimulus has been removed.
Figure 2F:
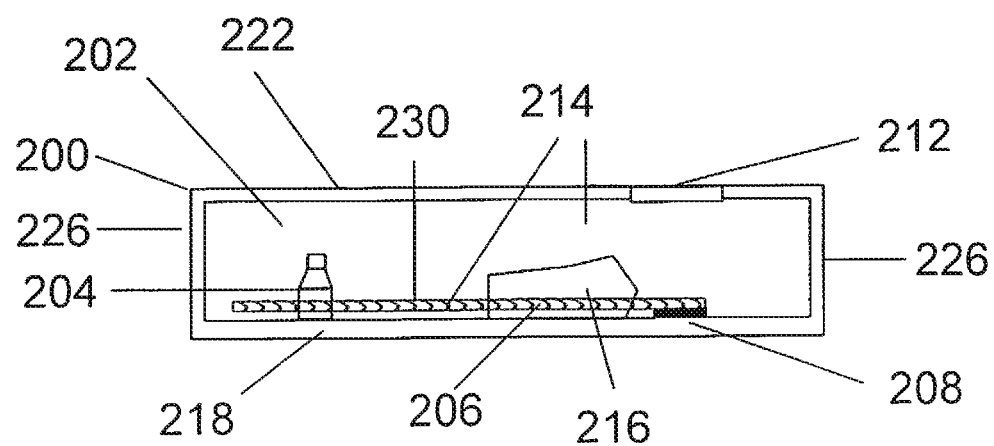
FIG. 2F is a side view of FIG. 2E.

Furthermore, as the initially shrunken stimulus sensitive gel 210 begins to resemble the swollen stimulus sensitive gel 220, after the predetermined amount of time at the predetermined stimulus, the hole portion 206 on the second end of the stimulus sensitive gel 210 and 220 may, for example, hook onto the hook portion 216 in the compartment 202. Once the hole portion 206 catches onto the hook portion 216, if the predetermined stimulus is removed and the swollen stimulus sensitive gel 220 that has swollen as a result of the exposure to the predetermined stimulus at least for the predetermined amount of time, begins to de-swell or shrink, the hole 206 hooked on the hook 216 may hold the then shrinking or shrunken stimulus sensitive gel 210 in a stretched configuration over the indicator spot 208. The then shrunken stimulus sensitive gel 210 held in place by the hole 206 hooked on the hook 216 is illustrated by FIG. 2E and FIG. 2F. As shown by these Figures, even in the shrunken state, because the shrunken stimulus sensitive gel 230 is held in place by the hole 206 hooked on the hook 216, the indicator spot 208 continues to be hidden from the end user through the window 212 by the shrunken stimulus sensitive gel 230.

It should be appreciated, that the stimulus sensitive gel 210, 220 and 230 do not have to completely hide the indicator spot 208 from the user in order to perform the intent of the present inventions (i.e., provide the indication of exposure). Instead, if even a portion of the indicator spot 208 is hidden from the view of the user through the indicator window 212, it is enough to signal to the user that the product attached to the stimulus indicating device 200 had been exposed to a potentially harmful stimulus. More specifically, although the swelling in volume of the shrunken stimulus sensitive gel 210 in all of the embodiments of the stimulus indicating device 200 discussed herein can be by any amount so long as it is registerable, the increase in volume of the shrunken stimulus sensitive gel 210 would be between at least a 10 percent increase in original volume, and up to a 300 percent increase in original volume. In regard to certain embodiments of the stimulus indicating device 200 discussed herein as they pertain to the increase in the volume being "registerable" what is meant is that the shrunken stimulus sensitive gel 210 swells or increases its volume enough to cause the shrunken stimulus sensitive gel 210 to expand or swell enough so that it covers enough of the indicator spot, and the hole portion 206 reaches enough of the hook portion 216 to allow the hole 206 to hook on the hook portion 216, so that an indication of exposure, by way of example only in the form of a registerable change in color (e.g., a change in color from a first color to a second color) or indication (e.g., an indicator spot 208 that is the same color as the stimulus sensitive gel 220 but is a glyph, such as a "checkmark" disappears from view of the user of the indicator) occurs in the stimulus indicating device 200, and that indication of exposure is visible via the indicator window 212, and indicates to the user that the product had been exposed to a predetermined stimulus.

In regard to certain of embodiments of the stimulus indicating device 200 discussed herein being "irreversible" or "permanent" what is meant is that once the stimulus indicating device 200 provides an indication of exposure to an adverse stimulus extreme (which is also referred to herein as a predetermined stimulus), that indication of exposure does not change, even though the adverse stimulus extreme or predetermined stimulus might be removed in the future.

Both the backing layer 218 and the upper layer 222 and the walls 226 of the stimulus indicating device 200 can be constructed of a strong, resilient leak-proof material, such as plastic or other polymer material, so as to provide for the twisting or bending that might occur during transportation of or application to the stimulus sensitive product without tearing, breaking or leaking. Similarly, the backing layer 218 and the upper layer 222, and the walls 226 of the stimulus indicating device 200 can be constructed of any of a number of materials that have a high vapor retention including polyolefins such as polyethylene and polypropylene or cyclic olefin copolymers (COCs) such as those included in the TOPAS® COC family of resins manufactured by TOPAS Inc. The backing layer 218 and the upper layer 222 may also be made of a material that can allow them to be joined and sealed together, such as by heat stamping, micro-welding or other suitable means, so as to either be joined directly to one another, or to result in the creation of the walls 226. The backing layer 218 and the upper layer 222 can both approximate the length and width of the first compartment 202, although variations in these dimensions are within the scope of the present invention. The upper layer 222 can be made of a clear material, such as plastic, so that the user of the stimulus indicating device 200 can view at least some portion of the backing layer facing into the compartment 202 or the indicator spot 208 through the indicator window 212. The upper layer 222 can also be able to accept paint or ink so as to allow for coloring or concealing at least some portion of the compartment 202.

Alternately, it is not necessary, but rather is an optional embodiment, for both the backing layer 222 and the upper layer 218 and the walls 226 of the stimulus indicating device 200 to be constructed of a plastic material that has high moisture vapor retention. Furthermore, it is not necessary for the backing layer 222 and the upper layer 218 and the walls 226 of the stimulus indicating device 200 to be joined or welded or otherwise bonded together permanently. In one embodiment, the device 200 may, for example, be formed when the backing layer 222 and the upper layer 218 and the walls 226 are merely assembled or snapped together and can be made from a plastic material that has a low moisture barrier. In this alternate embodiment, the device 200 is enclosed in a pouch made from a film material having high moisture vapor retention. The inventors have discovered that a material having sufficiently high moisture vapor retention will permit moisture loss of no more than 2 weight % over a period of one year and preferably said moisture loss would occur over a period of two years. Examples of films that have sufficiently high moisture vapor retention properties that can be used in this invention include laminates containing poly(chlorotrifluoroethylene) (PCTFE), sold under the trade name Aclar, or aluminum oxide polyester. Examples of laminates that may be used in this alternate embodiment of the invention include PTATP22002 from Tekniplex which is a laminate containing a 2 mil of an inch thick layer of Aclar® sandwiched between two layers of polyethylene or Oliver Tolas TPF-0599B which is a laminate containing two layers of aluminum oxide polyester and a layer of polyethylene. However, one of ordinary skill in the art would realize that other materials are possible and that the suitability of a particular material for use in this application would be determined by testing. In order to make pouches from these materials in certain of these embodiments, the correct combination of sealing temperature and pressure must be used in order to ensure that the seal is sturdy enough to prevent leakage and ensure vapor retention. However, one skilled in the art will recognize that this description of the materials that can be used is not limiting and is intended to be optional and/or descriptive only.

Although some portion of the upper layer 222 can also accept paint or ink for coloring, it is preferable that the indicator window 212 portion of the upper layer 222 remain free from ink or coloring so that the user of the stimulus indicating device 200 can observe the first compartment 202 and specifically the indicator spot 208 through the indicator window 212, (or alternatively, the portion of the backing layer visible through the viewing window 212) as explained herein.

The stimulus sensitive gel 210, 220 and 230 employed by variations of this exemplary embodiment, as shown in FIG. 2A, FIG. 2B, FIG. 2C, FIG. 2D, FIG. 2E, and FIG. 2F, can be manufactured so as to contain a dye or colorant that is different from the color of the indicator spot 208 (or alternatively from the color of the portion of the backing layer visible through the viewing window 212). In this way the color of the stimulus sensitive gel 210, 220 and 230 in both its swollen and collapsed state, is different from the color of the indicator spot 208. Thus, when the shrunken stimulus sensitive gel 210 expands or swells in response to the predetermined stimulus, and after a predetermined amount of time, by even a partial but required amount, the change or increase in volume can result in the stimulus indicating device 200 providing the indication of exposure by changing, even at least partially, from a first color to a second color, wherein the color change is permanently visible to the user of the stimulus indicating device 200 through the indicator window 212 because of the interaction of the latching mechanism.

All embodiments discussed herein of the stimulus indicating device 200 containing the shrunken stimulus sensitive gel 210 and the swollen stimulus sensitive gel 220 may be based on any type of stimulus sensitive gel that undergoes a phase transition upon exposure of the stimulus sensitive gel to a predetermined stimulus. Types of stimulus sensitive gels include acrylic type gels including poly n-isopropylacrylamide (PNIPAAm) gels, and/or their variations and poly (acrylamide-co-acrylic acid) (PAAm-co-PAAc), polyacrylic acid (PAAc) gels, and/or its derivatives. As is known in the art, such stimulus sensitive gels and/or other equivalent gels and/or their derivatives, undergo a significant change in volume in response to a range of stimuli, including temperature, solvent composition, pH, ionic strength, etc.

By way of example only, it is known in the art that when the predetermined stimulus is temperature, the direction of the volume change in the stimulus sensitive gel 210 and 220 used in all the embodiments of the stimulus indicating device 200 discussed herein can be selected so as to correlate to a specific situation. For example, one of ordinary skill will appreciate and understand that if the stimulus sensitive gel in this exemplary embodiment is shrunken at the beginning of its use, as it undergoes its phase transition it can expand or swell, thereby causing a change in color or indication in the stimulus indicator 200.

By way of example only and as disclosed herein, a stimulus sensitive gel 210, 220 and 230 can be of the LCST type or the UCST type gel. As one of ordinary skill in the art will appreciate, a LCST type stimulus sensitive gel such as poly(N-isopropylacrylamide) gels, and/or its variations could be used when one wishes to have an initially shrunken stimulus sensitive gel expand or swell when cooled below a predetermined or trigger temperature and thereby absorb liquid which consequently: i) hides an indicator spot; or ii) hides a portion of the backing layer both of which result in the stimulus indicating device exhibiting a change in color or indication.

Alternatively, a UCST type stimulus sensitive gel, such as poly(acrylamide-co-acrylic acid) (PAAm-co-PAAc), polyacrylic acid (PAAc) gels, and/or its derivatives could be used when one wishes to have an initially shrunken stimulus sensitive gel expand or swell when heated above a predetermined or trigger temperature and thereby absorb liquid so as to: i) hide an indicator spot; or ii) hide the upper layer of the backing layer, both of which result in the stimulus indicating device exhibiting a change in color or indication.

One of ordinary skill in the art will understand that although the stimulus sensitive gel 210, 220 and 230 discussed herein in regard to certain of embodiments of the stimulus indicating device 200 may be of the LCST type of gel (i.e., the shrunken stimulus sensitive gel 210 can expand or swell upon exposure to its predetermined stimulus of a cooler temperature, and become the swollen stimulus sensitive gel 220; as well as collapse or shrink upon exposure to its predetermined stimulus of a warmer temperature, and become the shrunken stimulus sensitive gel 210), the range and scope of this invention includes and envisions the swollen stimulus sensitive gel 210 and the shrunken stimulus sensitive gel 220 also being of the UCST type of gel. Moreover, all the variations of the different embodiments discussed herein can be combined with the variations of other embodiments described herein and that are known in the art, as would be understood to one of ordinary skill in the art.

Polyacrylic gels can be both UCST gels and LCST gels depending on their chemical structure. Many examples of both kinds of polymers are known in the literature. For example, if the stimulus sensitive gel 210 and 220 employed in all the embodiments of the stimulus indicating device 200 discussed herein were made of LSCT type stimulus sensitive gels, it could be any number of such LCST gels, including PNIPAAm gels, and as described in U.S. Pat. No. 4,732,930 in regard to PNIPAAm, the predetermined stimulus, such as temperature at which a stimulus sensitive gel 210 and 220 undergoes its phase transition and changes volume, can be "tuned" to a particular value by adding salts, surfactants, or other substances to the gel matrix. Explanations of how the transition temperature of an LCST gel can be tuned can be found in the following references: Zhang et al., "Specific Ion Effects on the Water Solubility of Macromolecules: PNIPAM and the Hofmeister Series" Journal of the American Chemical Society volume 127 at 14505 to 14510 and Park et al., "Sodium Chloride-Induced Phase Transition in Nonionic Poly(N-isopropylacrylamide) Gel" Macromolecules volume 26 at 5045 to 5048.

Alternatively, if the stimulus sensitive gel 210 and 220 employed in all the embodiments of the stimulus indicating device 200 discussed herein were made of polyacrylic UCST type stimulus sensitive gels, it could be any number of such polyacrylic UCST gels, including: i) copolymers of hydrogen bonding donor and acceptor monomers examples of which include poly(acrylamide-co-acrylic acid), and poly (acrylamide-co-vinylacetic acid) gels; or ii) homopolymers of a single monomer species that act as both hydrogen bond donor and acceptor when exposed to aqueous sodium chloride solutions of certain concentrations, examples of which include poly(acrylic acid) gels swollen in solutions of sodium chloride dissolved in water.

In regard to the type of polyacrylic UCST gels that contain copolymers of hydrogen bonding donor and acceptor monomers (examples of which include poly(acrylamide-co-acrylic acid) and poly(acrylamide-co-vinylacetic acid) gels), these gels have been described in Dai et al, Macromolecules 39 (2006) at 6584-6589 'A Temperature-Responsive Copolymer Hydrogel in Controlled Drug Delivery.' Dai describes that the predetermined "trigger" stimulus at which a UCST gel undergoes its phase transition, and thereby absorbs the liquid 214 and thus expands or swells in volume, can be "tuned" to a particular value by changing the ratio of the hydrogen bond donor to hydrogen bond acceptor in the polymer gel, by changing the crosslinking ratio, and by changing the initiator concentration at which the gel is polymerized. Dai, however, does not specifically teach that the tuning can be done by adding various levels of sodium chloride into the gel matrix. Such "tuning" in regard to UCST type gels is discussed herein.

Alternatively, polyacrylic UCST type gels made from homopolymers of a single monomer species that act as both hydrogen bond donor and acceptor when exposed to aqueous sodium chloride solutions of certain concentrations (examples of which include poly(acrylic acid) gels swollen in solutions of sodium chloride dissolved in water) have been suggested by Buscal, European Polymer Journal, year 1982, volume 18, pages 967-974. Although one of ordinary skill in the art understands, in light of the suggestions by Buscal that these poly(acrylic acid) gels swollen in solutions of sodium chloride dissolved in water operate at sodium chloride concentrations of 400 mM or greater, the inventors have learned that these types of UCST gels actually operate better for the uses described herein when the sodium chloride concentration is less than 400 mM, and operate even better when the sodium chloride concentrations are greater than 200 mM and less than 400 nM, and can operate best, in some embodiments, at the sodium chloride concentration of 300 mM.

Regardless of whether LCST type stimulus sensitive gels or UCST type stimulus sensitive gels are used to indicate exposure to a predetermined stimulus, what is notable is that the change in volume of the stimulus sensitive gel be tailored to the application in which the stimulus sensitive indicator 200 is being used. For example, a change in volume of the stimulus sensitive gel 210 and 220, and thus the corresponding absorption of liquid 214 can be insignificant or it can be dramatic. If the desired visual indication is the result of the swollen stimulus sensitive gel 210 moving to completely cover the indicator spot 208 and hiding it from the user through the indicator window 212, then a large change in volume, in some embodiments, can be desirable.

More particularly, in conjunction with FIG. 2A, FIG. 2B, FIG. 2C, FIG. 2D, FIG. 2E, and FIG. 2F, by coloring the stimulus sensitive gel 210, 220 and 230 a different color than the indicator spot 208 as well as by ensuring that the swollen stimulus gel 220 is opaque enough such that when the shrunken stimulus sensitive gel 210 is exposed to the predetermined stimulus and undergoes its phase transition and swells and becomes the swollen stimulus sensitive gel 220, which covers the indicator spot 208 and hides it from the view of the user through the indicator window 212. By way of example only, the swollen stimulus sensitive gel 210, 220 and 230 may contain a suitable dye or color additive such as red. When that red colored swollen stimulus sensitive gel 220 is viewed post-phase transition through the indicator window 212 and hides the indicator spot 208 from the view of the user, it informs the user (perhaps in conjunction with a legend or color key) that the product attached to the stimulus indicating device 200 has been exposed to a potentially harmful stimulus.

In an alternate embodiment, in conjunction with FIG. 2A, FIG. 2B, FIG. 2C, FIG. 2D, FIG. 2E, and FIG. 2F, the stimulus sensitive gel 210, 220 and 230 is dyed such that when the shrunken stimulus sensitive gel 210 is exposed to the predetermined stimulus and undergoes its phase transition and becomes the swollen stimulus sensitive gel 220 can be the same color as the indicator spot 208. In doing so the swollen stimulus sensitive gel 220 does not need to be significantly opaque. Instead the visual impression through the indicator window 212 of the swollen stimulus sensitive gel 220 post-exposure to the predetermined stimulus in combination with the indicator spot 208 simply needs to appear uniform in color so that the indicator spot 208 cannot be discerned through the swollen stimulus sensitive gel 220. Because in this alternate embodiment of a exemplary embodiment, the swollen stimulus sensitive gel 220 and the indicator spot 208 are the same color, the indicator spot 208 can be a design or glyph (by way of example only, a "check mark") that, once revealed due to the shrunken stimulus sensitive gel 220 moving into the indicator window 212 and covering some or all of the indicator spot 208, the stimulus indicating device 200 will warn the user that the product attached to it had been exposed to a potentially harmful stimulus. Thus, although an actual change in color does not occur, the stimulus indicating device 200 can still provide the user with an indication that the stimulus sensitive product had been exposed to a predetermined stimulus.

In an alternate embodiment, in conjunction with FIG. 2A, FIG. 2B, FIG. 2C, FIG. 2D, FIG. 2E, and FIG. 2F, the stimulus sensitive gel 210, 220 and 230 is prepared such that when the shrunken stimulus sensitive gel 210 is exposed to the predetermined stimulus and undergoes its phase transition and becomes the swollen stimulus sensitive gel 220 it is not opaque but is translucent enough so that the color of the swollen stimulus sensitive gel 220 in combination with the color of the indicator spot 208 could result in a third color. By way of example only, if the swollen stimulus sensitive gel 220 were colored blue, and the indicator spot 208 were colored yellow, and if the swollen stimulus sensitive gel 220 were thin enough, the combination of the two colors would result in the creation of a third color—green. Thus, even though the stimulus indicating device 200 could potentially show: i) yellow prior exposure to the predetermined stimulus; ii) only green after exposure to the predetermined stimulus; and/or iii) two colors simultaneously (i.e., the green resulting from the combination of the blue of the swollen stimulus sensitive gel 220 and the yellow of the indicator spot 208, and the yellow from the indicator spot 208), such potential colors are irrelevant because the stimulus indicating device 200 would definitively indicate that the stimulus sensitive product to which it is attached had been exposed to a predetermined stimulus.

Similarly, in conjunction with FIG. 2A, FIG. 2B, FIG. 2C, FIG. 2D, FIG. 2E, and FIG. 2F, by coloring the stimulus sensitive gel 210, 220 and 230 a different color than a portion of the backing layer 218 as well as by ensuring that the swollen stimulus gel 220 is opaque enough such that when the shrunken stimulus sensitive gel 210 is exposed to the predetermined stimulus and undergoes its phase transition and swells and becomes the swollen stimulus sensitive gel 220, it covers a portion of the backing layer 218 from the view of the user through the indicator window 212. By way of example only, the swollen stimulus sensitive gel 210, 220 and 230 may contain a suitable dye or color additive such as red. When that red colored swollen stimulus sensitive gel 220 is viewed post-phase transition through the indicator window 212 and hides the indicator spot 208 from the view of the user, it informs the user (perhaps in conjunction with a legend or color key) that the product attached to the stimulus indicating device 200 has been exposed to a potentially harmful stimulus. Because the colors of the swollen stimulus sensitive gel 220 and a portion of the backing layer 218 are different, once the shrunken stimulus sensitive gel 210 undergoes its phase transition and expands or swells even partially, a portion of the backing layer 218 is at least partially hidden. In this way the user is warned that the product attached to the stimulus indicating device 200 had been exposed to a potentially harmful stimulus.

In an alternate embodiment, in conjunction with FIG. 2A, FIG. 2B, FIG. 2C, FIG. 2D, FIG. 2E, and FIG. 2F, the stimulus sensitive gel 210, 220 and 230 is prepared such that when the shrunken stimulus sensitive gel 210 is exposed to the predetermined stimulus and undergoes its phase transition and becomes the swollen stimulus sensitive gel 220 it is not opaque but is translucent enough so that the color of the swollen stimulus sensitive gel 220 in combination with the color of a portion of the backing layer 218 could result in a third color. By way of example only, if the swollen stimulus sensitive gel 220 were colored blue, and a portion of the backing layer 218 were colored yellow, and if the swollen stimulus sensitive gel 220 were thin enough, the combination of the two colors would result in the creation of a third color—green. Thus, even though the stimulus indicating device 200 could potentially show: i) yellow prior exposure to the predetermined stimulus; ii) only green after exposure to the predetermined stimulus; and/or iii) two colors simultaneously (i.e., the green resulting from the combination of the blue of the swollen stimulus sensitive gel 220 and the yellow of a portion of the backing layer 218, and the yellow from a portion of the backing layer 218), such potential colors are irrelevant because the stimulus indicating device 200 would definitively indicate that the stimulus sensitive product to which it is attached had been exposed to a predetermined stimulus.

3. Embodiments with Gels That Move Through an Opening

In accordance with the purpose of certain embodiments of the invention, as embodied and broadly described herein and in conjunction with FIG. 3A, FIG. 3B, FIG. 3C, FIG. 3D, FIG. 3E and FIG. 3F, another embodiment of the inventive stimulus indicating devices described herein has a single compartment 302. The stimulus sensitive gel 310, 320, and 330 can be shaped so as to contain a base section, a mid-section and top section. The base section of the stimulus sensitive gel is larger than the top section. The mid-section of the stimulus sensitive gel has at least one or more lateral extensions or wings 324 or similar features that protrude from at least one side of the stimulus sensitive gel at its mid-section. This gel is described herein as the winged gel. Further, there is a hole portion 306 positioned in the mid-section of the stimulus sensitive gel. The hole portion 306 can be shaped like a rectangle, and the long axis of the hole portion is parallel to the long axis of the stimulus sensitive gel. The base of the stimulus sensitive gel 310, 320, and 330 is placed against the wall 326 on the first side of the single compartment 302. The stimulus sensitive gel 310, 320 and 330 is anchored to the single compartment 302 by friction fit between the tips of the wings 324 and the outer surface of the guiding pins 316. In this exemplary embodiment, as well as in the other embodiments disclosed herein, the stimulus sensitive gel 310, 320 and 330 can be wholly contained in the compartment 302 and be surrounded by liquid so that the stimulus sensitive gel 310, 320 and 330 may absorb that fluid and swell for its intended purpose. If a liquid is used to aid in the swelling of the stimulus sensitive gel 310, 320 and 330, this liquid should be the same as liquid 314 contained inside the gel.

Figure 3A:
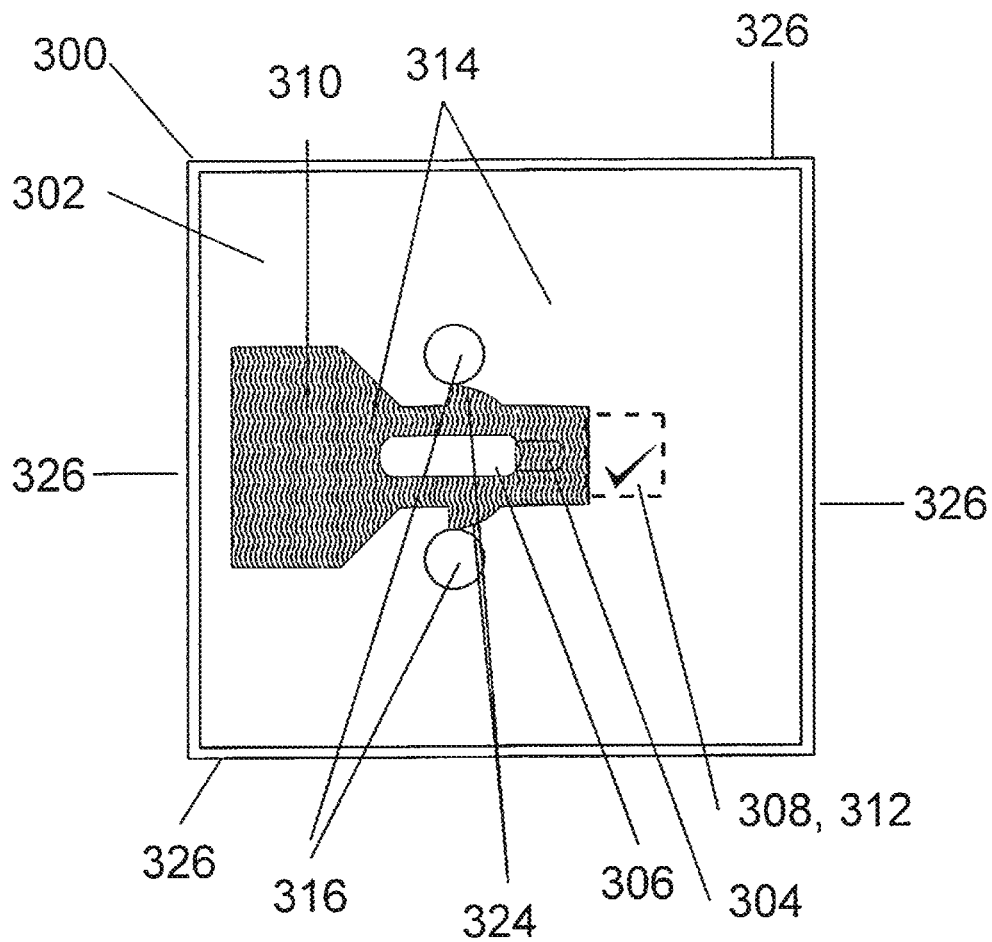
FIG. 3A is a top down view of an embodiment of the invention before exposure to a predetermined stimulus.
Figure 3B:
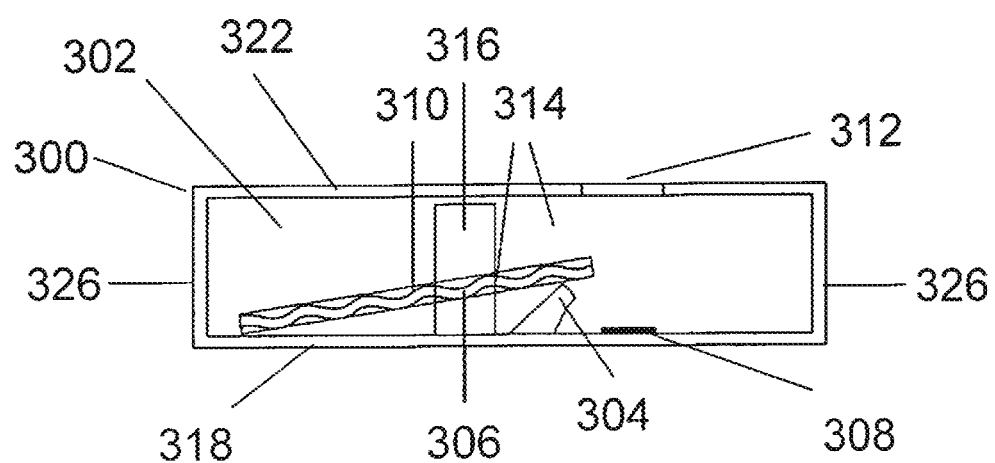
FIG. 3B is a side view of the embodiment in FIG. 3A.

This embodiment prior to exposure to the predetermined stimulus is illustrated by FIG. 3A and FIG. 3B. As shown in at least FIG. 3A and FIG. 3B, the winged gel 310 is contained in the single compartment 302. The stimulus sensitive gel 310 is anchored to the compartment 302 by friction fit between the tips of the wings 324 and the outer surface of the guiding pins 316.

The single compartment 302 is formed in part by the backing layer 318 on the bottom of the stimulus indicating device 300, an upper layer 322 on the top of the stimulus indicating device 300, and preferably a surrounding wall 326 between the backing layer 318 and the upper layer 322. The upper layer 322 of the stimulus indicating device 300 contains the indicator window 312. Preferably the indicator device 300 will contain an indicator spot 308 that can be viewed through an indicator window 312.

The shrunken stimulus sensitive gel 310 has a hole 306 in the mid-section of the gel. The hole may be rectangular and if rectangular, the long axis of the rectangular hole may be parallel to the long axis of the stimulus sensitive gel 310, 320 and 330 as shown in FIG. 3A, FIG. 3B, FIG. 3C, FIG. 3D, FIG. 3E and FIG. 3F.

Prior to being exposed to a predetermined trigger stimulus, the shrunken stimulus sensitive gel 310 has not yet undergone a phase transition to reach its swollen volume, and thus the entire indicator spot 308 can be uncovered. The indicator spot 308 is positioned below the indicator window 312, and can be visible through the indicator window 312 prior to the stimulus indicating device 300 being exposed to the predetermined stimulus, because the indicator spot 308 is preferably entirely uncovered or unobscured by the shrunken stimulus sensitive gel 310.

Figure 3C:
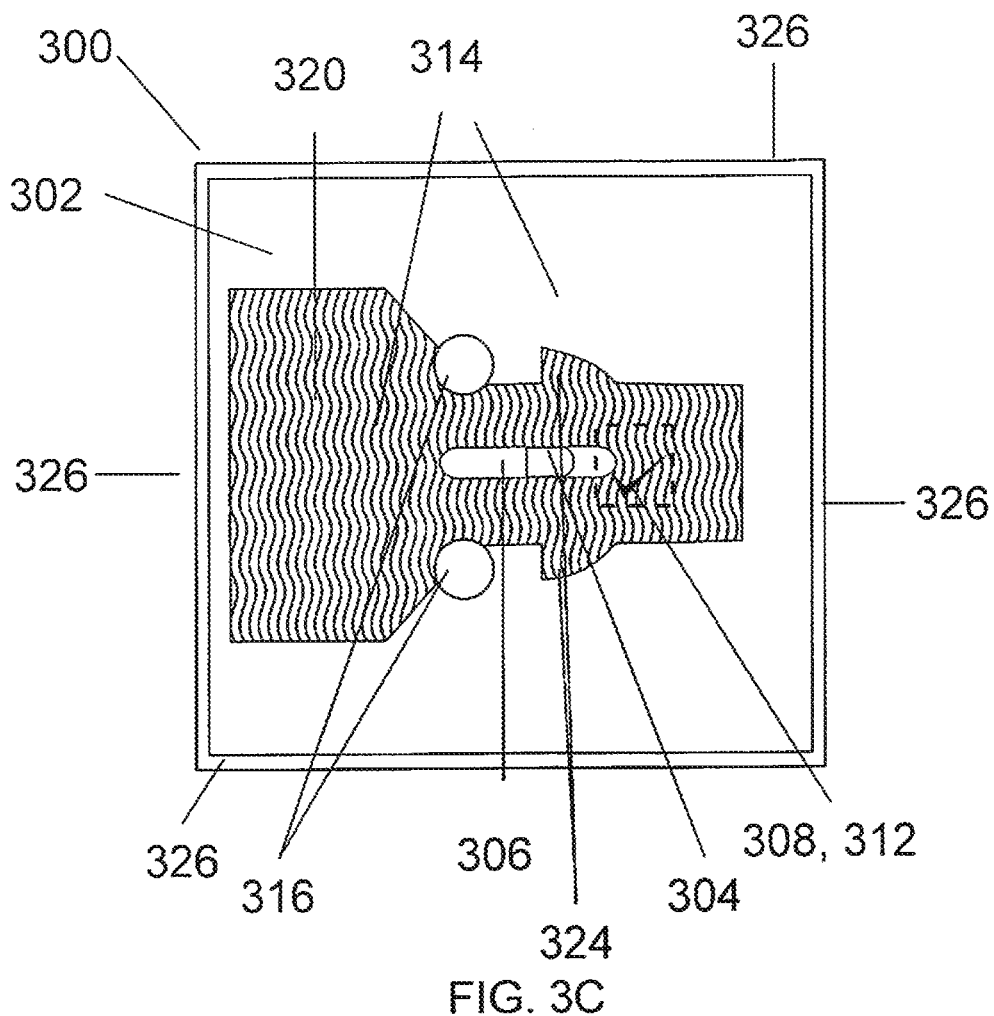
FIG. 3C is a top down view of the embodiment in FIG. 3A after exposure to a predetermined stimulus.
Figure 3D:
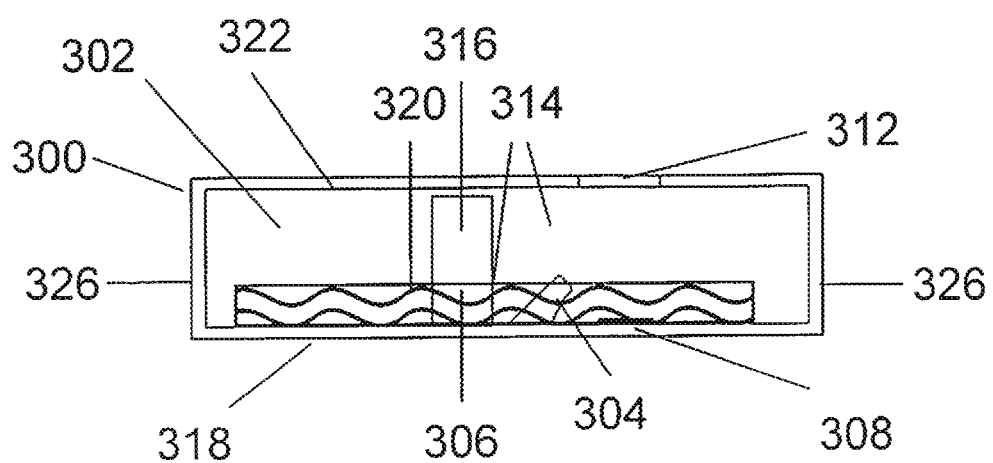
FIG. 3D is a side view of FIG. 3C.

As shown by FIG. 3A and FIG. 3B, the shrunken stimulus sensitive gel 310 contains fluid 314 and is surrounded by fluid 314 which can be absorbed by the stimulus sensitive gel 310, thereby allowing and aiding the shrunken stimulus sensitive gel 310 to swell after exposure to the predetermined stimulus. In a exemplary embodiment as illustrated by FIG. 3C and FIG. 3D, after exposure to the predetermined stimulus, the shrunken stimulus sensitive gel 310 of FIG. 3A and FIG. 3B undergoes its phase transition and the fluid 314 surrounding the shrunken gel 310 can be absorbed by the shrunken stimulus sensitive gel 310 and the shrunken stimulus sensitive gel 310 swells and expands in volume. The resulting swollen stimulus sensitive gel 320 is illustrated in FIG. 3C and FIG. 3D.

After exposure to the predetermined stimulus, which by way of example only could be the temperature of 2° C., as shown in FIG. 3C and FIG. 3D the initially shrunken stimulus sensitive gel 310 swells and expands primarily in a direction away from the first side of the compartment 302, and towards the indication spot 308. And as the shrunken stimulus sensitive gel 310 continues to swell and expand in response to the predetermined stimulus, the now swollen stimulus sensitive gel 320 reaches and at least partially covers, and preferably fully covers the indication spot 308 located below the viewing window 312, so as to provide the indication of exposure to the predetermined stimulus.

More specifically, as illustrated in FIG. 3C and FIG. 3D, as the shrunken stimulus sensitive gel 310 expands or swells, it partially or wholly covers the indicator spot 308, so that the indicator spot is at least partially or fully or completely blocked so as to be obscured from being seen through the viewing window 312 by the user, because the remainder of the compartment 302 is covered completely by the upper layer portion 322 of the device 300, and as described herein, except for the viewing window 312 the upper portion can be covered in paint or ink.

As described herein, the initially shrunken gel 310 swells or expands upon exposure to the predetermined stimulus, and continues to swell and expand so long as the indicating device 300 remains at, or by way of example only, below its predetermined stimulus (by way of example only, if the predetermined stimulus was set to 2° C., so long as the stimulus sensitive gel remained at 2° C. or below, the stimulus sensitive gel would swell or expand to a predetermined size or volume that corresponded to its temperature). Notably, the shrunken stimulus sensitive gel 310 would continue to swell and absorb fluid 314 until the swollen stimulus sensitive gel 320 partially, fully covers or obscures the indicator spot 308, and swelling in said manner, the hole 306 in the mid-section of the swollen stimulus sensitive gel 320 engages or adheres or latches or catches onto the corresponding hook 304. The hook 304 can be located at the second side of the compartment 302, which is on the same side of the compartment 302 containing the indicator spot 308. Once the hole 306 catches onto or engages with or hooks onto the hook 304, even if the predetermined stimulus were to be removed, a permanent indication that exposure to the predetermined stimulus occurred would be recorded because the hole 306 and the hook portion 304 would prevent the swollen stimulus sensitive gel 320 from retreating back to the first side of the compartment, even when the predetermined stimulus had been removed, and the swollen stimulus sensitive gel 320 reverted to be the shrunken stimulus sensitive gel 310.

As discussed herein, the stimulus indicating device 300 is able to indicate not only a predetermined stimulus but also a predetermined time. This "time lapse function" can be varied by manipulating the percentage swelling that the initially shrunken stimulus sensitive gel 310 must achieve in order to cover the indicator spot 308 completely and for the hole portion 306 to hook onto the hook portion 304 located on the second end of the single compartment 302. As discussed herein, by manipulating and/or varying the distance between the end of the top section of the winged shaped and initially shrunken stimulus sensitive gel 310, and the indicator spot 308 located on the second end of the single compartment 302 the "time lapse function" can be calculated. More specifically, the time lapse function determines the amount of time required for the shrunken stimulus sensitive gel 310 to swell far enough so that it not only travels past and covers the indicator spot 308, but in doing so, the hole portion 306 in the mid-section of the stimulus sensitive gel hooks onto the hook 304 in the single compartment 302. And as discussed herein, an indicator device 300 can be manufactured so as to not provide an indication of exposure (i.e., not completely or even partially cover or obscure the indicator spot 308) until only after a predetermined amount of time had passed, wherein that predetermined amount of time equaled the amount of time required for the shrunken stimulus sensitive gel 310 to swell and expand to a large enough size that the hole portion 306 on the stimulus sensitive gel engages with, or hooks onto, the hook portion 304. Such manipulation of the distance between the end of the top section of the stimulus sensitive gel 310 and the indicator spot 308 includes moving the indicator spot 308 farther away from or nearer to the second end of the gel, or keeping the indicator spot 308 in the same location but lengthening or shortening the shrunken stimulus sensitive gel 310 so as to manipulate the position of the second end of the gel, allows for the control of the time required for the shrunken stimulus sensitive gel 310 to cover or obscure the indicator spot 208 (which results in the hole portion 306 catching onto the hook portion 304 (and thereby results in the permanent covering or obscuring of the indicator spot 308).

An advantage of using a stimulus indicating device 300 that provides for or allows for a time lapse function is that it eliminates the possibility for false indications of exposure. For example, a vaccine may spoil at 1° C. (the predetermined stimulus). But that vaccine may only spoil if the exposure lasts three or more hours. Thus, if an indication is presented by a given stimulus indicating device prior to that three hour mark, it is properly termed a false positive or a false indication of exposure, because the vaccine had in fact not spoiled as a result of the exposure to the temperature of 1° C. Thus, it is useful that the stimulus indicating device 300 not display to the user an indication of exposure to the predetermined stimulus unless both the exposure to the predetermined stimulus occurred (by way of example only, 1° C. or less), and that exposure occurred for the predetermined amount of time (by way of example only, three or more hours). By way of example only, if the time lapse function of the stimulus indicating device is set for three hours of exposure to 1° C., the stimulus indicating device embodiments discussed herein 300 and 300 and 300 may not provide a permanent indication of exposure if that predetermined stimulus of 1° C. only lasted ninety minutes. However, a predetermined stimulus greater than 1° C. for less than three hours can provide a permanent indication of exposure.

As discussed herein, one purpose behind this exemplary embodiment of the invention is to present the user with a permanent indication of exposure, and to do so after a predetermined amount of time. Such a permanent indication of exposure could take the form of having the shrunken stimulus sensitive gel 310 expand or swell so as to become the swollen stimulus sensitive gel 320 (which is caused by the absorption of the liquid 314 when the shrunken stimulus sensitive gel 310 as it undergoes its phase transition only after exposure to the predetermined stimulus for the predetermined amount of time), thereby resulting in the swollen stimulus sensitive gel 320 preferably covering the indicator spot 308 so that it is at least partially if not fully obscured from the view of the end user through the indicator window 312 (which by way of example only, could result in a color change from green to red, or a change from a "checkmark" or "√" to an "X"), and have the indicator spot 308 remain permanently covered because of the hole 306 surrounding and catching onto the hook portion 304, which remains interlocked even after the predetermined stimulus is removed, so as to indicate to the user of the stimulus sensitive product that that product had been exposed to a harmful stimulus, such as an extreme temperature.

The predetermined temperature discussed herein that causes the swollen stimulus sensitive gel 310 to undergo its phase transition is only one example of a predetermined stimulus or trigger stimulus that can cause the stimulus sensitive gel 310 and 320 to undergo its phase transition. For example, the shrunken or swollen stimulus sensitive gel 310 of this exemplary embodiment could trigger or undergo its phase transition upon exposure to a predetermined stimulus such as a predetermined pH level, or the shrunken or swollen stimulus sensitive gel 310 of this exemplary embodiment could trigger or undergo its phase transition upon exposure to a predetermined level of electromagnetic radiation.

Figure 3E:
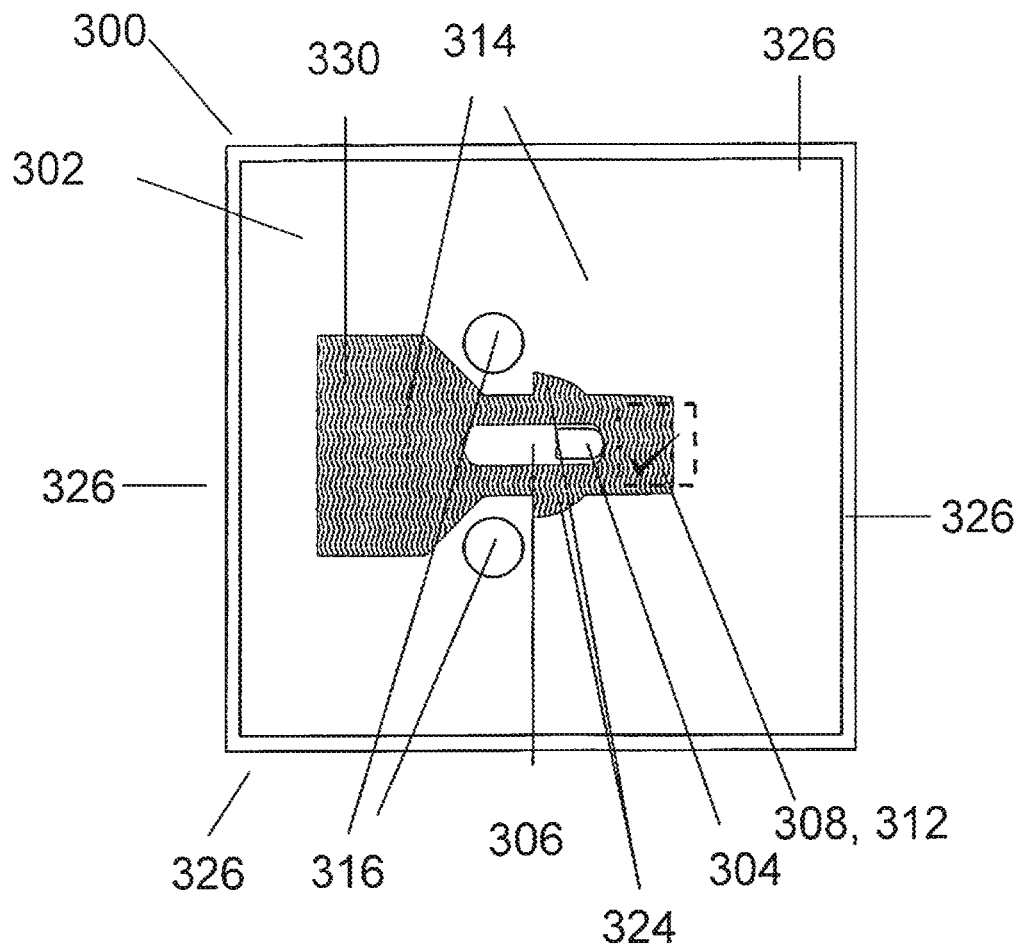
FIG. 3E is a top down view of the embodiment in FIG. 3A after exposure to a predetermined stimulus and after the predetermined stimulus has been removed.
Figure 3F:
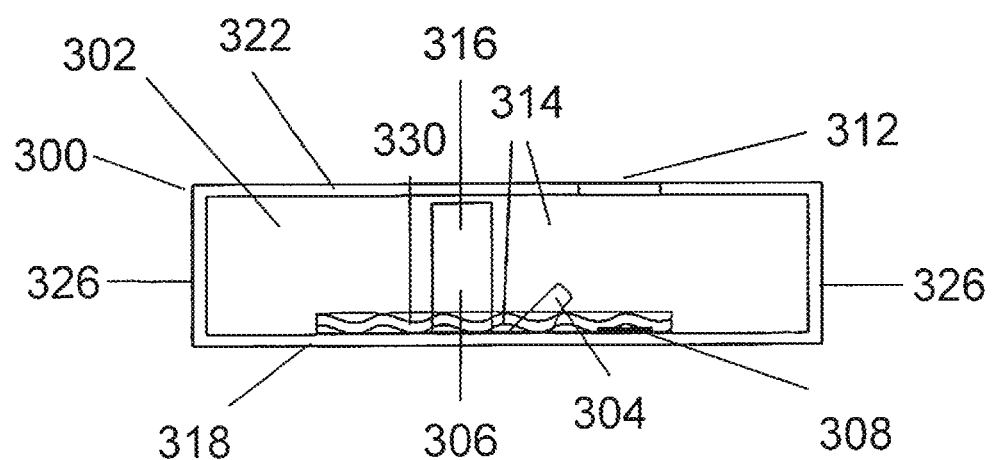
FIG. 3F is a side view of FIG. 3E.

Furthermore, as the initially shrunken stimulus sensitive gel 310 begins to resemble the swollen stimulus sensitive gel 320, after the predetermined amount of time at the predetermined stimulus, the hole portion 306 on the mid-section of the stimulus sensitive gel 310 and 320 can, for example, hook onto the hook portion 304 in the compartment 302. Once the hole portion 306 catches onto the hook portion 304, if the predetermined stimulus is removed and the swollen stimulus sensitive gel 320 that has swollen as a result of the exposure to the predetermined stimulus after the predetermined amount of time, begins to de-swell or shrink, the hole 306 hooked on the hook 304 can, for example, hold the then shrinking or shrunken stimulus sensitive gel 310 over the indicator spot 308. The then shrunken stimulus sensitive gel 310 held in place by the hole 306 hooked on the hook 304 is illustrated by FIG. 3E and FIG. 3F. As shown by these Figures, even in the shrunken state, because the shrunken stimulus sensitive gel 330 is held in place by the hole 306 hooked on the hook 304, the indicator spot 308 continues to be hidden from the end user through the window 312 by the shrunken stimulus sensitive gel 330.

It should be appreciated, that the stimulus sensitive gel 310, 320 and 330 do not have to completely hide the indicator spot 308 from the user in order to perform the intent of the present inventions (i.e., provide the indication of exposure). Instead, if even a portion of the indicator spot 308 is hidden from the view of the user through the indicator window 312, it is enough to signal to the user that the product attached to the stimulus indicating device 300 had been exposed to a potentially harmful stimulus. More specifically, although the swelling in volume of the shrunken stimulus sensitive gel 310 in all of the embodiments of the stimulus indicating device 300 discussed herein can be by any amount so long as it is registerable, preferably the increase in volume of the shrunken stimulus sensitive gel 310 should be, in some embodiments, between at least a 10 percent increase in original volume, and up to a 300 percent increase in original volume. In regard to certain embodiments of the stimulus indicating device 300 discussed herein as they pertain to the increase in the volume being "registerable" what is meant is that the shrunken stimulus sensitive gel 310 swells or increases its volume enough to cause the shrunken stimulus sensitive gel 310 to expand or swell enough so that it covers enough of the indicator spot, and the hole portion 306 reaches enough of the hook portion 304 to allow the hole 306 to hook on the hook portion 304, so that an indication of exposure, by way of example only in the form of a registerable change in color (e.g., a change in color from a first color to a second color) or indication (e.g., an indicator spot 308 that is the same color as the stimulus sensitive gel 320 but is a glyph, such as a "checkmark" disappears from view of the user of the indicator) occurs in the stimulus indicating device 300, and that indication of exposure is visible via the indicator window 312, and indicates to the user that the product had been exposed to a predetermined stimulus.

In regard to certain of embodiments of the stimulus indicating device 300 discussed herein being "irreversible" or "permanent" what is meant is that once the stimulus indicating device 300 provides an indication of exposure to an adverse stimulus extreme (which is also referred to herein as a predetermined stimulus), that indication of exposure does not change, even though the adverse stimulus extreme or predetermined stimulus might be removed in the future.

Both the backing layer 318 and the upper layer 322 and the walls 326 of the stimulus indicating device 300 can be constructed of a strong, resilient leak-proof material, such as plastic or other polymer material, so as to provide for the twisting or bending that might occur during transportation of or application to the stimulus sensitive product without tearing, breaking or leaking. Similarly, the backing layer 318 and the upper layer 322, and the walls 326 of the stimulus indicating device 300 can be constructed of any of a number of materials that have a high vapor retention including polyolefins such as polyethylene and polypropylene or cyclic olefin copolymers (COCs), for example, those included in the TOPAS® COC family of resins manufactured by TOPAS Inc. The backing layer 318 and the upper layer 322 may also be made of a material that preferably allows them to be joined and sealed together, such as by heat stamping, micro-welding or other suitable means, so as to either be joined directly to one another, or to result in the creation of the walls 326. The backing layer 318 and the upper layer 322 can both approximate the length and width of the first compartment 302, although variations in these dimensions are within the scope of the present invention. The upper layer 322 can be made of a clear material, such as plastic, so that the user of the stimulus indicating device 300 can view at least some portion of the backing layer facing into the compartment 302 or the indicator spot 308 through the indicator window 312. The upper layer 322 can also be able to accept paint or ink so as to allow for coloring or concealing at least some portion of the compartment 302.

Alternately, it is not necessary, but rather an optional embodiment, for both the backing layer 322 and the upper layer 318 and the walls 326 of the stimulus indicating device 300 to be constructed of a plastic material that has high moisture vapor retention. Furthermore, it is not necessary, but rather an optional embodiment, for the backing layer 322 and the upper layer 318 and the walls 326 of the stimulus indicating device 300 to be joined or welded or otherwise bonded together permanently. In one embodiment, the device 300 may, for example, be formed when the backing layer 322 and the upper layer 318 and the walls 326 are merely assembled or snapped together and can be made from a plastic material that has a low moisture barrier. In this alternate embodiment, the device 300 is enclosed in a pouch made from a film material having high moisture vapor retention. The inventors have discovered that a material having sufficiently high moisture vapor retention will permit moisture loss of no more than 2 weight % over a period of one year and preferably said moisture loss would occur over a period of two years. Examples of films that have sufficiently high moisture vapor retention properties that can be used in this invention include laminates containing poly (chlorotrifluoroethylene) (PCTFE), sold under the trade name Aclar, or aluminum oxide polyester. Examples of laminates that may be used in this alternate embodiment of the invention include PTATP22002 from Tekniplex which is a laminate containing a 2 mil of an inch thick layer of Aclar® sandwiched between two layers of polyethylene or Oliver Tolas TPF-0599B which is a laminate containing two layers of aluminum oxide polyester and a layer of polyethylene. However, one of ordinary skill in the art would realize that other materials are possible and that the suitability of a particular material for use in this application would be determined by testing. In order to make pouches from these materials for certain of these embodiments, the correct combination of sealing temperature and pressure must be used in order to ensure that the seal is sturdy enough to prevent leakage and ensure vapor retention. However, one skilled in the art will recognize that this description of the materials that can be used is not limiting and is intended to be optional and/or descriptive only.

Although some portion of the upper layer 322 can also accept paint or ink for coloring, it is preferable that the indicator window 312 portion of the upper layer 322 remain free from ink or coloring so that the user of the stimulus indicating device 300 can observe the first compartment 302 and specifically the indicator spot 308 through the indicator window 312, (or alternatively, the portion of the backing layer visible through the viewing window 312) as explained herein.

The stimulus sensitive gel 310, 320 and 330 employed by variations of this exemplary embodiment, as shown in FIG. 3A, FIG. 3B, FIG. 3C, FIG. 3D, FIG. 3E, and FIG. 3F, can be manufactured so as to contain a dye or colorant that is different from the color of the indicator spot 308 (or alternatively from the color of the portion of the backing layer visible through the viewing window 312). In this way the color of the stimulus sensitive gel 310, 320 and 330 in both its swollen and collapsed state, is different from the color of the indicator spot 308. Thus, when the shrunken stimulus sensitive gel 310 expands or swells in response to the predetermined stimulus, and after a predetermined amount of time, by even a partial but required amount, the change or increase in volume may result in the stimulus indicating device 300 providing the indication of exposure by changing, even at least partially, from a first color to a second color, wherein the color change is permanently visible to the user of the stimulus indicating device 300 through the indicator window 312 because of the interaction of the latching mechanism.

All embodiments discussed herein of the stimulus indicating device 300 containing the shrunken stimulus sensitive gel 310 and the swollen stimulus sensitive gel 320 may be based on any type of stimulus sensitive gel that undergoes a phase transition upon exposure of the stimulus sensitive gel to a predetermined stimulus. The types of stimulus sensitive gels can include acrylic type gels including poly n-isopropylacrylamide (PNIPAAm) gels, and/or their variations and poly(acrylamide-co-acrylic acid) (PAAm-co-PAAc), polyacrylic acid (PAAc) gels, and/or its derivatives. As is known in the art, such stimulus sensitive gels and/or other equivalent gels and/or their derivatives, undergo a significant change in volume in response to a range of stimuli, including temperature, solvent composition, pH, ionic strength, etc.

By way of example only, it is known in the art that when the predetermined stimulus is temperature, the direction of the volume change in the stimulus sensitive gel 310 and 320 used in all the embodiments of the stimulus indicating device 300 discussed herein can be selected so as to correlate to a specific situation. For example, one of ordinary skill will appreciate and understand that if the stimulus sensitive gel in this exemplary embodiment can be shrunken at the beginning of its use, as it undergoes its phase transition it may expand or swell, thereby causing a change in color or indication in the stimulus indicator 300.

By way of example only and as disclosed herein, a stimulus sensitive gel 310, 320 and 330 can be of the LCST type or the UCST type gel. As one of ordinary skill in the art will appreciate, a LCST type stimulus sensitive gel can include poly(N-isopropylacrylamide) gels, and/or its variations could be used when one wishes to have an initially shrunken stimulus sensitive gel expand or swell when cooled below a predetermined or trigger temperature and thereby absorb liquid which consequently: i) hides an indicator spot; or ii) hides a portion of the backing layer both of which result in the stimulus indicating device exhibiting a change in color or indication.

Alternatively, a UCST type stimulus sensitive gel, such as poly(acrylamide-co-acrylic acid) (PAAm-co-PAAc), polyacrylic acid (PAAc) gels, and/or its derivatives could be used when one wishes to have an initially shrunken stimulus sensitive gel expand or swell when heated above a predetermined or trigger temperature and thereby absorb liquid so as to: i) hide an indicator spot; or ii) hide the upper layer of the backing layer, both of which result in the stimulus indicating device exhibiting a change in color or indication.

One of ordinary skill in the art will understand that although the stimulus sensitive gel 310, 320 and 330 discussed herein in regard to certain of embodiments of the stimulus indicating device 300 may be of the LCST type of gel (i.e., the shrunken stimulus sensitive gel 310 can expand or swell upon exposure to its predetermined stimulus of a cooler temperature, and become the swollen stimulus sensitive gel 320; as well as collapse or shrink upon exposure to its predetermined stimulus of a warmer temperature, and become the shrunken stimulus sensitive gel 310), the range and scope of this invention includes and envisions the swollen stimulus sensitive gel 310 and the shrunken stimulus sensitive gel 320 also being of the UCST type of gel. Moreover, all the variations of the different embodiments discussed herein can be combined with the variations of other embodiments described herein and that are known in the art, as would be understood to one of ordinary skill in the art.

Polyacrylic gels can be both UCST gels and LCST gels depending on their chemical structure. Many examples of both kinds of polymers are known in the literature. For example, if the stimulus sensitive gel 310 and 320 employed in all the embodiments of the stimulus indicating device 300 discussed herein were made of LSCT type stimulus sensitive gels, it could be any number of such LCST gels, including PNIPAAm gels, and as described in U.S. Pat. No. 4,732,930 in regard to PNIPAAm, the predetermined stimulus, such as temperature at which a stimulus sensitive gel 310 and 320 undergoes its phase transition and changes volume, can be "tuned" to a particular value by adding salts, surfactants, or other substances to the gel matrix. Explanations of how the transition temperature of an LCST gel can be tuned can be found in the following references: Zhang et al., "Specific Ion Effects on the Water Solubility of Macromolecules: PNIPAM and the Hofmeister Series" Journal of the American Chemical Society volume 127 at 14505 to 14510 and Park et al., "Sodium Chloride-Induced Phase Transition in Nonionic Poly(N-isopropylacrylamide) Gel" Macromolecules volume 26 at 5045 to 5048.

Alternatively, if the stimulus sensitive gel 310 and 320 employed in all the embodiments of the stimulus indicating device 300 discussed herein were made of polyacrylic UCST type stimulus sensitive gels, it could be any number of such polyacrylic UCST gels, including: i) copolymers of hydrogen bonding donor and acceptor monomers examples of which include poly(acrylamide-co-acrylic acid), and poly (acrylamide-co-vinylacetic acid) gels; or ii) homopolymers of a single monomer species that act as both hydrogen bond donor and acceptor when exposed to aqueous sodium chloride solutions of certain concentrations, examples of which include poly(acrylic acid) gels swollen in solutions of sodium chloride dissolved in water.

In regard to the type of polyacrylic UCST gels that contain copolymers of hydrogen bonding donor and acceptor monomers (examples of which include poly(acrylamide-co-acrylic acid) and poly(acrylamide-co-vinylacetic acid) gels), these gels have been described in Dai et al, Macromolecules 39 (3006) at 6584-6589 'A Temperature-Responsive Copolymer Hydrogel in Controlled Drug Delivery.' Dai describes that the predetermined "trigger" stimulus at which a UCST gel undergoes its phase transition, and thereby absorbs the liquid 314 and thus expands or swells in volume, can be "tuned" to a particular value by changing the ratio of the hydrogen bond donor to hydrogen bond acceptor in the polymer gel, by changing the crosslinking ratio, and by changing the initiator concentration at which the gel is polymerized. Dai, however, does not specifically teach that the tuning can be done by adding various levels of sodium chloride into the gel matrix. Such "tuning" in regard to UCST type gels is discussed herein.

Alternatively, polyacrylic UCST type gels made from homopolymers of a single monomer species that act as both hydrogen bond donor and acceptor when exposed to aqueous sodium chloride solutions of certain concentrations (examples of which include poly(acrylic acid) gels swollen in solutions of sodium chloride dissolved in water) have been suggested by Buscal, European Polymer Journal, year 1982, volume 18, pages 967-974. Although one of ordinary skill in the art understands, in light of the suggestions by Buscal that these poly(acrylic acid) gels swollen in solutions of sodium chloride dissolved in water operate at sodium chloride concentrations of 400 mM or greater, the inventors have learned that these types of UCST gels actually operate better for the uses described herein when the sodium chloride concentration is less than 400 mM, and operate even better when the sodium chloride concentrations are greater than 300 mM and less than 400 nM, and operate best, in some embodiments, at the sodium chloride concentration of 300 mM.

Regardless of whether LCST type stimulus sensitive gels or UCST type stimulus sensitive gels are used to indicate exposure to a predetermined stimulus, what is notable is that the change in volume of the stimulus sensitive gel be tailored to the application in which the stimulus sensitive indicator 300 is being used. For example, a change in volume of the stimulus sensitive gel 310 and 320, and thus the corresponding absorption of liquid 314 can be insignificant or it can be dramatic. If the desired visual indication is the result of the swollen stimulus sensitive gel 310 moving to completely cover the indicator spot 308 and hiding it from the user through the indicator window 312, then a large change in volume is desirable.

More particularly, in conjunction with FIG. 3A, FIG. 3B, FIG. 3C, FIG. 3D, FIG. 3E, and FIG. 3F, by coloring the stimulus sensitive gel 310, 320 and 330 a different color than the indicator spot 308 as well as by ensuring that the swollen stimulus gel 320 is opaque enough such that when the shrunken stimulus sensitive gel 310 is exposed to the predetermined stimulus and undergoes its phase transition and swells and becomes the swollen stimulus sensitive gel 320, which covers the indicator spot 308 and hides it from the view of the user through the indicator window 312. By way of example only, the swollen stimulus sensitive gel 310, 320 and 330 may contain a suitable dye or color additive such as red. When that red colored swollen stimulus sensitive gel 320 is viewed post-phase transition through the indicator window 312 and hides the indicator spot 308 from the view of the user, it informs the user (perhaps in conjunction with a legend or color key) that the product attached to the stimulus indicating device 300 has been exposed to a potentially harmful stimulus.

In an alternate embodiment, in conjunction with FIG. 3A, FIG. 3B, FIG. 3C, FIG. 3D, FIG. 3E, and FIG. 3F, the stimulus sensitive gel 310, 320 and 330 is dyed such that when the shrunken stimulus sensitive gel 310 is exposed to the predetermined stimulus and undergoes its phase transition and becomes the swollen stimulus sensitive gel 320 it is the same color as the indicator spot 308. In doing so the swollen stimulus sensitive gel 320 does not need to be significantly opaque. Instead the visual impression through the indicator window 312 of the swollen stimulus sensitive gel 320 post-exposure to the predetermined stimulus in combination with the indicator spot 308 simply needs to appear uniform in color so that the indicator spot 308 cannot be discerned through the swollen stimulus sensitive gel 320. Because in this alternate embodiment of the embodiment, the swollen stimulus sensitive gel 320 and the indicator spot 308 are the same color, the indicator spot 308 can be a design or glyph (by way of example only, a "check mark") that, once revealed due to the shrunken stimulus sensitive gel 320 moving into the indicator window 312 and covering some or all of the indicator spot 308, the stimulus indicating device 300 can, for example, warn the user that the product attached to it had been exposed to a potentially harmful stimulus. Thus, although an actual change in color does not occur, the stimulus indicating device 300 can still provide the user with an indication that the stimulus sensitive product had been exposed to a predetermined stimulus.

In an alternate embodiment, in conjunction with FIG. 3A, FIG. 3B, FIG. 3C, FIG. 3D, FIG. 3E, and FIG. 3F, the stimulus sensitive gel 310, 320 and 330 is prepared such that when the shrunken stimulus sensitive gel 310 is exposed to the predetermined stimulus and undergoes its phase transition and becomes the swollen stimulus sensitive gel 320 it is not opaque but is translucent enough so that the color of the swollen stimulus sensitive gel 320 in combination with the color of the indicator spot 308 could result in a third color. By way of example only, if the swollen stimulus sensitive gel 320 were colored blue, and the indicator spot 308 were colored yellow, and if the swollen stimulus sensitive gel 320 were thin enough, the combination of the two colors would result in the creation of a third color—green. Thus, even though the stimulus indicating device 300 could potentially show: i) yellow prior exposure to the predetermined stimulus; ii) only green after exposure to the predetermined stimulus; and/or iii) two colors simultaneously (i.e., the green resulting from the combination of the blue of the swollen stimulus sensitive gel 320 and the yellow of the indicator spot 308, and the yellow from the indicator spot 308), such potential colors are irrelevant because the stimulus indicating device 300 would definitively indicate that the stimulus sensitive product to which it is attached had been exposed to a predetermined stimulus.

Similarly, in conjunction with FIG. 3A, FIG. 3B, FIG. 3C, FIG. 3D, FIG. 3E, and FIG. 3F, by coloring the stimulus sensitive gel 310, 320 and 330 a different color than a portion of the backing layer 318 as well as by ensuring that the swollen stimulus gel 320 is opaque enough such that when the shrunken stimulus sensitive gel 310 is exposed to the predetermined stimulus and undergoes its phase transition and swells and becomes the swollen stimulus sensitive gel 320, it covers a portion of the backing layer 318 from the view of the user through the indicator window 312. By way of example only, the swollen stimulus sensitive gel 310, 320 and 330 may contain a suitable dye or color additive such as red. When that red colored swollen stimulus sensitive gel 320 is viewed post-phase transition through the indicator window 312 and hides the indicator spot 308 from the view of the user, it informs the user (perhaps in conjunction with a legend or color key) that the product attached to the stimulus indicating device 300 has been exposed to a potentially harmful stimulus. Because the colors of the swollen stimulus sensitive gel 320 and a portion of the backing layer 318 are different, once the shrunken stimulus sensitive gel 310 undergoes its phase transition and expands or swells even partially, a portion of the backing layer 318 is at least partially hidden. In this way the user is warned that the product attached to the stimulus indicating device 300 had been exposed to a potentially harmful stimulus.

In an alternate embodiment, in conjunction with FIG. 3A, FIG. 3B, FIG. 3C, FIG. 3D, FIG. 3E, and FIG. 3F, the stimulus sensitive gel 310, 320 and 330 is prepared such that when the shrunken stimulus sensitive gel 310 is exposed to the predetermined stimulus and undergoes its phase transition and becomes the swollen stimulus sensitive gel 320 it is not opaque but is translucent enough so that the color of the swollen stimulus sensitive gel 320 in combination with the color of a portion of the backing layer 318 could result in a third color. By way of example only, if the swollen stimulus sensitive gel 320 were colored blue, and a portion of the backing layer 318 were colored yellow, and if the swollen stimulus sensitive gel 320 were thin enough, the combination of the two colors would result in the creation of a third color—green. Thus, even though the stimulus indicating device 300 could potentially show: i) yellow prior exposure to the predetermined stimulus; ii) only green after exposure to the predetermined stimulus; and/or iii) two colors simultaneously (i.e., the green resulting from the combination of the blue of the swollen stimulus sensitive gel 320 and the yellow of a portion of the backing layer 318, and the yellow from a portion of the backing layer 318), such potential colors are irrelevant because the stimulus indicating device 300 would definitively indicate that the stimulus sensitive product to which it is attached had been exposed to a predetermined stimulus.

4. Embodiments with a Magnetic Adhering Mechanism

In accordance with the purpose of certain embodiments of the invention, as embodied and broadly described herein and in conjunction with FIG. 4A, FIG. 4B, FIG. 4C, FIG. 4D, FIG. 4E, FIG. 4F, FIG. 4G, and FIG. 4H, an exemplary embodiment of the inventive stimulus indicating devices described herein can be a single compartment 402. The stimulus sensitive gel 410, 420, 430, which can be rectangularly shaped, may be placed in the compartment 402, and can have one end of the stimulus sensitive gel 410, 420 and 430 anchored to the compartment 402 by a first anchor portion 412 affixed to the stimulus sensitive gel 410, 420 and 430, and additional anchor portions can be employed if desired. In this exemplary embodiment, as well as in the other exemplary embodiments disclosed herein, the stimulus sensitive gel 410, 420 and 430 may be wholly contained in the compartment 402 and surrounded by liquid so that the stimulus sensitive gel 410, 420 and 430 may absorb that fluid and swell for its intended purpose. If a liquid is used to aid in the swelling of the stimulus sensitive gel 410, 420 and 430, this liquid may be the same as liquid 424 swelling the gel.

Figure 4A:
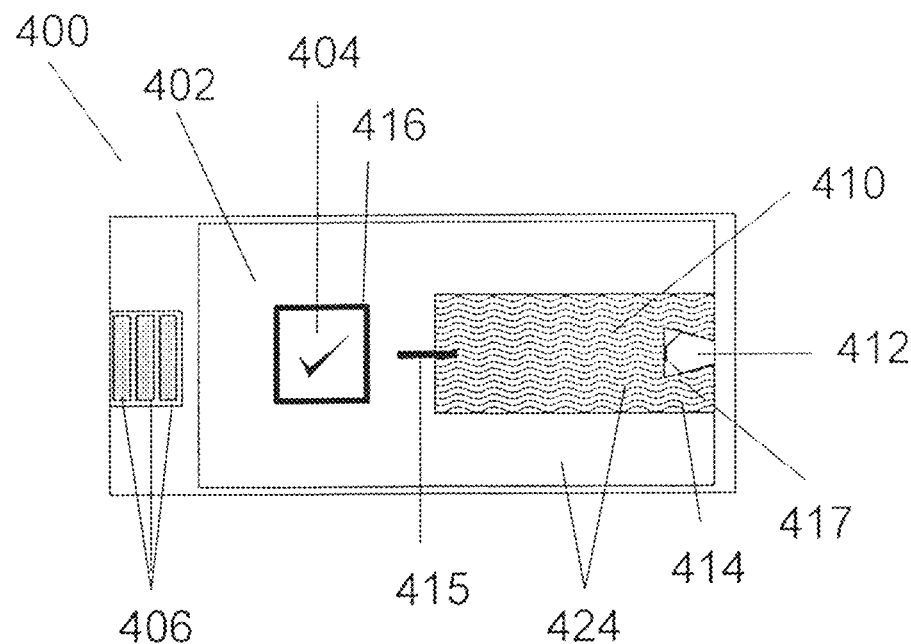
FIG. 4A is a top down view of an embodiment of the invention before exposure to a predetermined stimulus.
Figure 4B:
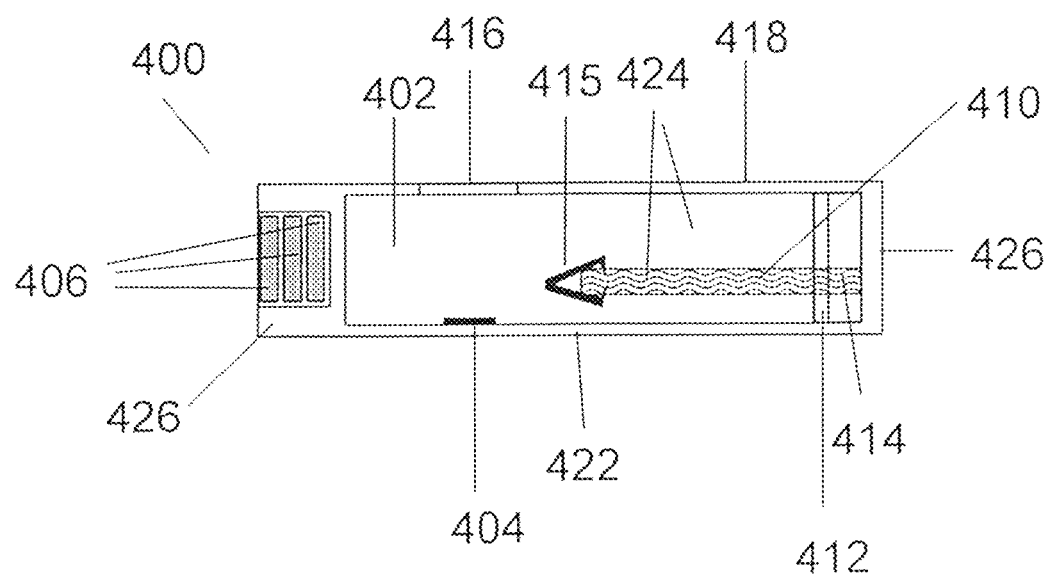
FIG. 4B is a side view of the embodiment in FIG. 4A.

An exemplary embodiment prior to exposure to the predetermined stimulus is illustrated by FIGS. 4A and 4B. As shown in at least FIG. 4A and FIG. 4B, the rectangular-shaped, and shrunken, stimulus sensitive gel 410 may be contained in the single compartment 402. The stimulus sensitive gel 410 can be anchored to the compartment 402 by the first anchor portion 412 and additional anchor portions can be employed if desired. The first anchor portion 412 can be attached to the first end 414 of the stimulus sensitive gel 410. As shown in FIG. 4A and FIG. 4B, the location of the first anchor portion 412 can be at a first side of the compartment 402.

In certain embodiments, the compartment 402 can be formed in part by the backing layer 422 on the bottom of the stimulus indicating device 400, an upper layer 418 on the top of the stimulus indicating device 400, and a surrounding wall 426 between the backing layer 422 and the upper layer 418. The top layer 418 of the stimulus indicating device 400 may contain the indicator window 416. The indicator device 400 can contain an indicator spot 404 that can be viewed through the indicator window 416.

In certain embodiments, the first anchor portion 412 affixed to the first end 414 of the stimulus sensitive gel 410 can be formed to be any one of many different shapes that will allow the stimulus sensitive gel 410 to remain attached to the first anchor portion 412 the entire time prior to and during swelling of the stimulus sensitive gel 410. An example of such an anchor portion 412 is a polygon shaped post, such as, by way of example only, that is shaped like an isogonal-like hexagon, but even a simple polygon would work. The shape of the first anchor portion 412 may match the shape of the anchor receiving portion 417 of the stimulus sensitive gel 410, 420 and 430. Another example of a first anchor portion 412 is a first magnet or metal clip, and the anchor receiving portion 417 can be replaced with an oppositely polarized magnet or magnets. Other latching mechanisms are contemplated within the scope of the invention as would be understood by one of ordinary skill in the art, and can include simply gluing or bonding the first end of the stimulus sensitive gel 410 to the first side of the compartment 402 by using a water resistant or a solvent resistant adhesive. Further, the shrunken stimulus sensitive gel 410 can also be anchored to the compartment 402 using a clamp, or a hook, or by attaching Velcro to both the stimulus sensitive gel 410 and the first side of the compartment 402.

Figure 4C:
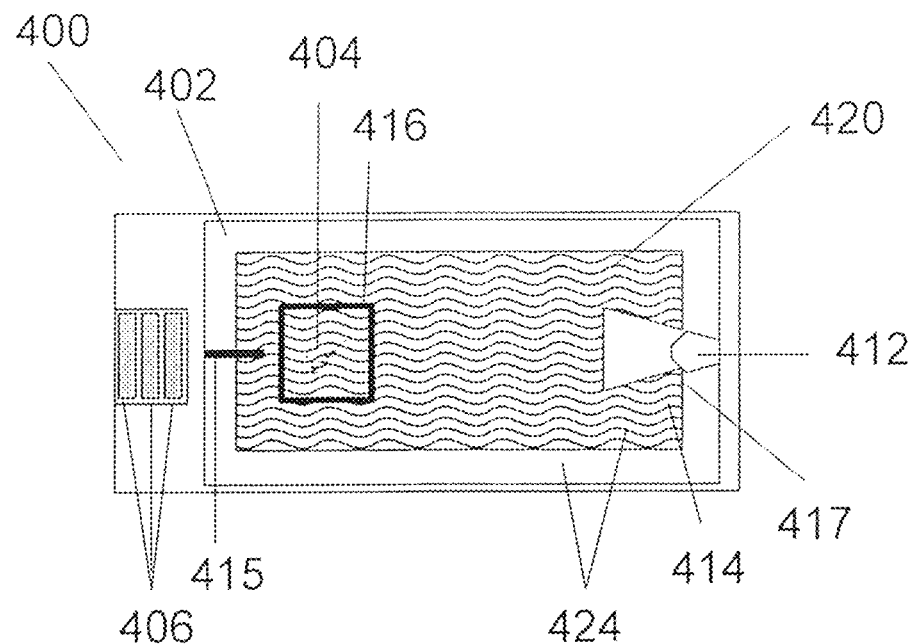
FIG. 4C is a top down view of the embodiment in FIG. 1A after exposure to a predetermined stimulus.
Figure 4D:
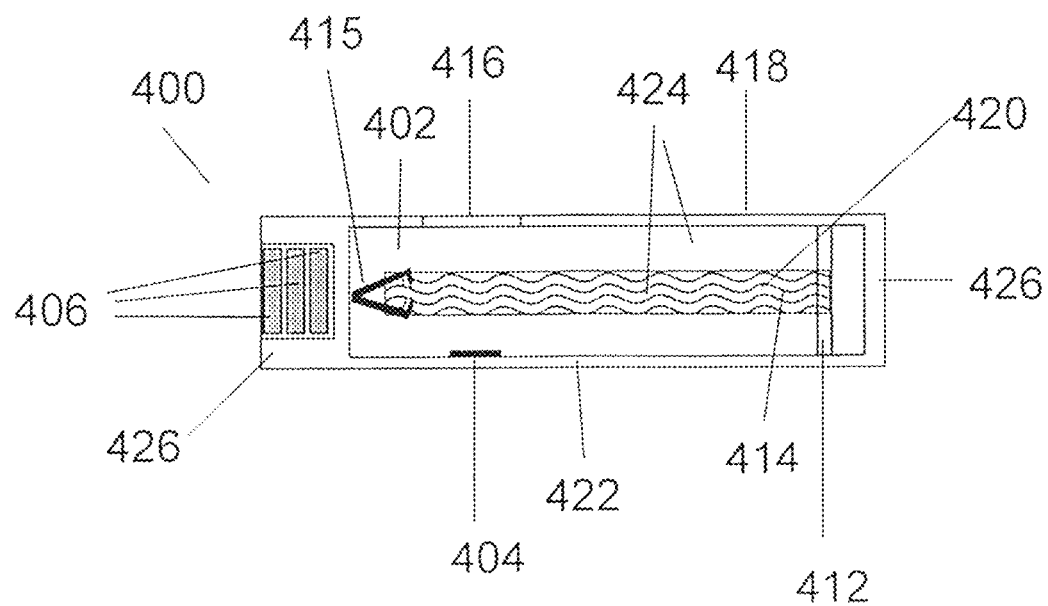
FIG. 4D is a side view of FIG. 4C.
Figure 4E:
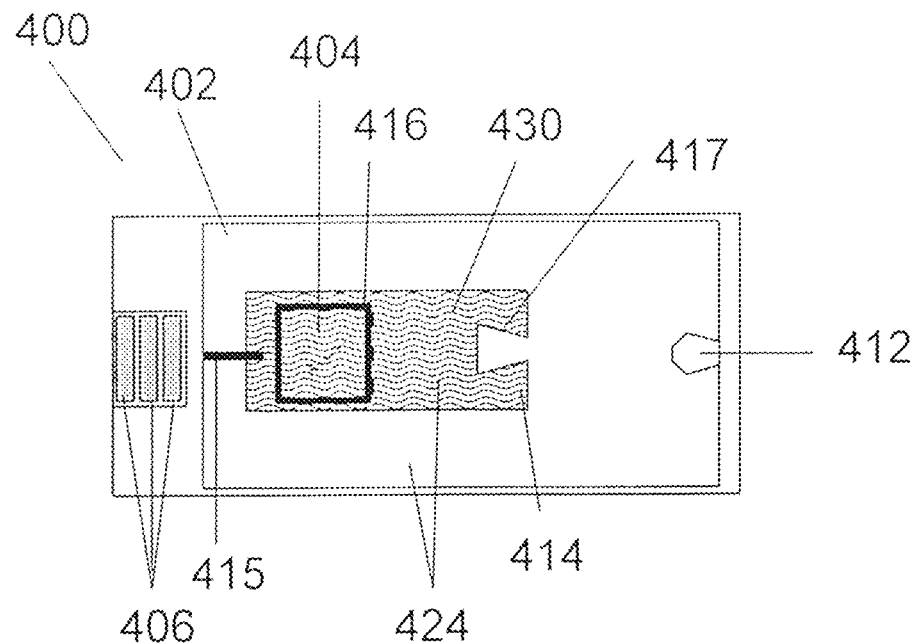
FIG. 4E is a top down view of the embodiment in FIG. 4A after exposure to a predetermined stimulus and after the predetermined stimulus has been removed.
Figure 4F:
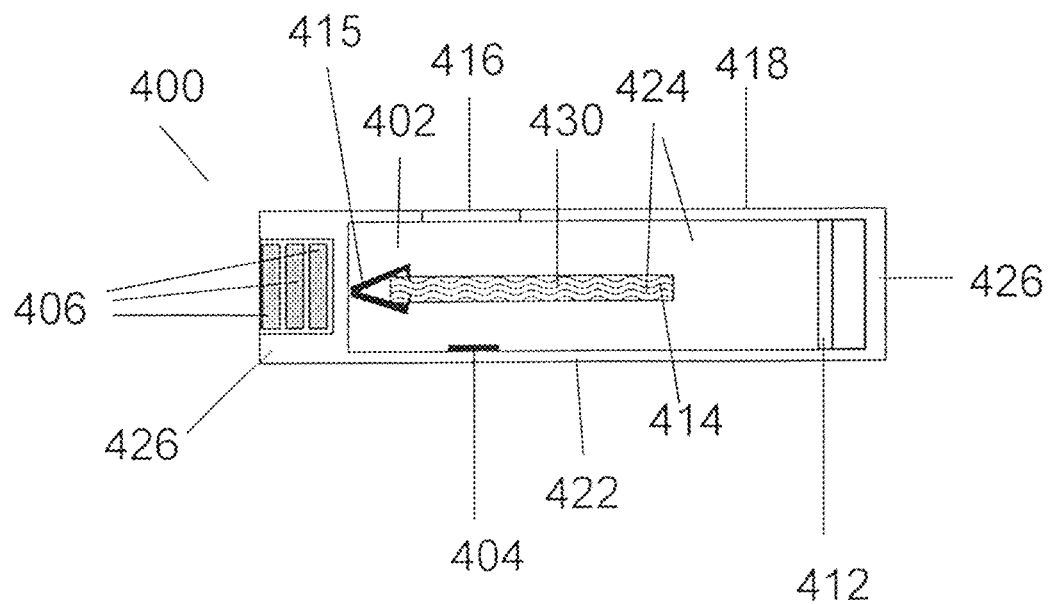
FIG. 4F is a side view of FIG. 4E.
Figure 4G:
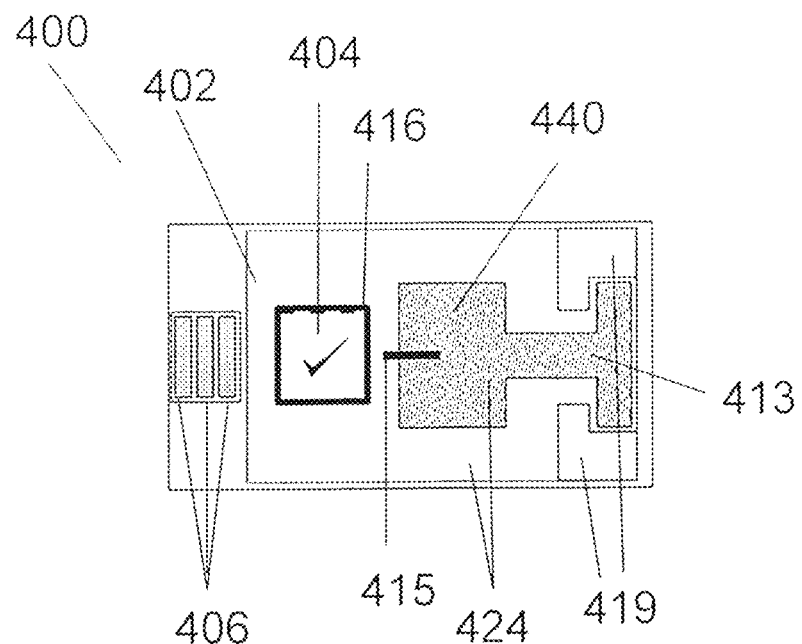
FIG. 4G is a top down view of an embodiment of the invention before exposure to a predetermined stimulus and is similar to the embodiment shown in FIG. 4A except that an anchoring feature is built into the gel and a matching receiving portion is built into the single compartment.
Figure 4H:
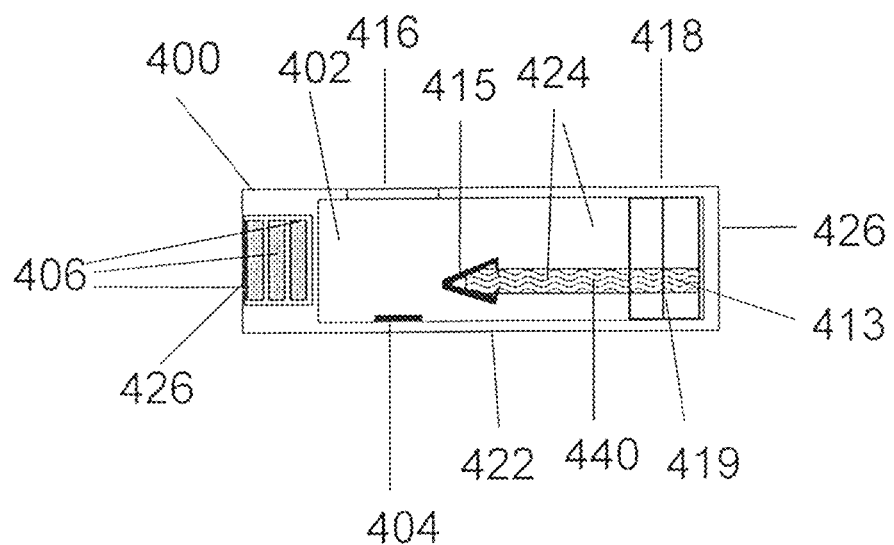
FIG. 4H is a side view of FIG. 4G.
Figure 5A:
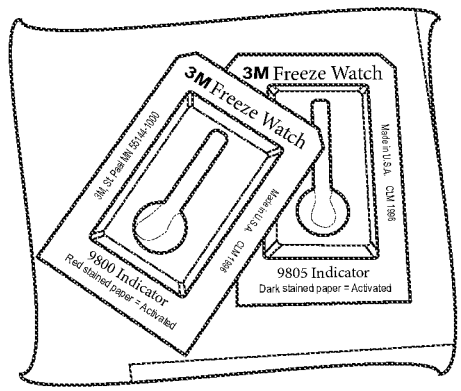
FIG. 5A (Prior Art) shows the 3M FreezeWatch®.
Figure 5B:
FIG. 5B (Prior Art) shows the TempTime FREEZEmarker.
Figure 5B:
Figure 5B:

An example of an alternatively or supplementally shaped anchor portion is shown in FIG. 4G and FIG. 4I which shows that a shrunken, stimulus sensitive gel 440 may be contained in the single compartment 402. While in FIG. 4A and FIG. 4B, the anchor portion 412 is built into the single compartment 402 and a matching receiving portion 417 is built into the shrunken stimulus sensitive gel 410, in FIG. 4G and FIG. 4I the situation is reversed: the anchor 413 is built into the shrunken gel 440 and the receiving end is built into the single compartment 402 by adding two features 419 into the single compartment. The two features 419 are designed such that they define an area that matches the shape of the anchoring feature 413 built in the gel. In this manner, the anchoring feature 413 can be inserted in the receiving area defined by the two features 419. The gel anchor portion 413 is, by way of example only, T-shaped whereas the receiving end 419 in the housing is shaped in a complementary fashion. In all other respects, the embodiment shown in FIG. 4G and FIG. 4H is the same as that shown in FIG. 4A and FIG. 4B.

In certain embodiments, although not required for the operation of the stimulus sensitive indicator device 400, securing the stimulus sensitive gel 410 to the first anchor portion by inserting the first anchoring portion 412 through the anchor receiving portion 417 on the stimulus sensitive gel 410 may prevent the stimulus sensitive gel 410 from floating or moving within the compartment and accidentally hiding the indicator spot 404 before the swollen stimulus sensitive gel 410 has undergone its phase transition, thereby preventing a false indication that the product attached to the stimulus indicator device 400 has been exposed to a predetermined stimulus.

In certain embodiments, prior to being exposed to a predetermined trigger stimulus, the shrunken stimulus sensitive gel 410 may not yet undergo a phase transition to reach its swollen volume, and thus the entire indicator spot 404 can be uncovered. The indicator spot 404 may be positioned below the indicator window 416, and can be visible through the indicator window 416 prior to the stimulus indicating device 400 being exposed to the predetermined stimulus, because the indicator spot 404 may be entirely uncovered or unobscured by the shrunken stimulus sensitive gel 410.

In certain embodiments, as shown by FIG. 4A and FIG. 4B, the shrunken stimulus sensitive gel 410 may contain fluid 424 and can be surrounded by fluid 424 which can be absorbed by the stimulus sensitive gel 410, thereby allowing and aiding the shrunken stimulus sensitive gel 410 to swell after exposure to the predetermined stimulus. In an exemplary embodiment, as illustrated by FIG. 4C and FIG. 4D, after exposure to the predetermined stimulus, the shrunken stimulus sensitive gel 410 of FIG. 4A and FIG. 4B may undergo its phase transition and the fluid 424 surrounding the shrunken gel 410 can be absorbed by the shrunken stimulus sensitive gel 410 and the shrunken stimulus sensitive gel 410 may swell and expand in volume. The resulting swollen stimulus sensitive gel 420 is illustrated in FIG. 4C and FIG. 4D.

In certain embodiments, after exposure to the predetermined stimulus, which, by way of example can be the temperature of 2° C., as shown in FIG. 4C and FIG. 4D, the initially shrunken stimulus sensitive gel 410 may swell and expand primarily in a direction away from first side of the compartment 402 containing the first anchoring portion 412, and towards the indication spot 404. And as the shrunken stimulus sensitive gel 410 continues to swell and expand in response to the predetermined stimulus, the now swollen stimulus sensitive gel 420 may reach and at least partially cover, and possibly fully cover, the indication spot 404 located below the viewing window 416, so as to provide the indication of exposure to the predetermined stimulus.

In certain embodiments, as illustrated in FIG. 4C and FIG. 4D, as the shrunken stimulus sensitive gel 410 expands or swells, it may partially or wholly cover the indicator spot 404, so that the indicator spot is at least partially, fully or completely blocked or obscured from being seen through the viewing window 416 by the user, because the remainder of the compartment 402 may be covered completely by the upper layer portion 418 of the device 400, and as described herein, except for the viewing window 416, the upper portion can be covered in paint or ink.

In certain embodiments, the initially shrunken gel 410 may swell or expand upon exposure to the predetermined stimulus, and continue to swell and expand so long as the indicating device 400 remains at, or below its predetermined stimulus (by way of example only, if the predetermined stimulus is set to 2° C., so long as the stimulus sensitive gel remains at 2° C. or below, the stimulus sensitive gel may swell or expand to a predetermined size or volume that corresponds to its temperature). Notably, the shrunken stimulus sensitive gel 410 may continue to swell and absorb fluid 424 until the swollen stimulus sensitive gel 420 not only at least partially or fully covers or obscures the indicator spot 404, but continues swelling and expanding until the metal clip portion 415 on the second end of the swollen stimulus sensitive gel 420 engages or adheres or magnetically secures to the corresponding one or more magnets 406 of the two-part magnetic adhering mechanism. The magnet portion 406 can be located at the second side of the compartment 402, which can be on the side opposite to the side of the compartment 402 containing the first anchor portion 412. In certain embodiments, once the metal clip 415 adheres to or engages with or magnetically secures to the magnet portion 406, even if the predetermined stimulus is removed, a permanent indication that exposure to the predetermined stimulus occurred may be recorded because the metal clip portion 415 and the magnet portion 406 may prevent the swollen stimulus sensitive gel 420 from retreating back to the first side of the compartment 402, even when the predetermined stimulus has been removed, and the swollen stimulus sensitive gel 420 reverts to be the shrunken stimulus sensitive gel 410.

In certain embodiments, the stimulus indicating device 400 may be able to indicate not only a predetermined stimulus but also that such stimulus occurs over at least a predetermined time period. This "time lapse function" can be varied by manipulating the percentage swelling that the initially shrunken stimulus sensitive gel 410 may achieve in order to cover the indicator spot 404 completely and for the metal clip portion 415 located on the second end of the initially shrunken stimulus gel 410 to adhere to or be magnetically secured to the magnet portion 406 located on the second end of the single compartment 402. By manipulating and/or varying the distance between metal clip portion 415 located on the second end of the initially shrunken stimulus sensitive gel 410, and the magnet portion 406, the "time lapse function" can be calculated. In certain embodiments, the time lapse function may determine the amount of time required for the shrunken stimulus sensitive gel 410 to swell far enough so that it not only travels past and covers the indicator spot 404, but it also reaches and adheres to, engages with, magnetically secures with the metal clip portion 415. In certain embodiments, an indicator device 400 can be manufactured so as to not provide an indication of exposure (i.e., not completely or even partially cover or obscure the indicator spot 404) until only after a predetermined amount of time had passed, wherein that predetermined amount of time equaled the amount of time required for the shrunken stimulus sensitive gel 410 to swell and expand to a large enough size that the metal clip portion 415 on the second end of the stimulus sensitive gel engages with, or adheres to, magnetically secures with the magnet portion 406. Such manipulation of the distance between the metal clip portion 415 and the magnet portion 406 may include moving the magnet portion 406 farther away from or nearer to the metal clip portion 415 on the second end of the stimulus sensitive gel 410, or keeping the magnet portion 406 in the same location but lengthening or shortening the shrunken stimulus sensitive gel 410 so as to manipulate the position of the metal clip portion 415, allowing for the control of the time required for the shrunken stimulus sensitive gel 410, and thus the metal clip portion 415 to reach the magnet portion 406 (which thereby may result in the permanent covering or obscuring of the indicator spot 404).

In certain embodiments, using a stimulus indicating device 400 that may provide for or allow for a time lapse function can eliminate the possibility for false indications of exposure. For example, a vaccine may spoil at 1° C. (the predetermined stimulus). But that vaccine may only spoil if the exposure lasts three or more hours. Thus, if an indication is presented by a given stimulus indicating device prior to that three hour mark, it is may be termed a false positive or a false indication of exposure, because the vaccine had in fact not spoiled as a result of the exposure to the temperature of 1° C. Thus, it is useful that the stimulus indicating device 400 not display to the user an indication of exposure to the predetermined stimulus unless both the exposure to the predetermined stimulus occurred (by way of example only, 1° C. or less), and that exposure occurred for the predetermined amount of time (by way of example only, three or more hours). In certain embodiments, if the time lapse function of the stimulus indicating device is set for three hours of exposure to 1° C. the stimulus indicating device embodiments discussed herein 100 and 200 and 300 and 400 may not provide a permanent indication of exposure if that predetermined stimulus of 1° C. only lasted ninety minutes. However, a predetermined stimulus less than 1° C. for greater than three hours can provide a permanent indication of exposure.

As discussed herein, a purpose behind this exemplary embodiment of the invention is to present the user with a permanent indication of exposure, and do so for a predetermined amount of time. Such a permanent indication of exposure may take the form of having the shrunken stimulus sensitive gel 410 expanding or swelling so as to become the swollen stimulus sensitive gel 420 (which is caused by the absorption of the liquid 424 when the shrunken stimulus sensitive gel 410 as it undergoes its phase transition only after exposure to the predetermined stimulus for the predetermined amount of time), thereby resulting in the swollen stimulus sensitive gel 420 covering the indicator spot 404 so that it is at least partially if not fully obscured from the view of the end user through the indicator window 416 (which by way of example only, can result in a color change from green to red, or a change from a "checkmark" or "✓" to an "X"), and have the indicator spot 404 remain permanently covered because of the magnetic interlocking achieved by the metal clip portion 415 and the magnet portion 406, which remains interlocked even after the predetermined stimulus is removed, so as to indicate to the user of the stimulus sensitive product that that product had been exposed to a harmful stimulus, such as an extreme temperature.

In certain embodiments, the predetermined temperature discussed herein that causes the swollen stimulus sensitive gel 410 to undergo its phase transition is an example of a predetermined stimulus or trigger stimulus that may cause the stimulus sensitive gel 410 and 420 to undergo its phase transition. For example, the shrunken or swollen stimulus sensitive gel 410 of this preferred exemplary embodiment may trigger or undergo its phase transition upon exposure to a predetermined stimulus such as a predetermined pH level, or the shrunken or swollen stimulus sensitive gel 410 of an exemplary embodiment could trigger or undergo its phase transition upon exposure to a predetermined level of electromagnetic radiation.

Furthermore, as the initially shrunken stimulus sensitive gel 410 begins to resemble the swollen stimulus sensitive gel 420, after the predetermined amount of time at the predetermined stimulus, the metal clip portion 415 on the second end of the stimulus sensitive gel 410 and 420 can, in certain embodiments, adhere with, or engage with, or adhere to, or magnetically secure to the magnet portion 406 in the compartment 402. The magnet portion 406 is a component of a magnetic adhering mechanism 406/415 and the metal clip portion 415 is another component of the magnetic adhering mechanism 406/415. Once the metal clip portion 415 adheres to the magnet portion 406, if the predetermined stimulus is removed and the swollen stimulus sensitive gel 420 that has swollen as a result of the exposure to the predetermined stimulus for the predetermined amount of time, begins to de-swell or shrink, the magnetic adhering mechanism 406/415 may, in certain embodiments, be of sufficient strength that it can hold the then shrinking or shrunken stimulus sensitive gel 410 over the indicator spot 404.

In certain embodiments, the shrunken stimulus sensitive gel 410 held in place by the magnetic adhering mechanism 406/415 is illustrated by FIG. 4E and FIG. 4F. As shown by these Figures, even in the shrunken state, because the shrunken stimulus sensitive gel 430 is held in place by the magnetic adhering mechanism 406/415, the indicator spot 404 may be hidden from the end user through the window 416 by the shrunken stimulus sensitive gel 430. As also shown in these figures, due to the strength of the magnetic adhering mechanism 406/415, if the harmful stimulus that gave rise to the swollen stimulus sensitive gel 420 is removed, the gel 420 may become the re-collapsed stimulus sensitive gel 430 and can pull out from the first anchoring portion 412 due to the anchor receiving portion 417 having an open end.

Although not required for the operation of the stimulus sensitive indicator device 400, in certain embodiments, forming the anchor receiving portion 417 with an open back end may allow the shrunken stimulus sensitive gel 430 to provide an advantage to the operation of the stimulus sensitive indicator device 400. For example, if the anchor receiving portion 417 located at the first end of the swollen stimulus sensitive gel 420 is to completely surround or enclose the first anchor portion 412, and the metal clip portion 415 located at the second end of the swollen stimulus sensitive gel 420 is adhered to the magnet portion 406, and if the predetermined stimulus is removed and the swollen stimulus sensitive gel 420 begins to de-swell or shrink, in certain embodiments, the magnetic force holding or adhering the metal clip portion 415 to the magnet portion 406 may be so strong that the then shrinking stimulus sensitive gel may tear or rip, potentially leading to a false positive or false negative indication. Alternatively, the tension in the then shrinking stimulus sensitive gel may overcome the magnetic force holding or adhering the metal clip portion 415 to the magnet portion 406, causing the metal clip portion 415 and the magnet portion 406 to separate, also potentially leading to a false positive or false negative indication. Thus, in certain embodiments, it may be advantageous to form the anchor receiving portion 417 with an open back end as shown in FIG. 4E and FIG. 4F so as to allow the anchor receiving portion 417 to disengage or release from the first anchor portion 412 when the previously swollen stimulus sensitive gel reaches a point where the tension in the stimulus sensitive gel moving from its swollen stimulus sensitive gel 420 state to the shrinking or shrunken stimulus sensitive gel 430 state may be so great that it would result in tearing or impairment of the operation of the stimulus indicating device 400, so as to possibly prevent false negative or false positive indications.

In certain embodiments, the release of the first anchoring feature 412 from the open ended anchor receiving portion 417 may occur even if the gel is not in a completely stretched configuration as a result of the magnetic portion 415 being attached to the magnet 406 and the anchor receiving portion 417 attached to the anchoring feature 412. In fact, upon being exposed to the harmful stimulus, the gel will begin to swell in a direction towards the magnet 406 and as soon as the second end of the gel containing the magnetic clip 415 enters the magnetic field of the magnet 406 it may experience sufficient pulling force towards the magnet 406 such that the anchor receiving portion 417 is pulled away from the anchoring feature 412. One skilled in the art will recognize that the fit of the anchor receiving portion 417 around the anchoring feature 412 may be manipulated such that a tighter or looser fit may be obtained. A tighter fit may be obtained, for instance, by dimensioning the anchor receiving portion 417 slightly smaller than the anchoring feature 412 or similarly by dimensioning the anchoring feature 412 slightly larger than the anchor receiving portion 417. A looser fit may be obtained, for instance, by dimensioning the anchor receiving portion 417 slightly larger than the anchoring feature 412 or similarly by dimensioning the anchoring feature 412 slightly smaller than the anchor receiving portion 417. By employing a very loose fit, it may be increasing the ease with which the anchor receiving portion 417 releases from the anchoring feature 412 and as a result under the influence of a magnetic field of sufficient strength, it may, for example, increase the ease with which the magnet 406 can attract towards it the magnetic portion 415 and thus it can decrease the time lapse function. In the other extreme, when a tighter fit is used, it is possible that a reversible indication may be observed as described above. For intermediate fits of the anchor receiving portion 417 around the anchoring portion 412, the time lapse function of the indicator is determined by the length that the gel must swell in order for the magnetic portion 415 to be in range to experience the magnetic pull force from the magnet 406.

In certain embodiments, the stimulus sensitive gel 410, 420 and 430 may not have to completely hide the indicator spot 404 from the user in order to perform the intent of the present inventions (i.e., provide the indication of exposure).

Instead, in certain embodiments, if even a portion of the indicator spot 404 is hidden from the view of the user through the indicator window 416, it may be enough to signal to the user that the product attached to the stimulus indicating device 400 has been exposed to a potentially harmful stimulus. In certain embodiments, although the swelling in volume of the shrunken stimulus sensitive gel 410 in some of the embodiments of the stimulus indicating device 400 discussed herein can be by any amount so long as it is registerable, the increase in volume of the shrunken stimulus sensitive gel 410 can be between at least a 10 percent increase in original volume, and up to an about 300 percent increase in original volume. In certain embodiments of the stimulus indicating device 400 discussed herein, the shrunken stimulus sensitive gel 410 may swell or increase its volume enough to cause the shrunken stimulus sensitive gel 410 to expand or swell enough so that it covers enough of the indicator spot 404, and the metal clip portion 415 reaches enough of the magnet portion 406 to allow the magnetic adhering mechanism 406/415 to engage, so that an indication of exposure, in certain embodiments, in the form of a registerable change in color (e.g., a change in color from a first color to a second color) or indication (e.g., an indicator spot 404 that is the same color as the stimulus sensitive gel 420 but is a glyph, such as a "checkmark" disappears from view of the user of the indicator) may occur in the stimulus indicating device 400, and that indication of exposure may be visible via the indicator window 416, and can indicate to the user that the product had been exposed to a predetermined stimulus.

In regard to certain of embodiments of the stimulus indicating device 400 discussed herein being "irreversible" or "permanent", the stimulus indicating device 400 can provide an indication of exposure to an adverse stimulus extreme (which is also referred to herein as a predetermined stimulus), that indication of exposure may not change, even though the adverse stimulus extreme or predetermined stimulus may be removed in the future.

In certain embodiments, both the backing layer 422 and the upper layer 418 and the walls 426 of the stimulus indicating device 400 can be constructed of a strong, resilient leak-proof material, such as plastic or other polymer material, so as to provide for the twisting or bending that might occur during transportation of or application to the stimulus sensitive product without tearing, breaking or leaking. Similarly, the backing layer 422 and the upper layer 418, and the walls 426 of the stimulus indicating device 400 can be constructed of any of a number of materials that have a high vapor retention including polyolefins such as polyethylene and polypropylene or cyclic olefin copolymers (COCs) such as those included in the TOPAS® COC family of resins manufactured by TOPAS Inc. The backing layer 122 and the upper layer 418 may also be made of a material that allows them to be joined and sealed together, such as by heat stamping, micro-welding or other suitable means, so as to either be joined directly to one another, or to result in the creation of the walls 426. The backing layer 422 and the upper layer 418 can both approximate the length and width of the first compartment 402, although variations in these dimensions are within the scope of the present invention. The upper layer 418 can be made of a clear material, such as plastic, so that the user of the stimulus indicating device 400 can view at least some portion of the backing layer facing into the compartment 402 or the indicator spot 404 through the indicator window 416. The upper layer 418 can also be able to accept paint or ink so as to allow for coloring or concealing at least some portion of the compartment 402.

Alternately, it may not, for example, for certain embodiments, be necessary for both the backing layer 422 and the upper layer 418 and the walls 426 of the stimulus indicating device 400 to be constructed of a plastic material that has high moisture vapor retention. Furthermore, it may not, for example, for certain embodiments, be necessary for the backing layer 422 and the upper layer 418 and the walls 426 of the stimulus indicating device 400 to be joined or welded or otherwise bonded together permanently. In one embodiment, the device 400 may be formed when the backing layer 422 and the upper layer 418 and the walls 426 are merely assembled or snapped together and can be made from a plastic material that has a low moisture barrier. In this alternate embodiment, the device 400 is enclosed in a pouch made from a film material having high moisture vapor retention. The inventors have discovered that a material having sufficiently high moisture vapor retention will permit moisture loss of no more than 2 weight % over a period of one year and preferably said moisture loss would occur over a period of two years. Examples of films that have sufficiently high moisture vapor retention properties that can be used in this invention include laminates containing poly (chlorotrifluoroethylene) (PCTFE), sold under the trade name Aclar, or aluminum oxide polyester. Examples of laminates that may be used in this alternate embodiment of the invention include PTATP22002 from Tekniplex which is a laminate containing a 2 mil of an inch thick layer of Aclar® sandwiched between two layers of polyethylene or Oliver Tolas TPF-0599B which is a laminate containing two layers of aluminum oxide polyester and a layer of polyethylene. However, one of ordinary skill in the art would realize that other materials are possible and that the suitability of a particular material for use in this application would be determined by testing. In order to make pouches from these materials, the correct combination of sealing temperature and pressure must be used in order to ensure that the seal is sturdy enough to prevent leakage and ensure vapor retention. However, one skilled in the art will recognize that this description of the materials that can be used is not limiting and is intended to be optional and/or descriptive only.

Although some portion of the upper layer 418 can also accept paint or ink for coloring, in some embodiments, the indicator window 416 portion of the upper layer 418 may remain free from ink or coloring so that the user of the stimulus indicating device 400 can observe the first compartment 402 and specifically the indicator spot 404 through the indicator window 416, (or alternatively, the portion of the backing layer visible through the viewing window 416) as explained herein.

The stimulus sensitive gel 410, 420 and 430 employed by the variations of this exemplary embodiment, as shown in FIG. 4A, FIG. 4B FIG. 4C, FIG. 4D, FIG. 4E, FIG. 4F, FIG. 4G, and FIG. 4H can be manufactured so as to contain a dye or colorant that is different from the color of the indicator spot 404 (or alternatively from the color of the portion of the backing layer visible through the viewing window 416). In this way, in certain embodiments, the color of the stimulus sensitive gel 410, 420, 430 and 440 in both its swollen and collapsed state, is different from the color of the indicator spot 404. Thus, when the shrunken stimulus sensitive gel 410 expands or swells in response to the predetermined stimulus, and only after a predetermined amount of time, by even a partial but required amount, the change or increase in volume may result in the stimulus indicating device 400 providing the indication of exposure by changing, even at least partially, from a first color to a second color, wherein the color change is permanently visible to the user of the stimulus indicating device 400 through the indicator window 416 because of the interaction of the latching mechanism.

Some embodiments discussed herein of the stimulus indicating device 400 containing the shrunken stimulus sensitive gel 410 and the swollen stimulus sensitive gel 420 may be based on any type of stimulus sensitive gel that undergoes a phase transition upon exposure of the stimulus sensitive gel to a predetermined stimulus. Some types of stimulus sensitive gels can include acrylic type gels including poly n-isopropylacrylamide (PNIPAAm) gels, and/or their variations and poly(acrylamide-co-acrylic acid) (PAAm-co-PAAc), polyacrylic acid (PAAc) gels, and/or its derivatives. As is known in the art, such stimulus sensitive gels and/or other equivalent gels and/or their derivatives, may undergo a significant change in volume in response to a range of stimuli, including temperature, solvent composition, pH, ionic strength, etc.

When the predetermined stimulus is temperature, the direction of the volume change in the stimulus sensitive gel 410 and 420 used in some of the embodiments of the stimulus indicating device 400 discussed herein can be selected so as to correlate to a specific situation. For example, one of ordinary skill will appreciate and understand that if the stimulus sensitive gel in this exemplary embodiment is shrunken at the beginning of its use, as it undergoes its phase transition it may, for example, expand or swell, thereby causing a change in color or indication in the stimulus indicator 100.

In certain embodiments, a stimulus sensitive gel 410, 420 and 430 can be of the LCST type or the UCST type gel. A LCST type stimulus sensitive gel, such poly(N-isopropylacrylamide) gels, and/or its variations can be used to have an initially shrunken stimulus sensitive gel expand or swell when cooled below a predetermined or trigger temperature and thereby absorb liquid which consequently: i) hides an indicator spot; or ii) hides the upper portion of the backing layer both of which result in the stimulus indicating device exhibiting a change in color or indication.

In certain embodiments, a UCST type stimulus sensitive gel, such as poly(acrylamide-co-acrylic acid) (PAAm-co-PAAc), polyacrylic acid (PAAc) gels, and/or its derivatives can be used to have an initially shrunken stimulus sensitive gel expand or swell when heated above a predetermined or trigger temperature and thereby absorb liquid so as to: i) hide an indicator spot; or ii) hides the upper portion of the backing layer, both of which may result in the stimulus indicating device exhibiting a change in color or indication.

In certain embodiments, although the stimulus sensitive gel 410, 420 and 430 discussed herein in regard to certain of embodiments of the stimulus indicating device 400 may be of the LCST type of gel (i.e., the shrunken stimulus sensitive gel 410 may expand or swell upon exposure to its predetermined stimulus of a cooler temperature, and become the swollen stimulus sensitive gel 420, as well as collapse or shrink upon exposure to its predetermined stimulus of a warmer temperature, and become the shrunken stimulus sensitive gel 410), the range and scope of this invention can include and envision the swollen stimulus sensitive gel 410 and the shrunken stimulus sensitive gel 420 also being of the UCST type of gel. Moreover, all the variations of the different embodiments discussed herein can be combined with the variations of other embodiments described herein and that are known in the art.

Polyacrylic gels can be both UCST gels and LCST gels depending on their chemical structure. Many examples of both kinds of polymers are known in the literature. For example, if the stimulus sensitive gel 410 and 420 employed in some the embodiments of the stimulus indicating device 100 discussed herein were made of LSCT type stimulus sensitive gels, it could be any number of such LCST gels, including PNIPAAm gels, and as described in U.S. Pat. No. 4,732,930 in regard to PNIPAAm, In certain embodiments, the predetermined stimulus, such as temperature at which a stimulus sensitive gel 110 and 120 undergoes its phase transition and changes volume, can be "tuned" to a particular value by adding salts, surfactants, or other substances to the gel matrix. Explanations of how the transition temperature of an LCST gel can be tuned can be found in the following references: Zhang et al., "Specific Ion Effects on the Water Solubility of Macromolecules: PNIPAM and the Hofmeister Series" Journal of the American Chemical Society volume 127 at 14505 to 14510 and Park et al., "Sodium Chloride-Induced Phase Transition in Nonionic Poly(N-isopropylacrylamide) Gel" Macromolecules volume 26 at 5045 to 5048, both of which are incorporated by reference herein.

In certain embodiments, if the stimulus sensitive gel 410 and 420 employed in some of the embodiments of the stimulus indicating device 100 discussed herein were made of polyacrylic UCST type stimulus sensitive gels, it can be any number of such polyacrylic UCST gels, including: i) copolymers of hydrogen bonding donor and acceptor monomers examples of which include poly(acrylamide-co-acrylic acid), and poly(acrylamide-co-vinylacetic acid) gels; or ii) homopolymers of a single monomer species that act as both hydrogen bond donor and acceptor when exposed to aqueous sodium chloride solutions of certain concentrations, examples of which include poly(acrylic acid) gels swollen in solutions of sodium chloride dissolved in water.

In regard to the type of polyacrylic UCST gels that contain copolymers of hydrogen bonding donor and acceptor monomers (examples of which include poly(acrylamide-co-acrylic acid) and poly(acrylamide-co-vinylacetic acid) gels), these gels are described in Dai et al, Macromolecules 39 (2006) at 6584-6589 'A Temperature-Responsive Copolymer Hydrogel in Controlled Drug Delivery', which is hereby incorporated by reference. Dai describes that the predetermined "trigger" stimulus at which a UCST gel undergoes its phase transition, and thereby absorbs the liquid 114 and thus expands or swells in volume, can be "tuned" to a particular value by changing the ratio of the hydrogen bond donor to hydrogen bond acceptor in the polymer gel, by changing the crosslinking ratio, and by changing the initiator concentration at which the gel is polymerized. Dai, however, does not specifically teach that the tuning can be done by adding various levels of sodium chloride into the gel matrix. Such "tuning" in regard to UCST type gels is discussed herein.

In certain embodiments, polyacrylic UCST type gels made from homopolymers of a single monomer species that act as both hydrogen bond donor and acceptor when exposed to aqueous sodium chloride solutions of certain concentrations (examples of which include poly(acrylic acid) gels swollen in solutions of sodium chloride dissolved in water) have been suggested by Buscal, European Polymer Journal, year 1982, volume 18, pages 967-974, which is hereby incorporated by reference. Although one of ordinary skill in the art understands, in light of the suggestions by Buscal that these poly(acrylic acid) gels swollen in solutions of sodium chloride dissolved in water operate at sodium chloride concentrations of 400 mM or greater, the inventors have learned that these types of UCST gels actually operate better for the uses described herein when the sodium chloride concentration is less than 400 mM, and operate even better when the sodium chloride concentrations are greater than 200 mM and less than 400 nM, and operate best in some embodiments at the sodium chloride concentration of 300 mM.

Regardless of whether LCST type stimulus sensitive gels or UCST type stimulus sensitive gels are used to indicate exposure to a predetermined stimulus, in certain embodiments, the change in volume of the stimulus sensitive gel can be tailored to the application in which the stimulus sensitive indicator 100 is being used. For example, a change in volume of the stimulus sensitive gel 410 and 420, and thus the corresponding imbibing of liquid 424 can be insignificant or it can be dramatic. If the desired visual indication is the result of the swollen stimulus sensitive gel 410 moving to completely cover the indicator spot 404 and hiding it from the user through the indicator window 416, then a large change in volume can be desirable in some embodiments.

In certain embodiments, in conjunction with FIG. 4A, FIG. 4B, FIG. 4C, FIG. 4D, FIG. 4E, FIG. 4F, FIG. 4G, and FIG. 4H, by coloring the stimulus sensitive gel 410, 420, 430 and 440 a different color than the indicator spot 404 as well as by ensuring that the swollen stimulus gel 420 is opaque enough such that when the shrunken stimulus sensitive gel 410 is exposed to the predetermined stimulus and undergoes its phase transition and it can swell and become the swollen stimulus sensitive gel 420, which covers the indicator spot 104 and hides it from the view of the user through the indicator window 416. By way of example only, the swollen stimulus sensitive gel 410, 420 and 430 may contain a suitable dye or color additive such as red. When that red colored swollen stimulus sensitive gel 420 is viewed post-phase transition through the indicator window 416 and hides the indicator spot 404 from the view of the user, it can inform the user (perhaps in conjunction with a legend or color key) that the product attached to the stimulus indicating device 100 has been exposed to a potentially harmful stimulus.

In certain embodiments, in conjunction with FIG. 4A, FIG. 4B, FIG. 4C, FIG. 4D, FIG. 4E, FIG. 4F, FIG. 4G, and FIG. 4H, the stimulus sensitive gel 410, 420, 430 and 440 is dyed such that when the shrunken stimulus sensitive gel 410 is exposed to the predetermined stimulus and undergoes its phase transition and becomes the swollen stimulus sensitive gel 420, it can be the same color as the indicator spot 404. In doing so the swollen stimulus sensitive gel 420 may not need to be significantly opaque. Instead the visual impression through the indicator window 416 of the swollen stimulus sensitive gel 420 post-exposure to the predetermined stimulus in combination with the indicator spot 404 may need to appear uniform in color so that the indicator spot 404 cannot be discerned through the swollen stimulus sensitive gel 420. Because in this exemplary embodiment the swollen stimulus sensitive gel 420 and the indicator spot 404 are the same color, the indicator spot 404 can be a design or glyph (by way of example only, a "check mark") that, once revealed due to the shrunken stimulus sensitive gel 420 moving into the indicator window 416 and covering some or all of the indicator spot 404, the stimulus indicating device 400 can, for example, warn the user that the product attached to it had been exposed to a potentially harmful stimulus. Thus, although an actual change in color does not occur, the stimulus indicating device 400 can still provide the user with an indication that the stimulus sensitive product had been exposed to a predetermined stimulus.

In certain embodiments, in conjunction with FIG. 4A, FIG. 4B, FIG. 4C, FIG. 4D, FIG. 4E, FIG. 4F, FIG. 4G, and FIG. 4H, the stimulus sensitive gel 410, 420, 430 and 440 may be prepared such that when the shrunken stimulus sensitive gel 410 is exposed to the predetermined stimulus and undergoes its phase transition and becomes the swollen stimulus sensitive gel 420, it is not opaque but is translucent enough so that the color of the swollen stimulus sensitive gel 420 in combination with the color of the indicator spot 404 can result in a third color. By way of example only, if the swollen stimulus sensitive gel 420 is colored blue, and the indicator spot 404 is colored yellow, and if the swollen stimulus sensitive gel 420 were thin enough, the combination of the two colors may result in the creation of a third color—green. Thus, even though the stimulus indicating device 400 can potentially show: i) yellow prior exposure to the predetermined stimulus; ii) only green after exposure to the predetermined stimulus; and/or iii) two colors simultaneously (i.e., the green resulting from the combination of the blue of the swollen stimulus sensitive gel 420 and the yellow of the indicator spot 404, and the yellow from the indicator spot 404), such potential colors may be irrelevant because the stimulus indicating device 100 would definitively indicate that the stimulus sensitive product to which it is attached has been exposed to a predetermined stimulus.

In certain embodiments, in conjunction with FIG. 4A, FIG. 4B, FIG. 4C, FIG. 4D, FIG. 4E, FIG. 4F, FIG. 4G, and FIG. 4H, by coloring the stimulus sensitive gel 410, 420, 430 and 440 a different color than a portion of the backing layer 422 as well as by ensuring that the swollen stimulus gel 420 is opaque enough such that when the shrunken stimulus sensitive gel 410 is exposed to the predetermined stimulus and undergoes its phase transition and swells and becomes the swollen stimulus sensitive gel 420, it may cover a portion of the backing layer 422 from the view of the user through the indicator window 416. For example, the swollen stimulus sensitive gel 410, 420 and 430 may contain a suitable dye or color additive such as red. When that red colored swollen stimulus sensitive gel 420 is viewed post-phase transition through the indicator window 416 and hides the indicator spot 404 from the view of the user, it may inform the user (perhaps in conjunction with a legend or color key) that the product attached to the stimulus indicating device 400 has been exposed to a potentially harmful stimulus. Because the colors of the swollen stimulus sensitive gel 420 and a portion of the backing layer 422 are different, once the shrunken stimulus sensitive gel 410 undergoes its phase transition and expands or swells even partially, a portion of the backing layer 422 may be at least partially hidden. In this way the user is warned that the product attached to the stimulus indicating device 400 had been exposed to a potentially harmful stimulus.

In certain embodiments, in conjunction with FIG. 4A, FIG. 4B, FIG. 4C, FIG. 4D, FIG. 4E, FIG. 4F, FIG. 4G, and FIG. 4H, the stimulus sensitive gel 410, 420, 430 and 440 can be prepared such that when the shrunken stimulus sensitive gel 410 is exposed to the predetermined stimulus and undergoes its phase transition and becomes the swollen stimulus sensitive gel 420 it is not opaque but is translucent enough so that the color of the swollen stimulus sensitive gel 420 in combination with the color of a portion of the backing layer 422 can result in a third color. For example, if the swollen stimulus sensitive gel 420 is colored blue, and a portion of the backing layer 422 is colored yellow, and if the swollen stimulus sensitive gel 420 is thin enough, the combination of the two colors may result in the creation of a third color—green. Thus, even though the stimulus indicating device 400 can potentially show: i) yellow prior exposure to the predetermined stimulus; ii) only green after exposure to the predetermined stimulus; and/or iii) two colors simultaneously (i.e., the green resulting from the combination of the blue of the swollen stimulus sensitive gel 420 and the yellow of a portion of the backing layer 422, and the yellow from a portion of the backing layer 422), such potential colors may be irrelevant because the stimulus indicating device 400 would definitively indicate that the stimulus sensitive product to which it is attached had been exposed to a predetermined stimulus.

Method for Manufacturing; Doping and Setting the Trigger Temperature of a Stimulus Sensitive Gel For all the embodiments of the stimulus sensitive gel discussed herein, the stimulus sensitive gel can be manufactured to undergo its phase transition at any predetermined stimulus. By way of example only, the stimulus sensitive gel discussed herein could be of the LCST type and could be made to trigger or undergo its phase transition (i.e., expand or swell and absorb liquid) upon exposure to a temperature of less than 2° C. Alternatively, and by way of example only, the stimulus sensitive gel discussed herein could be of the UCST type and could be made to trigger or undergo its phase transition (i.e., expand or swell and absorb liquid) upon exposure to a temperature greater than 8° C. It will be understood by one of ordinary skill in the art that other temperatures and/or stimuli can be set as the predetermined stimulus by varying the method and/or ingredients disclosed herein.

By way of example only, the discussion below will disclose an exemplary way to make a shrunken stimulus sensitive gel of the LCST type, which undergoes its phase transition (i.e., expands or swells and thereby absorbs the liquid contained in housing or compartment that contains the stimulus sensitive gel) upon being exposed to a temperature cooler than 2° C.

The method of manufacturing such a swollen stimulus sensitive gel comprises at least three steps, and depending on the embodiment being employed there are variations in the second and third steps that are dependent upon the particular embodiment.

In the first step, a mixture of N-isopropylacrylamide (NIPAAm) and Laponite RD can be polymerized together at room temperature to form a poly(N-isopropylacrylamide) gel (abbreviated NIPAAm gel). The polymerization is carried out using a redox initiation pair. The gel is washed with copious amounts of water to remove any unreacted components or byproducts of the polymerization.

In the second step, the resulting NIPAAm gel is dyed with a suitable dye. This can be done by immersing the washed and swollen NIPAAm gel in an appropriate dye solution. Depending on the embodiment employed, there could be a variation in the second step, the NIPAAm gel may be dried partially or completely and then immersed in the dye solution.

In the third step, the transition temperature of the NIPAAm gel is adjusted to the desired transition temperature via the addition of salts or solvents. Once the amounts of additives required to obtain gel formulations that trigger at the desired transition temperature are well established, the steps described herein for determining those amounts need not, in certain embodiments, be repeated for the manufacture of future gels. The washed, dyed and swollen NIPAAm gel are immersed in solutions containing salts or solvents and then swollen in these solutions by placing in a cold temperature, for instance at least −1° C. but a lower temperature is preferred as long as the temperature does not freeze the salt or solvent solution. Depending on the embodiment employed, there could be a variation in the third step wherein the washed and dyed NIPAAm gels are dried and immersed in solutions containing salts or solvents required for the desired transition temperature.

The resulting polymer gel (i.e., the doped stimulus sensitive gel) may initially have had a transition temperature of approximately 33° C., but by the completion of the third step in any of its variations, the transition temperature of the resulting polymer gel (i.e. the doped stimulus sensitive gel) is shifted to the desired temperature (e.g., 2° C.).

The first three steps taken together including any variations of the second or third steps comprise the process of preparing a stimulus sensitive gel that may undergo its phase transition upon being exposed to a predetermined stimulus as well as provide foolproof, permanent and irreversible indication of the stimulus sensitive product's exposure to such stimulus.

1. Preparation of NIPAAm Gels by Copolymerization of N-Isopropylacrylamide

By way of example only, the swollen stimulus sensitive gel is prepared as an LCST type of polymer gel, and by way of example only, this LCST type of polymer gel is created via the polymerization of N-isopropylacrylamide, so as to form a poly(N-isopropylacrylamide) gel (abbreviated NIPAAm gel). This polymerization is accomplished by employing the following ingredients, although one of ordinary skill in the art will recognize that certain of the following ingredients can be replaced by other similar types of ingredients, and recognizes/understands that the amounts of the ingredients are exemplary only. Accordingly, the amounts of the ingredients can be varied by any amount so long as the desired gel is created. Moreover, the amounts can be increased or decreased proportionally so that larger or smaller amounts of swollen stimulus sensitive gel can be created.

The ingredients include:
i) between 3 and 7 grams of n-isopropylacrylamide (preferably >98% purity from TCI America);
ii) between 0.05 and 0.75 grams of Laponite RD (from BYK additives, an ALTANA company);
iii) 50 grams of distilled and deionized water;
iv) between 0.01 and 0.5 grams of N,N'-methylenebisacrylamide (preferably electrophoresis grade from Aldrich);
v) between 0.05 and 0.5 grams of Ammonium Persulfate (from Aldrich); and
vi) 50 microliters of N, N, N', N'-tetramethylethylenediamine (TEMED).

In order to manufacture such gel, the following method is preferably followed, although one of ordinary skill in the art will recognize that certain steps can be performed in varying order, and the amounts can be varied as described herein or as known to one of ordinary skill in the art:
  i) place between 0.05 and 0.75 grams of laponite, the between 0.01 and 0.5 grams of methylenebisacrylamide, between 3 and 7 grams N-isopropylacrylamide and 50 grams of water in a glass container and stir for approximately one hour until contents are dispersed resulting in a transparent, homogeneous solution;

Here we may use varying amounts of crosslinker N,N'-methylenebisacrylamide since the crosslinking density affects the mechanical properties of the gel as well as the resolution of the phase transition. For example, holding all other parameters constant, a gel with a low cross-link density, which may generally be equivalent to incorporating low amounts of N,N'-methylenebisacrylamide in the gel, may exhibit good resolution around the trigger temperature.

What is meant by good resolution around the transition temperature is that the gel will generally only transition when the harmful stimulus is in very close proximity to the trigger temperature of the gel. However, gels prepared with a low cross-link density generally have poor mechanical integrity, which may make it difficult to process or handle them. On the other hand, in certain gels the cross-link density may be high corresponding, for example, to large amounts of N,N'-methylenebisacrylamide incorporated in the gel. The mechanical integrity of these gels may be improved, but the resolution of the gel response around the transition temperature may be poor compared to the use of a gel with low cross-link density. Hence, it is desirable to optimize the N,N'-methylenebisacrylamide concentration to obtain good resolution and improve the ease of handling the gel material for the preparation of certain embodiments.

ii) stir until contents are dispersed resulting in transparent, homogeneous solution, typically one hour;
  iii) bubble in nitrogen gas for 20 minutes while stirring gently;

The level of dissolved oxygen in this sample after the nitrogen treatment should not exceed 1 ppm.

iv) then added between 0.05 and 0.5 grams of ammonium persulfate to the solution while still bubbling in nitrogen and after the persulfate is added, stir more vigorously;
  v) continue the stirring for two minutes, and thereafter add the 50 microliters of TEMED;

One of ordinary skill in the art will recognize that TEMED may be substituted with another redox polymerization catalyst such as sodium metabisulfite.

vi) stir for one minute and using an implement, such as a syringe and needle, transfer the nitrogen saturated pre-gel solution rapidly into a glass mold.

The pre-gel mixture is rapidly transferred from the glass container into glass molds to allow the polymerization process to occur and/or so as to allow gels to form into the desired shape. Some of the types of molds employed are described below although one of ordinary skill in the art will recognize that the gels can be cast in any shape and size. A typical gel mold might consist of two common soda glass sheets of approximately 2 mm thick cut to 4 inches wide by 5 inches long rectangles, one each for the top and bottom of the mold. A butyl rubber gasket is cut from a sheet ranging from 400 micrometers to 2 millimeters in thickness to form a seal around the edge of the plates. The thickness of the rubber gasket will help to determine the thickness of the gels, which are thus from 400 micrometers to 2 millimeters. Note that the gel thickness is not limited to the ranges mentioned above; any thickness of rubber could be used for the spacer to achieve a target gel thickness.

As will be appreciated by one of ordinary skill in the art, the molds employed to form the stimulus sensitive gels can vary in length, height and/or width, and as will be appreciated by one of ordinary skill in the art, the desired speed with which the transition of the resulting gel occurs is limited by the smallest dimension of that stimulus sensitive gel. Because there is an inverse relation between the transition speed and the smallest dimension of the gel, between two stimulus sensitive gels that have the same dimensions (e.g., length, height or width) except for one of the dimensions, the gel with the smallest dimensions will undergo its phase transition faster than the other one. According to the theory of gel swelling (Tanaka and Fillmore "Kinetics of Swelling of Gels," in Journal of Chemical Physics, volume 70 at 1214 to 1218), the time depends on the inverse of the length squared, which are incorporated herein by reference. For example, a stimulus sensitive gel that is 1 cm long, 1.0 mm high, and 0.5 cm wide may, for example, take four times as long to completely undergo its phase transition after exposure to its predetermined stimulus than a stimulus sensitive gel that is 1 cm long, 0.5 mm high, and 0.5 cm wide. So if between two gels which are the same in all dimensions except for one, the gel that has a smallest dimension which is half of the second gel may show a contraction that is four times faster than the contraction of the second stimulus sensitive gel.

Next the glass plates are clamped via office binder clips (though any clamping device may be used) on each side of the plates to create a strong seal with the rubber gasket. This clamping 1) prevents any leakage of the prepolymer solution from the mold, thereby precisely controlling the composition of the gel and 2) minimizes diffusion of oxygen into the gel. It is useful, in some embodiments, to prevent the pre-gel mixture from coming into contact with oxygen in the air during the polymerization process, because oxygen retards and may even stop the polymerization reaction. This is the same reason that the distilled and deionized water is purged with nitrogen at the beginning of the manufacture of the gel.

The final step in transforming the pre-gel mixture into a robust stimulus sensitive gel is to allow the solution to polymerize by placing the mold containing the pre-polymer solution into an airtight container that has been purged with nitrogen gas. The polymerization is allowed to proceed for at least 18 hours. After polymerization is complete, the top glass plate is removed and the gels are removed for washing and tuning to the desired trigger temperature.

In an alternative polymerization method, the pre-polymer solution is made into a stimulus sensitive gel via the addition of an ultraviolet (UV) initiator and subsequent exposure to UV irradiation. The UV lamp should output a wavelength of light that corresponds to the UV absorption peak of the UV initiator used. In the method above, one skilled in the art will recognize that the Ammonium Persfulate and the TEMED can be excluded from the formulation and replaced by the UV initiator 1-[4-(2-Hydroxyethoxy)-phenyl]-2-hydroxy-2-methyl-1-propane-1-one (Irgacure 2959). In step vi) above wherein the TEMED is added into the solution, add 0.1248 grams of Irgacure 2959 instead. In the case of Irgacure 2959, the manufacturer's notes specify that that molecule absorbs strongly in the region below 350 nm. A handheld UV lamp with output peak around 320 nm is used to excite the UV initiator to begin polymerization. A lamp with an output power of ~1 milliwatt/centimeter2 is suitable to achieve gelation of the pre-gel mixture. Typical polymerization times range between approximately 1 to 10 minutes at room temperature. After UV polymerization, the top glass plate is removed and the gels are removed for washing and tuning to the desired trigger temperature.

Once polymerization is complete, the polymerized gels are carefully removed from the glass molds while submerging the mold in water. Washing the polymerized gels in deionized water is a necessary step so as to remove unreacted components because during the process of forming the stimulus sensitive gel, there is always the possibility that some N-isopropylacrylamide, or N,N'-methylenebisacrylamide are not incorporated into the polymer chains that form the stimulus sensitive gel. The excess initiator components, either remaining ammonium persulfate and TEMED or Irgacure 2959 need to be removed from the gel. During the polymerization of the stimulus sensitive gel, there is always the possibility that some polymer chains are formed but which do not incorporate into the polymer chains that form the gel, and as such can be washed from the gel. After removing the gel from the mold, it is placed in 500 milliliters (mL) of fresh, cold deionized water in a sealed container. While under gentle agitation, e.g., on a plate shaker incubator, heat the water to 40° C. and leave to wash for at least 6 hours. The resulting gel sheet can become smaller in size and white opaque. Remove gel sheet and submerge in 500 mL fresh, cold deionized water and leave to soak. The resulting gel sheet can grow larger and become transparent again. Immersing the polymerized gels in deionized water is a necessary step so as to remove the components not being incorporated into the gel.

One skilled in the art will recognize that there are many ways to add color into the gel. One of the components in the gel is Laponite RD which is a clay and specifically a hectorite clay. Clay materials are known for their ability to bind cationic species. Thus, one way to add color to these gels is to bind cationic dyes to the Laponite RD clay particles in the NIPAAm gels. One example of a cationic dye is a methylene blue dye. Another example of a cationic dye is crystal violet. The dyeing can be done by immersing the gel in 500 mL of dye solution and soaking for one hour. As described above, the dyeing can be done by taking the washed and swollen gel and immersing in the dyeing solution. A variation in this step involves first drying the gel partially or completely and then immersing in the dyeing solution. The amount of dye added into the solution, depends on the amount of gel that will be dyed. For instance, a typical dyeing procedure involves adding for every gram of dry gel a 1:1 mixture by mole of methylene blue and crystal violet. The gel can thereafter be removed and soaked in fresh, cold deionized water for 1 hour to remove excess dye. After this treatment, the gel is moved to fresh, cold deionized water for storage.

An alternative gel coloring method comprises adding pigment particles into the stimulus sensitive gel formulation. For instance, in the pre-polymer solution above, 0.1 grams of Red 110 M (or other colorant molecule) are added into the mixture and stirred extensively until the particles are completely dispersed. The addition of Red 110 M to the gel allows the gel to be better observed, because otherwise the gel would be colorless and transparent. The mass of colorant added may vary depending upon the final application and selection of color (as the solubility and intensity of dyes varies widely from color to color).

After the polymerization of the stimulus sensitive gel is complete, this stimulus sensitive gel is denoted or referred to as PNIPAAm gels. Doing all these steps completes the method for manufacturing PNIPAAm gels, although any gel that exhibits LCST qualities would work for these embodiments.

2. Shifting the Transition Temperature of the Gels to the Predetermined Stimulus Because of the ingredients and method used to prepare the PNIPAAm stimulus sensitive gels discussed above in Step 1, the polymerized gel can undergo its phase transition at a predetermined stimulus of approximately 33° C. That is, above 33° C., the gel will be shrunken but upon cooling to temperatures below 33° C., the gel will expand or swell. The predetermined stimulus can be altered, however, so as to cause the shrunken stimulus sensitive gel to expand or swell upon cooling below different temperatures. This altering of the predetermined stimulus can be accomplished because of the underlying physical interactions that govern the volume phase transition in stimulus sensitive gels. Various forces have been recognized as responsible for the swelling of polymer gels: polymer-solvent interactions, polymer chain elasticity and monomer counterion pressure. Whether a gel is shrunken or collapsed depends on the competition amongst the three interactions. To induce these gels to undergo a volume transition, the interaction between polymer chains should preferably be more favorable than the interaction between the surrounding solvent and polymer chains. In a swollen gel, the interaction between the polymer chains forming the gel and the surrounding water is more favorable than the interaction between the polymer chains themselves. However, when the solvent surrounding the gels is a poor solvent, such that the polymer chains forming the gels interact amongst them rather than with the poor solvent, then the polymer chains will contract in order to minimize their exposure to the poor solvent leading the gel to collapse. Compared to pure water, a salt solution in water is a poor solvent for the PNIPAAm gels and so these gels can be made to collapse in an salt solution of sufficient salt concentration.

In water at room temperature, PNIPAAm chains become greatly extended such that the contact between polymer chains and water is maximized, thereby resulting in a swollen gel. In order to induce these gels to undergo a volume transition, the interaction between the polymer chains and the surrounding solvent needs to be made unfavorable such that the PNIPAAm chains contract to avoid contact with the surrounding solvent and lead the gel to shrink. This can also be accomplished by heating the gel above its transition temperature since the interaction between the solvent and the polymer chains can be made unfavorable and hence lead to collapse of the gel by increasing the temperature.

A further concept inherent in these polymer gels is the directionality of the temperature-induced volume changes. As discussed herein, certain polymer gels (e.g., Poly(Acrylic Acid) abbreviated PAAc) shrink when cooled below a trigger temperature. These polymer gels are said to show an "Upper Critical Solution Temperature" or UCST. UCST behavior depends on the chemical structure. Many examples of UCST polymer gels are known in the literature. In polymer physics, UCST polymer-solvent systems are those in which the solubility of the polymer is enhanced at high temperatures and diminished at low temperatures. Because PAAc gels are UCST gels, when the PAAc gel is below its predetermined stimulus (i.e., its transition temperature), it is shrunken; but above its predetermined stimulus the PAAc gel is in the swollen state As also discussed herein, there are certain polymer gels (e.g., PNIPAAm) shrink when heated above a trigger temperature. These polymer gels are said to show a "Lower Critical Solution Temperature" or LCST. LCST behavior depends on the chemical structure. Many examples of LCST polymer gels are known in the literature. In polymer physics, LCST polymer-solvent systems are those in which the solubility of the polymer is enhanced at low temperatures and diminished at high temperatures. Because PNIPAAm gels are LCST gels, when the PNIPAAm gel is below its predetermined stimulus (i.e., its transition temperature), it is swollen; but above its predetermined stimulus the PNIPAAm gel is in the collapsed state.

As is known in the art, the transition temperature of both PNIPAAm and PAAc gels can be changed significantly by immersing the gel in solutions of water with other components (such as salt or solvents). In regard to the PNIPAAm gels, see for example Tae Gwan Park et al. "Sodium Chloride-induced phase transition in nonionic Poly(n-isopropylacrylamide) gels" Macromolecules 1993 or Yanhie Zhang et al. "Specific Ion Effects on the Water Solubility of Macromolecules: PNIPAAm and the Hofmeister Series" Journal of the American Chemical Society 2005. The salt used in these solutions can be, by way of example only, sodium chloride although one of ordinary skill in the art will recognize that sodium chloride may be substituted with other sodium salts. Similarly, in regard to PAAc gels see Seiji Katayama "Chemical Condition Responsible for Thermo swelling or Thermo shrinking Type of Volume Phase Transition in Gels. Effect of Relative Amounts of Hydrophobic to Hydrophilic Groups in the Side Chain" Journal of Physical Chemistry 1992, which are all incorporated herein by reference.

Temperature and salt concentration play a similar role in dictating whether the gel is swollen or not. For if example the stimulus sensitive gel is kept above a certain temperature, the stimulus sensitive gel can remain shrunken. But when the shrunken stimulus sensitive gel is exposed to a stimulus that equals or exceeds its predetermined stimulus, for example a lower temperature, the shrunken stimulus sensitive gel can undergo its phase transition and expand or swell. Conversely, when the swollen stimulus sensitive gel is exposed to a stimulus that equals or exceeds its predetermined stimulus, for example a higher temperature, the swollen stimulus sensitive gel can undergo its phase transition and collapse or shrink.

Alternatively, by keeping the temperature of the stimulus sensitive gel fixed during its manufacture, so long as the stimulus sensitive gel is not exposed to a predetermined stimulus. For example, if the swollen stimulus sensitive gel is kept at a constant salt concentration, then swollen stimulus sensitive gel will remain swollen. When the concentration surrounding the swollen stimulus sensitive gel changes to such a degree that it equals the predetermined stimulus for that swollen stimulus sensitive gel, for example, the salt concentration in the solution surrounding the swollen stimulus sensitive gel rises to a predetermined level, at that point the solution surrounding swollen stimulus sensitive gel becomes such a poor solvent for the swollen stimulus sensitive gel that the swollen stimulus sensitive gel collapses or shrinks. This relationship between certain types of stimuli, such as salt concentration and transition temperature, is what allows for the control of the phase transition of the stimulus sensitive gel at its predetermined stimulus, by way of example only, its transition temperature.

One of the embodiments of this invention includes a shrunken stimulus sensitive gel that goes through its phase transition at a predetermined level of stimulus. By way of example only, malaria vaccine spoils after exposure to a temperature lower than 2° C. Therefore, a shrunken stimulus sensitive gel used in conjunction with any embodiment of the stimulus indicating device described herein, can be set to trigger at 2° C. or cooler. By way of example only, a PNIPAAm gel as the shrunken stimulus sensitive gel can be manufactured so that as the phase transition of the shrunken stimulus sensitive gel, and therefore the imbibing of the surrounding liquid in the form of a salt solution, occurs at approximately 2° C. As one of ordinary skill in the art can appreciate, the solvent concentration that causes a shrunken stimulus sensitive gel to trigger or undergo its phase transition at a predetermined level of stimulus, can be determined for any stimulus, and more particularly at any level of stimulus.

To determine the salt concentration that is needed to cause a given shrunken stimulus sensitive gel to trigger or undergo its phase transition at a predetermined stimulus such as temperature, one needs to first start with gross variations of salt (sodium chloride) concentration then determine from those gross variations the level of stimulus that causes the shrunken stimulus sensitive gel to trigger or go through its phase transition. Then by narrowing that variation of salt concentration and again noting the level of stimulus that caused the swollen stimulus sensitive gel to trigger or undergo its phase transition, the swollen stimulus sensitive gel with the proper or desired trigger of phase transition characteristics will become evident. Once the salt concentration required to obtain gels that trigger at the desired transition temperature are well established, this procedure needs not be repeated for all manufactured gels.

Example 1. Tuning of the Transition Temperature of a PNIPAAm Gel to 2° C.

By way of illustration only, to determine the proper salt concentration for a stimulus sensitive PNIPAAm gel to trigger or undergo its phase transition at a temperature of 2° C., similarly sized pieces of washed stimulus sensitive gel films are immersed and saturated in salt-water mixtures prepared whereby the concentrations of the salt-water mixture have the following salt concentrations: 13.5, 13.75, 14.0, 14.25, and 14.5 weight %.

The gel used in this determination is made by combining 5.65 grams of N-isopropylacrylamide, 0.5 grams of Laponite RD, 0.06 grams of methylenebisacrylamide and 50 grams of distilled and deionized water in a glass container. The contents are stirred for approximately one hour until they disperse completely. Nitrogen is bubbled into the dispersion for 20 minutes while stirring gently and while still bubbling, thereafter 0.0635 grams of ammonium persulfate are added to the solution. The stirring speed is increased for two minutes and 100 microliters of TEMED are added with stirring for one minute. This solution is transferred with a syringe into a glass mold to minimize contact with air. The glass mold is prepared by sandwiching a 0.8 mm thick butyl rubber gasket between two glass plates. Both glass plates are 2 millimeters thick and approximately 4 inches wide by 5 inches long. The mold filled with the pre-polymer solution is then placed in an airtight container that has been purged with nitrogen. After allowing to polymerize for at least 18 hours, the gel is then removed from the mold while the mold is submerged in distilled and deionized water. The gel is then washed to remove unreacted components by placing in 500 mL of distilled and deionized water and is heated to 40° C. for six hours with gentle agitation. Thereafter the gel is placed in 500 mL of distilled and deionized water for at least one hour. Next the gel is air dried completely and thereafter the gel is placed in 500 mL of dyeing solution. As described above, the dyeing solution contains 30 micromoles of a 1:1 mixture by mole of crystal violet and methylene blue for every gram of dry gel that will be dyed. In this example, the gel has a dry mass of approximately 6.25 grams. If the entire gel is placed in the dye solution, the dye solution consists of 0.038 grams of crystal violet and 0.030 grams of methylene blue dissolved in 500 milliliters of water. The gel is soaked in the dye for one hour. Finally, the gel is removed from the dye solution, transferred to distilled and deionized water to remove excess dye and then stored in distilled and deionized water.

The gel is then punched into similarly sized circular pieces of approximately 10 mm in diameter. By using similarly sized pieces, the determination is much more reliable. The saturation of the gels with salt-water mixtures is done by immersing these washed and dyed gel films in the corresponding salt-water mixtures (100 parts solution to 1 part gel film by weight) and equilibrating for at least 24 hours at −10° C. before taking any measurements. It is important to swell the gels in the salt solution at a cold temperature of at least −1° C. but the temperature can be preferably lower, as shown in this example −10° C., as long as the salt solution does not freeze.

The swollen gels immersed in the salt-water mixtures are then placed inside an environmental chamber that can maintain a constant temperature environment to ±0.5° C. The set point of the environmental chamber is changed gradually and a determination is made of whether the gel is shrunken or swollen. The gels are equilibrated at each temperature for 12 hours and a determination is made as to whether the gel is shrunken or swollen. A matrix like the one in the table below can be obtained:

| Salt Concentration, | Temperature, centigrade | | | | |
|---|---|---|---|---|---|
| weight % | 1 | 1.5 | 2 | 2.5 | 3 |
| 13.5 | O | O | O | O | O |
| 13.75 | O | O | O | O | X |
| 14.0 | O | O | O | X | X |
| 14.25 | O | O | X | X | X |
| 14.5 | O | X | X | X | X |

In the table above, the Xs denote salt concentrations for which the gels are collapsed at a given temperature in centigrade while the Os denote salt concentrations for which the gels are swollen at a given temperature. Note that in order to prepare a gel with a trigger temperature of 2 degrees centigrade, the salt concentration required is 14 weight %.

Although the inventions contained herein have been particularly shown and described with reference to preferred and alternative embodiments thereof, it will be understood by those skilled in the art that various changes in form and detail may be made to those inventions without departing from the spirit and scope of the inventions.

What is claimed is:

1. A stimulus indicating device that indicates exposure to a predetermined stimulus comprising:
    a compartment defined by an upper layer and a backing layer, said compartment having a first side and a second side opposite to said first side;
    a stimulus sensitive gel within said compartment extending from said first side of said compartment toward said second side of said compartment, said stimulus sensitive gel having a first end positioned at said first side of said compartment, and a second end opposite to said first end;
    a viewing window positioned in said upper layer and positioned above said backing layer, for viewing said backing layer;
    a first adhering component attached to said stimulus sensitive gel; and
    a second adhering component positioned in said second side of said compartment
    wherein said stimulus sensitive gel has a first end and a second end, and said first end of said stimulus sensitive gel contains an anchor receiving portion for attaching said first side of said stimulus sensitive gel to a first anchoring portion on the first side of said compartment.

2. The stimulus indicating device as recited in claim 1, further comprising a fluid in said compartment.

3. The stimulus indicating device as recited in claim 1, wherein said anchor receiving portion is open at one end.

4. The stimulus indicating device as recited in claim 1, wherein said first adhering component is positioned at the second end of said stimulus sensitive gel.

5. The stimulus indicating device as recited in claim 4, wherein said first adhering component is a latch attached to said stimulus sensitive gel.

6. The stimulus indicating device as recited in claim 5, wherein said second adhering component is a magnet portion.

7. The stimulus indicating device as recited in claim 1, wherein said anchor receiving portion is smaller than said first anchoring portion.

8. The stimulus indicating device as recited in claim 7, wherein said first adhering component is a metal portion attached to said stimulus sensitive gel.

9. The stimulus indicating device as recited in claim 1, wherein said anchor receiving device portion is larger than said first anchoring portion.

10. The stimulus indicating device as recited in claim 9, wherein said second adhering component is a catch.

11. The stimulus indicating device as recited in claim 10, wherein said viewing window is positioned between said catch and said first side of said compartment.

12. The stimulus indicating device as recited in claim 1, wherein said second adhering component is positioned in the second side of said compartment.

13. The stimulus indicating devise as recited in claim 1, further comprising an indicator spot located in said compartment.

14. The stimulus indicating device as recited in claim 1, wherein said device is enclosed in a pouch made from a film material having high moisture vapor retention.

15. The stimulus indicating device as recited in claim 14, wherein said film material is selected from the group consisting of laminates containing poly(chlorotrifluoroethylene) (PCTFE) sold under the trade name Aclar or aluminum oxide polyester, PTATP22002 and Oliver Tolas TPF-0599B.

16. The stimulus indicating device as recited in claim 1, wherein a predetermined temperature can occur for at least a predetermined time period prior to said stimulus indicating device providing a permanent indication that a predetermined stimulus occurred.

17. A stimulus indicating device that indicates exposure to a predetermined stimulus comprising:
    a compartment defined by an upper layer and a backing layer, said compartment having a first side and a second side opposite to said first side;
    a stimulus sensitive gel within said compartment extending from said first side of said compartment toward said second side of said compartment, said stimulus sensitive gel having a first end positioned at said first side of said compartment, and a second end opposite to said first end;
    a viewing window positioned in said upper layer and positioned above said backing layer, for viewing said backing layer wherein said viewing window is positioned between a catch and said first side of said compartment;
    a first adhering component attached to said stimulus sensitive gel; and
    a second adhering component positioned in said second side of said compartment wherein said second adhering component is the catch.

18. The stimulus indicating device as recited in claim 17, further comprising a fluid in said compartment.

19. The stimulus indicating device as recited in claim 14, wherein said stimulus sensitive gel has a first end and a second end, and said first end of said stimulus sensitive gel contains an anchor receiving portion for attaching said first side of said stimulus sensitive gel to a first anchoring portion on the first side of said compartment.

20. The stimulus indicating device as recited in claim 19, wherein said anchor receiving portion is open at one end.

21. The stimulus indicating device as recited in claim 19, wherein said first adhering component is positioned at the second end of said stimulus sensitive gel.

22. The stimulus indicating device as recited in claim 19, wherein said anchor receiving portion is smaller than said first anchoring portion.

23. The stimulus indicating device as recited in claim 22, wherein said first adhering component is a metal portion attached to said stimulus sensitive gel.

24. The stimulus indicating device as recited in claim 19, wherein said anchor receiving device portion is larger than said first anchoring portion.

25. The stimulus indicating device as recited in claim 19, wherein said first adhering component is a latch attached to said stimulus sensitive gel.

26. The stimulus indicating device as recited in claim 25, wherein said second adhering component is a magnet portion.

27. The stimulus indicating devise as recited in claim 17, further comprising an indicator spot located in said compartment.

28. The stimulus indicating device as recited in claim 17, wherein said device is enclosed in a pouch made from a film material having high moisture vapor retention.

29. The stimulus indicating device as recited in claim 28, wherein said film material is selected from the group consisting of laminates containing poly(chlorotrifluoroethylene) (PCTFE) sold under the trade name Aclar or aluminum oxide polyester, PTATP22002 and Oliver Tolas TPF-0599B.

30. The stimulus indicating device as recited in claim 17, wherein a predetermined temperature can occur for at least a predetermined time period prior to said stimulus indicating device providing a permanent indication that a predetermined stimulus occurred.

* * * * *